United States Patent [19]

DeShon

[11] 4,390,947

[45] Jun. 28, 1983

[54] SERIAL LINE COMMUNICATION SYSTEM

[75] Inventor: Wallace E. DeShon, Bartlesville, Okla.

[73] Assignee: Phillips Petroleum Company, Bartlesville, Okla.

[21] Appl. No.: 217,070

[22] Filed: Dec. 16, 1980

Related U.S. Application Data

[62] Division of Ser. No. 15,687, Feb. 27, 1979, Pat. No. 4,270,205.

[51] Int. Cl.$^3$ .......................... G06F 3/00; G06F 11/14
[52] U.S. Cl. ......................................... 364/200; 371/32
[58] Field of Search ................... 364/200, 900; 371/32

[56] References Cited

U.S. PATENT DOCUMENTS

| | | | |
|---|---|---|---|
| 3,312,937 | 4/1967 | Van Duuren | 371/32 |
| 3,452,330 | 6/1969 | Avery | 371/32 |
| 3,593,281 | 7/1971 | Van Duuren et al. | 371/32 |
| 3,668,649 | 6/1972 | Pedersen et al. | 364/200 |
| 3,676,846 | 7/1972 | Busch | 364/200 |
| 3,747,074 | 7/1973 | Shulze | 364/900 |
| 3,754,211 | 8/1973 | Rocher et al. | 371/33 |
| 3,777,751 | 11/1973 | Anderson | 364/900 |
| 3,818,447 | 6/1974 | Craft | 364/200 |
| 3,876,979 | 4/1975 | Winn et al. | 371/32 |
| 3,978,407 | 8/1976 | Forney, Jr. et al. | |
| 4,082,922 | 4/1978 | Chu | |
| 4,091,448 | 5/1978 | Clausing | 364/200 |
| 4,144,522 | 3/1979 | Kageyama et al. | |
| 4,224,665 | 9/1980 | deBijl et al. | 364/200 |
| 4,225,918 | 9/1980 | Beadle et al. | 364/200 |
| 4,245,300 | 1/1981 | Kaufman et al. | 364/200 |
| 4,270,205 | 5/1981 | DeShon | 371/32 |

OTHER PUBLICATIONS

DeShon, Microprocessors Improve Serial Communication, Control Engineering, pp. 127–131, Mar. 1978.

*Primary Examiner*—Charles E. Atkinson

[57] ABSTRACT

A serial line communication system is provided whereby a plurality of remote units are tied to a central site through a serial communication line. Each remote unit is provided with an automatic bit rate detection means. Messages returning from the remotes are checked at the central site for errors. If errors occur, the central site automatically retries to achieve error-free communication. If necessary to achieve error-free communication, the central site is provided with means for automatically shifting to a lower secondary bit rate to achieve communications with a particular remote. The central site then shifts back to the higher primary bit rate for communication with the next remote.

5 Claims, 15 Drawing Figures

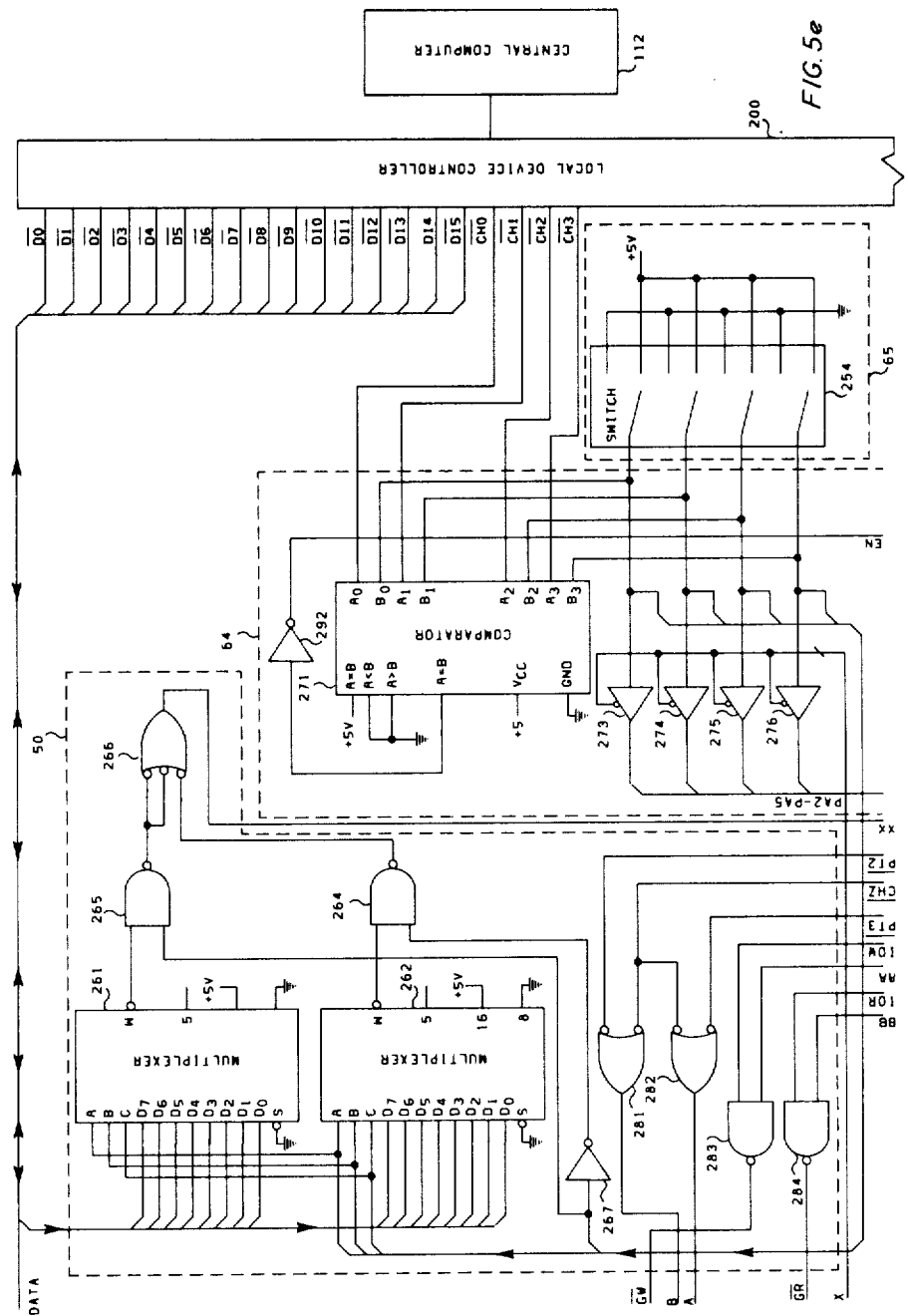

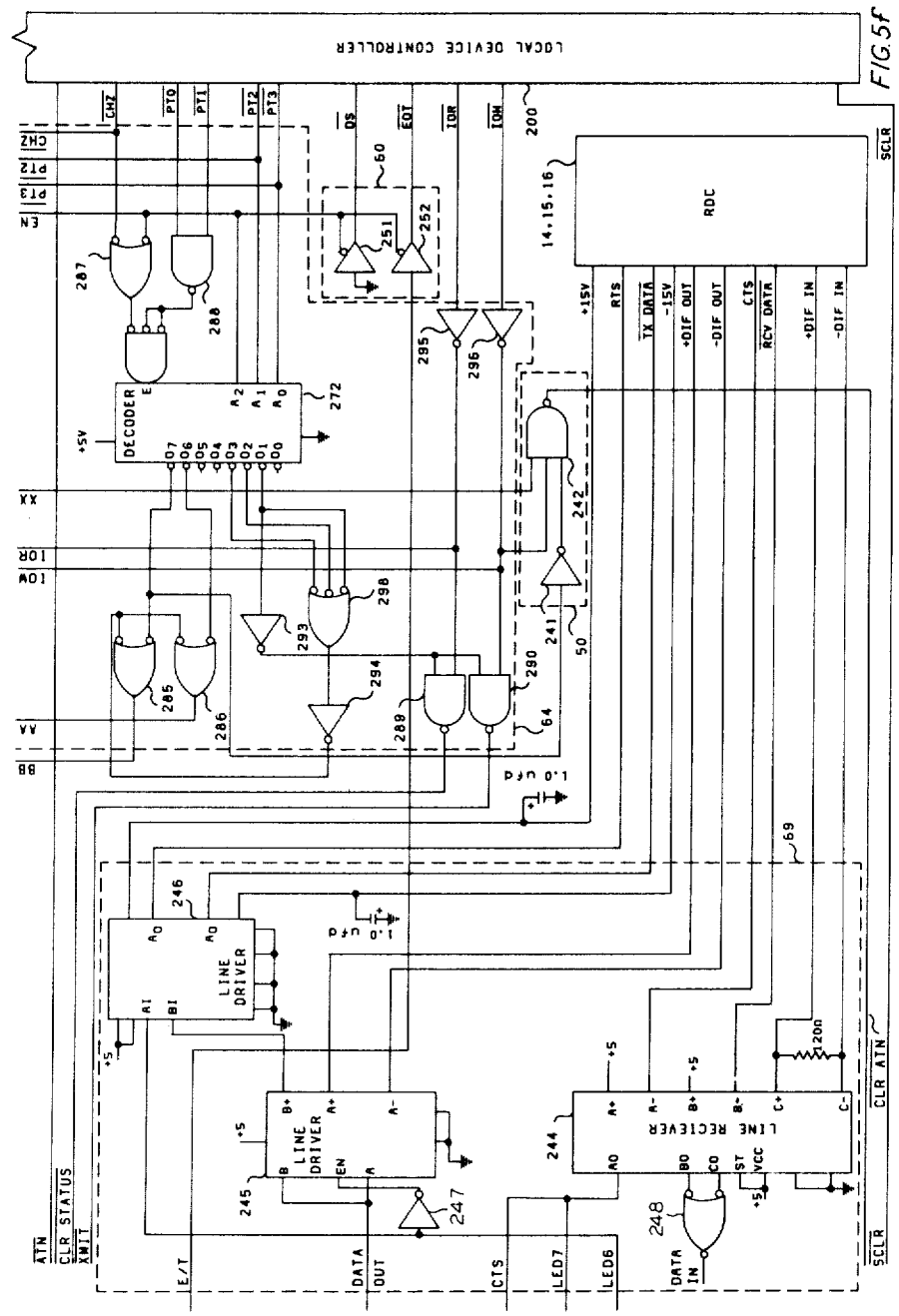

SERIAL LINE COMMUNICATION SYSTEM

This application is a division of application Ser. No. 015,687, filed Feb. 27, 1979, now U.S. Pat. No. 4,270,205 issued May 26, 1981.

This invention relates to serial line communication systems. In a particular aspect this invention relates to a serial line communication system having the capability to increase throughput and minimize cost by operating at a prime baud rate and shifting to a lower secondary band rate only when errors or transmission problems occur when data is transmitted at the prime baud rate.

The serial communication line has been the predominant choice for use in communications systems. The security, reliability, and cost effectiveness of the serial line usually offset its lower than parallel line speed. Serial communication systems come in two configurations: radial and party line.

The radial system provides for maximum throughput to each remote station. It is also the more expensive of the two systems since a separate communication line, a communication line controller, and modem is needed for each serial line. The party line organization, however, requires only one communication line controller and modem at the central computer, but it is slower than the radial system.

Both configurations require that each bit of data to be transmitted be placed on the serial line for a finite amount of time. The time required to transmit a message is the product of the time required for a single bit (bit rate) times the number of bits required to make up a message. Time per bit is the reciprocal of the bit rate. Thus, 43 consecutive bits at 1,200 bits per sec requires 0.0358 secs to be transmitted (1/1,200×43).

The number of remotes on a party line is limited by the amount of time required to communicate with each remote and the frequency with which each remote must be communicated. For example, assume that five remotes on a party line must be updated every second and the time required to up-date each remote is 0.072 second. Since each remote is updated sequentially, the serial line is used 0.36 seconds (0.072×5) of every 1-sec update cycle.

The obvious solution to increasing throughput and minimizing system cost is to increase the bit rate so that each message takes less time. Factors such as the frequency characteristics of the line and modem speeds put an upper limit on which bit rate can be used. For example, 1,200 bits per second is generally considered the upper limit on telephone lines when using frequency-shift-keying. For frequency shift keying, the terms bit rate and baud rate are synonymous and are used interchangeably.

Other factors must be considered which are not fixed limits but time dependent and "weak link" limits to the bit rate. For example, a distant remote may not be able to communicate at as high a speed as a closer remote. Historically, in party line systems, all remotes are strapped to the same bit rate. Therefore, all remotes are slowed down to be compatible with the "weak link" remote. This results in a reduced throughput and an increased system cost because of the use of the low bit rate.

Modulators/demodulators (modems) occasionally need calibration especially in temperature extremes. Many times to reduce the frequency of modem calibration, a lower bit rate is used. Other time dependent limits such as excessive electrical noise during certain periods of the day have also caused a lower bit rate to be used. Even when a compromise bit rate is found, there are still times when a serial line to a particular remote is inoperable. Many times the inoperable serial line would operate at a lower bit rate than the compromise bit rate. However, when the remotes are widely separated or even strung across a continent, it would be extremely difficult to try to manually reset each remotes bit rate switch.

It is thus an object of this invention to provide a serial line communications system having the capability to increase throughput and minimize cost by operating at a prime baud rate and shifting to a lower secondary baud rate only when errors or transmission problems occur when data is transmitted at the prime baud rate. In this manner, a substantially optimum bit rate is being utilized at all times and the throughput of the communications system is thus increased with a corresponding reduction in system cost.

In accordance with the present invention a serial line communications system is provided in which a communication line controller (CLC) and a remote device controller (RDC) are utilized to interface a central computer to a remote device. A large number of RDCs may be tied to the central computer through a single CLC if desired. Each RDC is connected to at least one remote device. The CLC is interfaced directly to the central computer. The CLC and RDC are connected by means of a serial communication line.

The CLC receives commands and a message from the central computer. The CLC formats the message and adds a sync pattern because the serial communication is asynchronous (no clock timing contained in the message). The message from the computer contains a command to be executed by the addressed RDC and the channel and point address of the remote device to be controlled. Sixteen bits of data, if any, will follow the channel and point address. The CLC computes a seven bit Bose'-Chauduri (BCH) detection code and appends the error detection code to the end of the message.

The formatted serial message is placed on the serial line at a primary bit rate by the CLC. The RDC is continually monitoring the serial line. When the serial line goes active, the RDC times and compares symmetry of the sync pattern. Based on the time required for the sync pattern, the RDC determines the bit rate. The message is received at the determined bit rate and the error detection code is checked. If no errors are detected and the RDC detects its own address in the message, the RDC will execute the command part of the message. Should the command require the RDC to reply to the CLC, and RDC will transmit a response to the CLC at the same bit rate and in the same format as the received message.

If the CLC expected a reply from the RDC and either didn't get a reply or the reply contained an error, the CLC will retransmit the same message at the same bit rate. If the error persists, the CLC will lower the bit rate and try once more. If communications cannot be established at the lower bit rate, the CLC will interrupt the central computer and thus notify the central computer of the transmission problem. In this manner, the primary bit rate is utilized for transmission of messages unless errors occur. If errors occur in the messages, a lower secondary bit rate is utilized. In this manner, the throughput of the serial communication line is substantially optimized with a resulting reduction in cost of the serial line communication system.

Other objects and advantages of the invention will be apparent from the foregoing description and from the claims as well as from the detailed description of the drawings in which:

Figure 2:
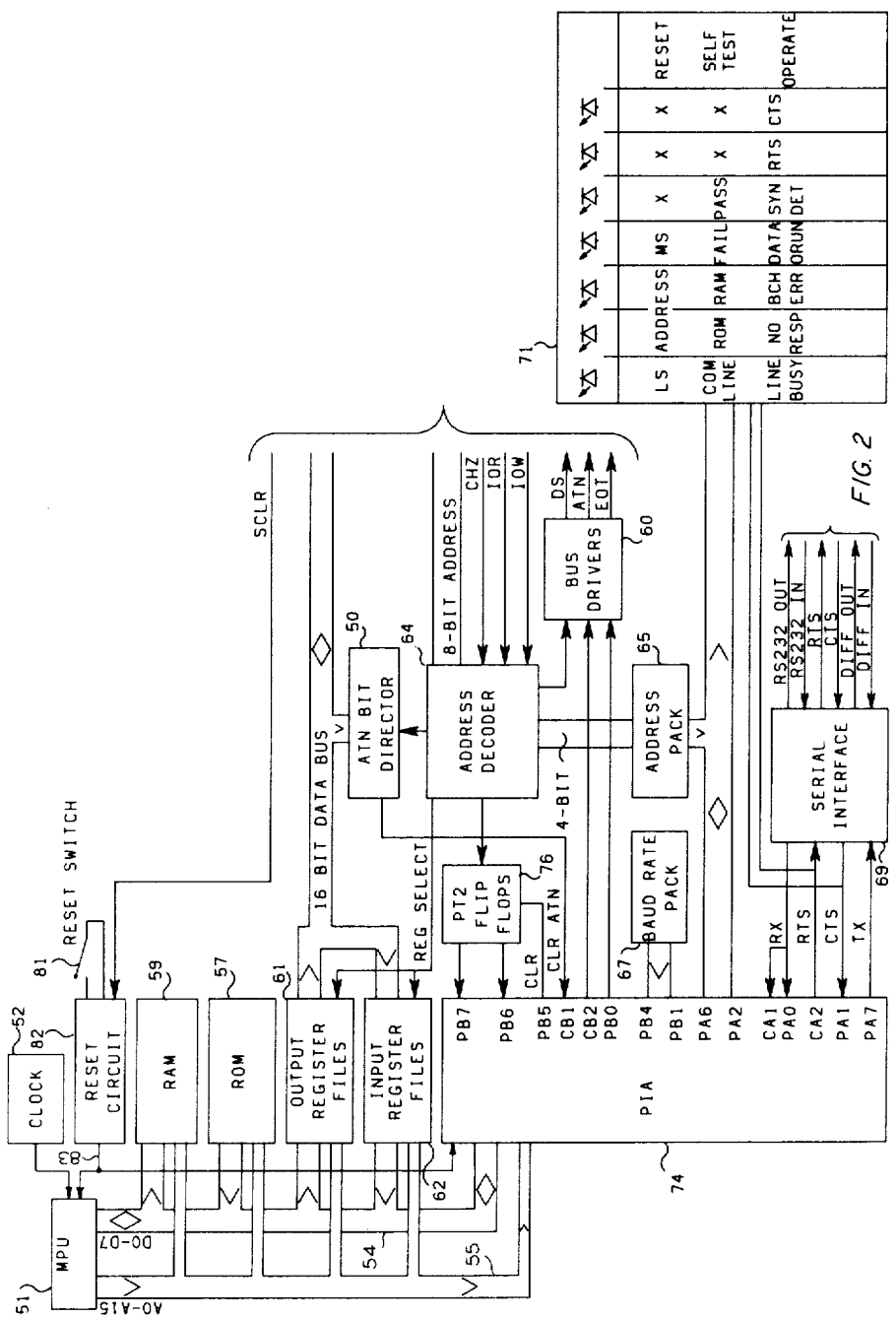
FIG. 2 is a detailed block diagram of the CLC illustrated in FIG. 1.
Figure 4:
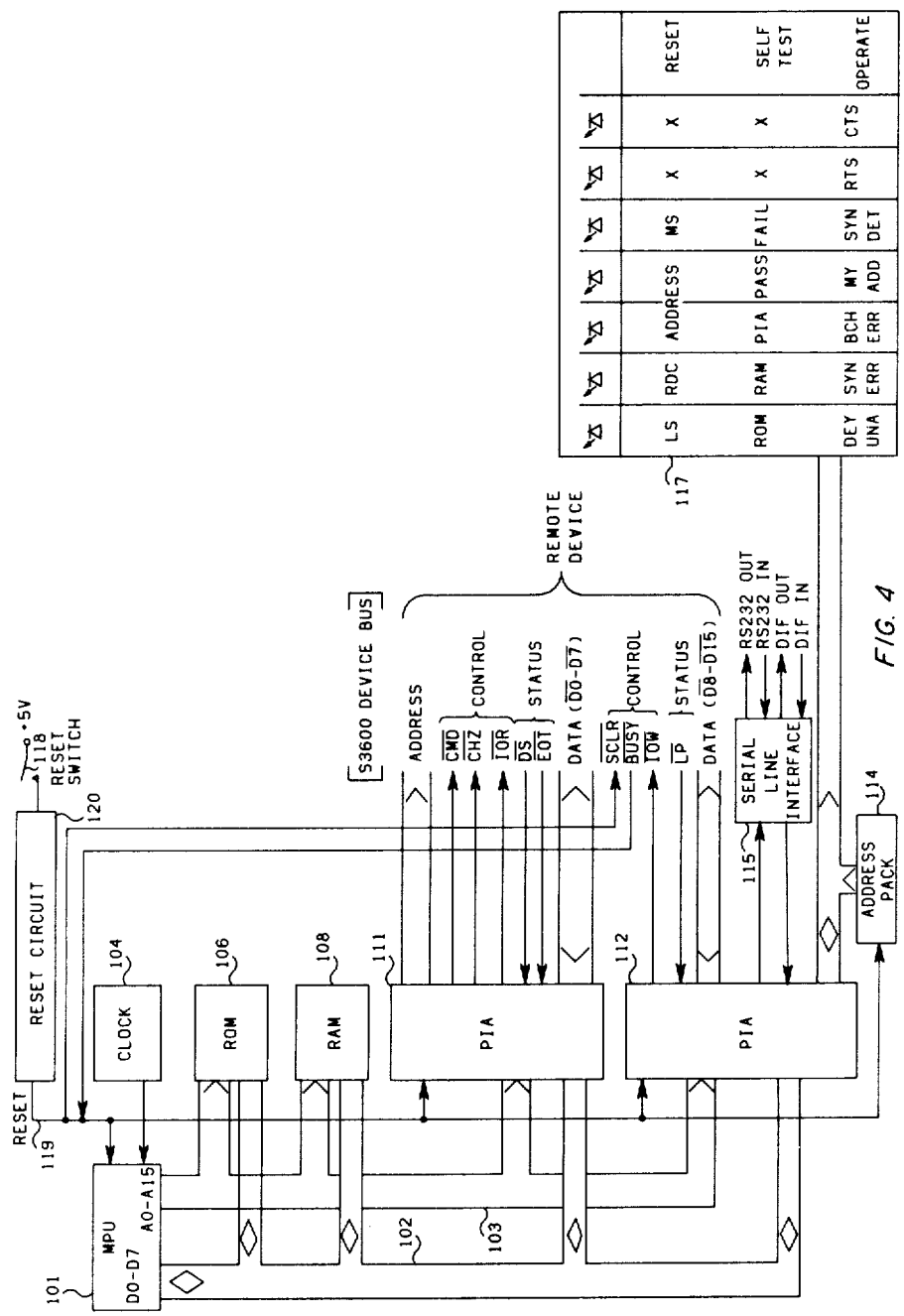
FIG. 4 is a detailed block diagram of the RDC illustrated in FIG. 1.
Figure 5A:
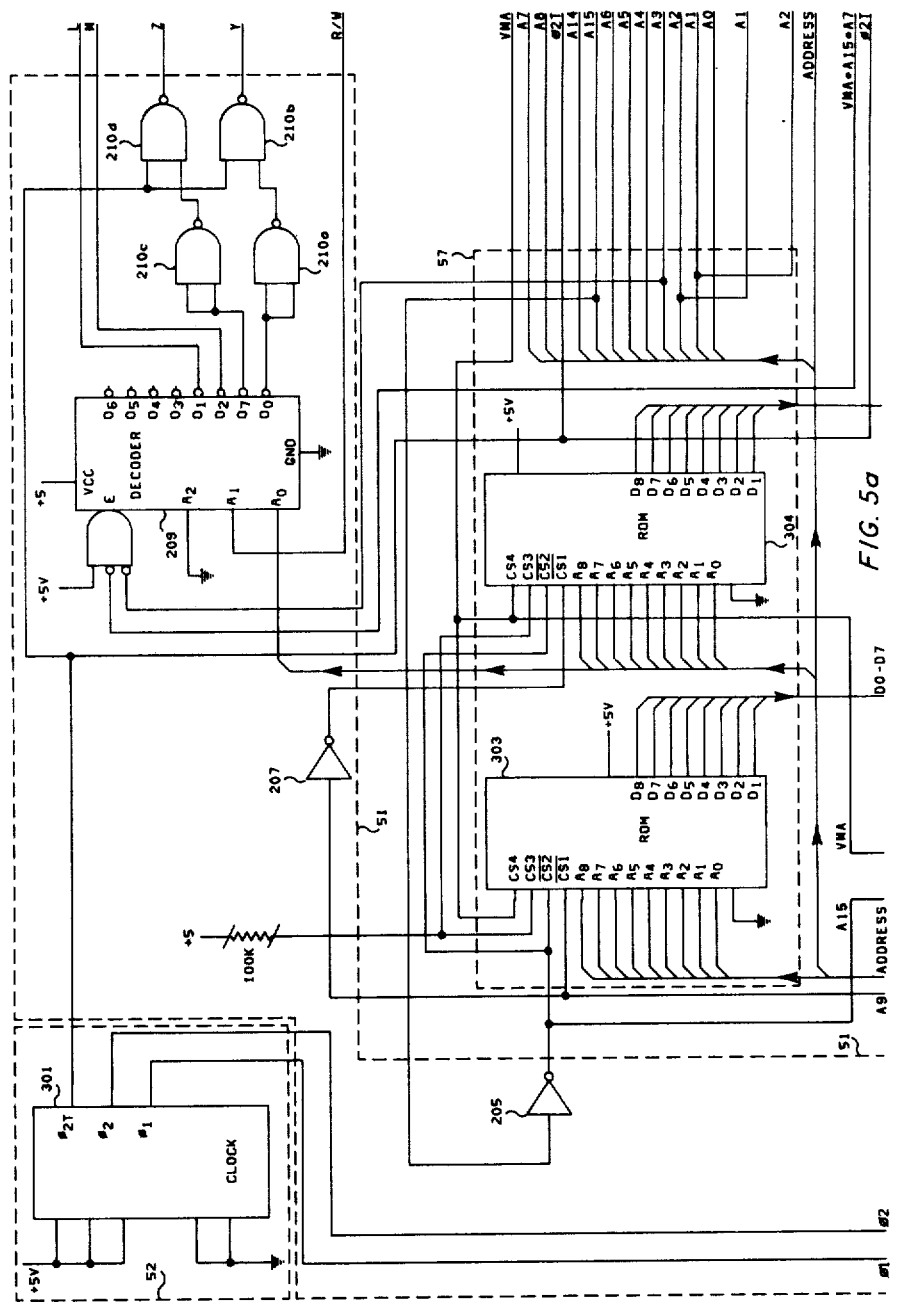
Figure 5B:
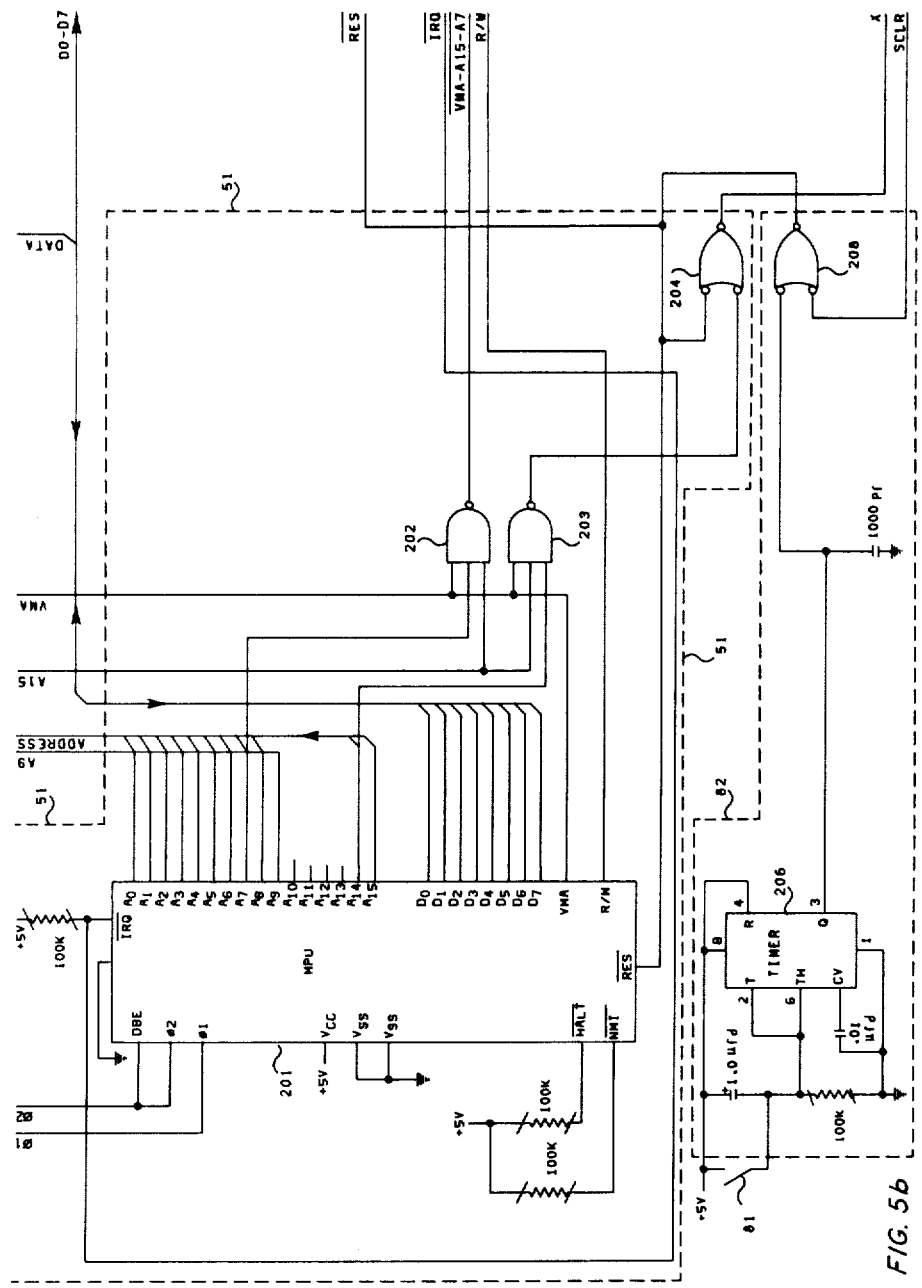
Figure 5C:
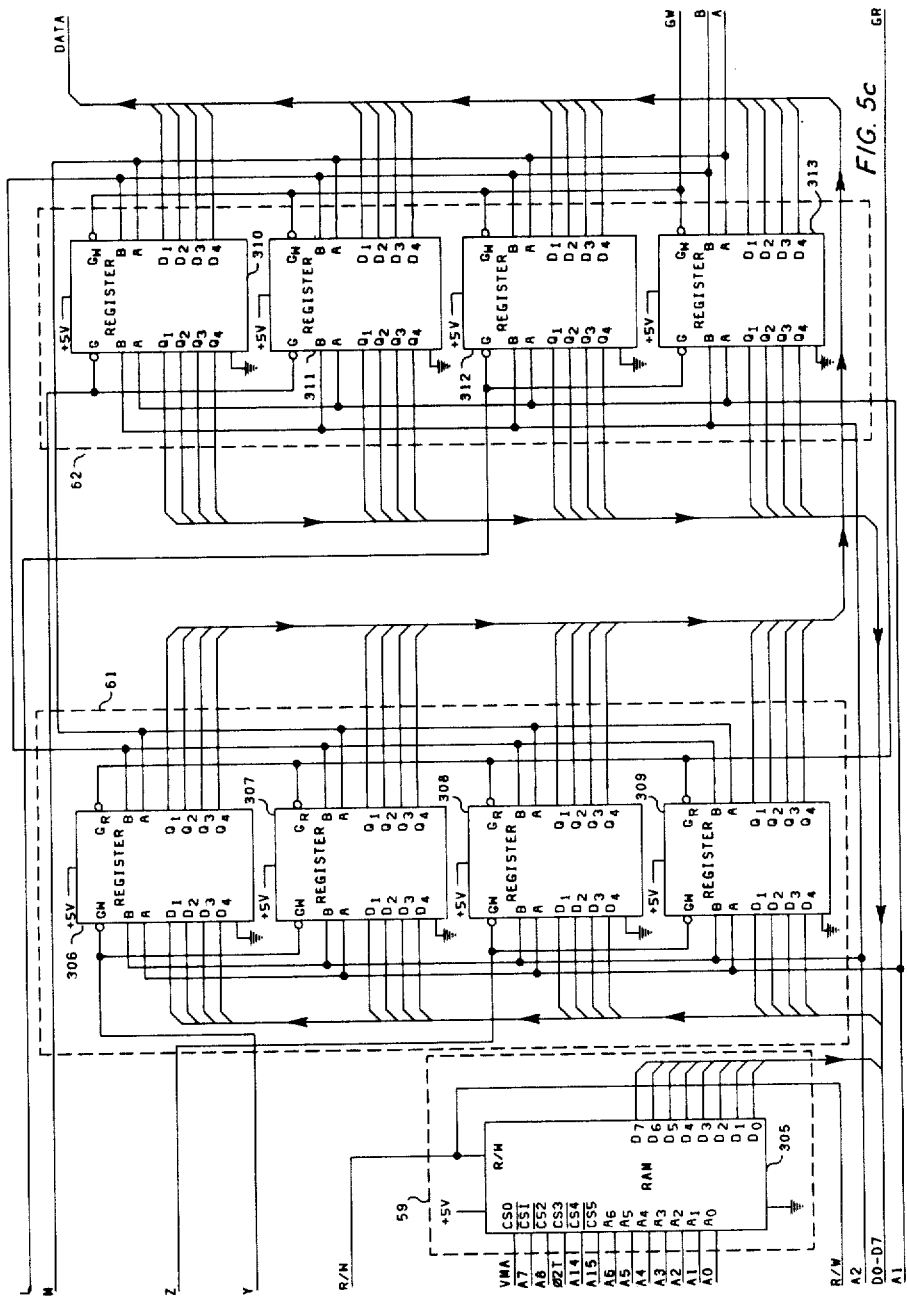
Figure 5D:
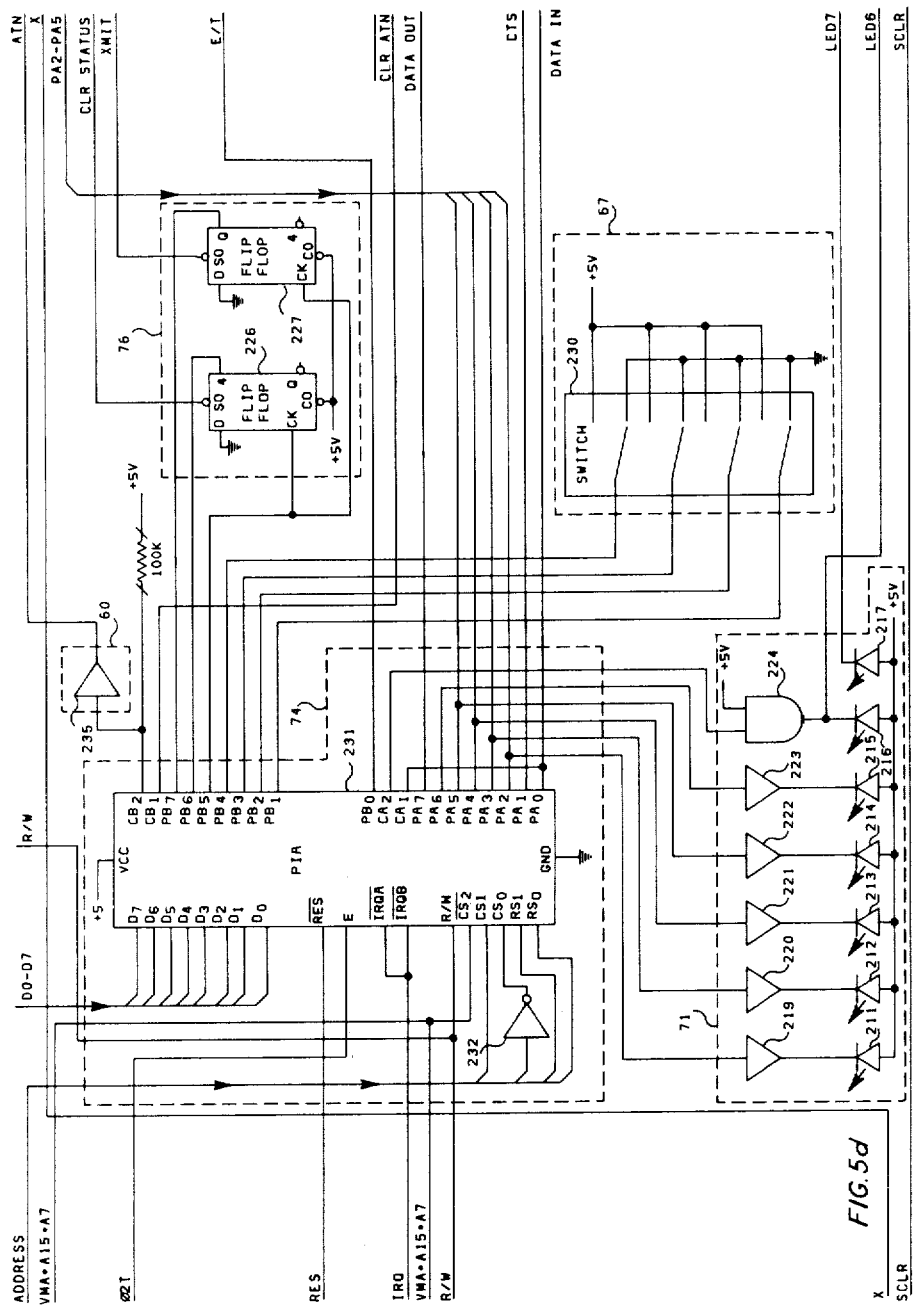
Figure 6:
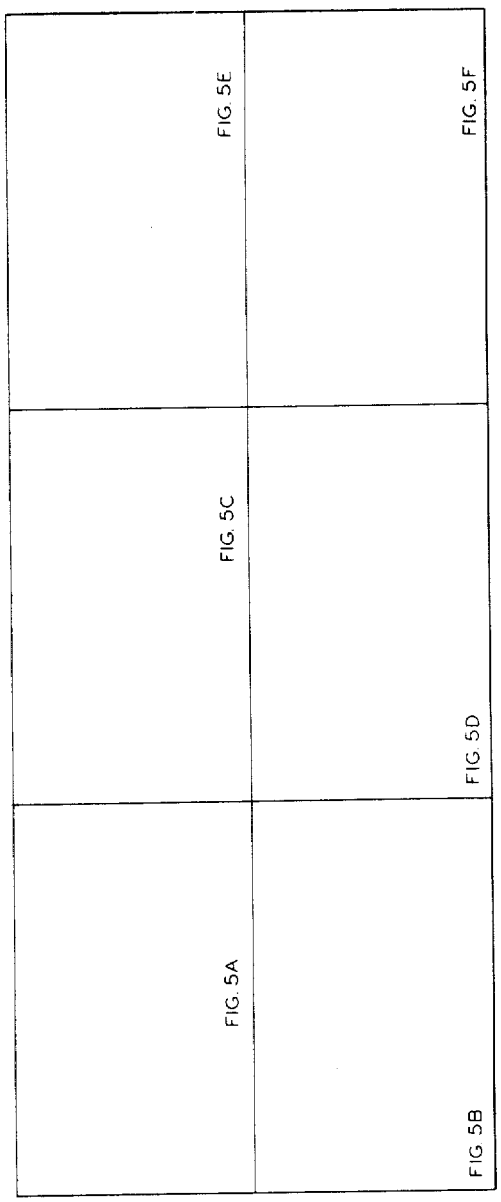
Figure 7A:
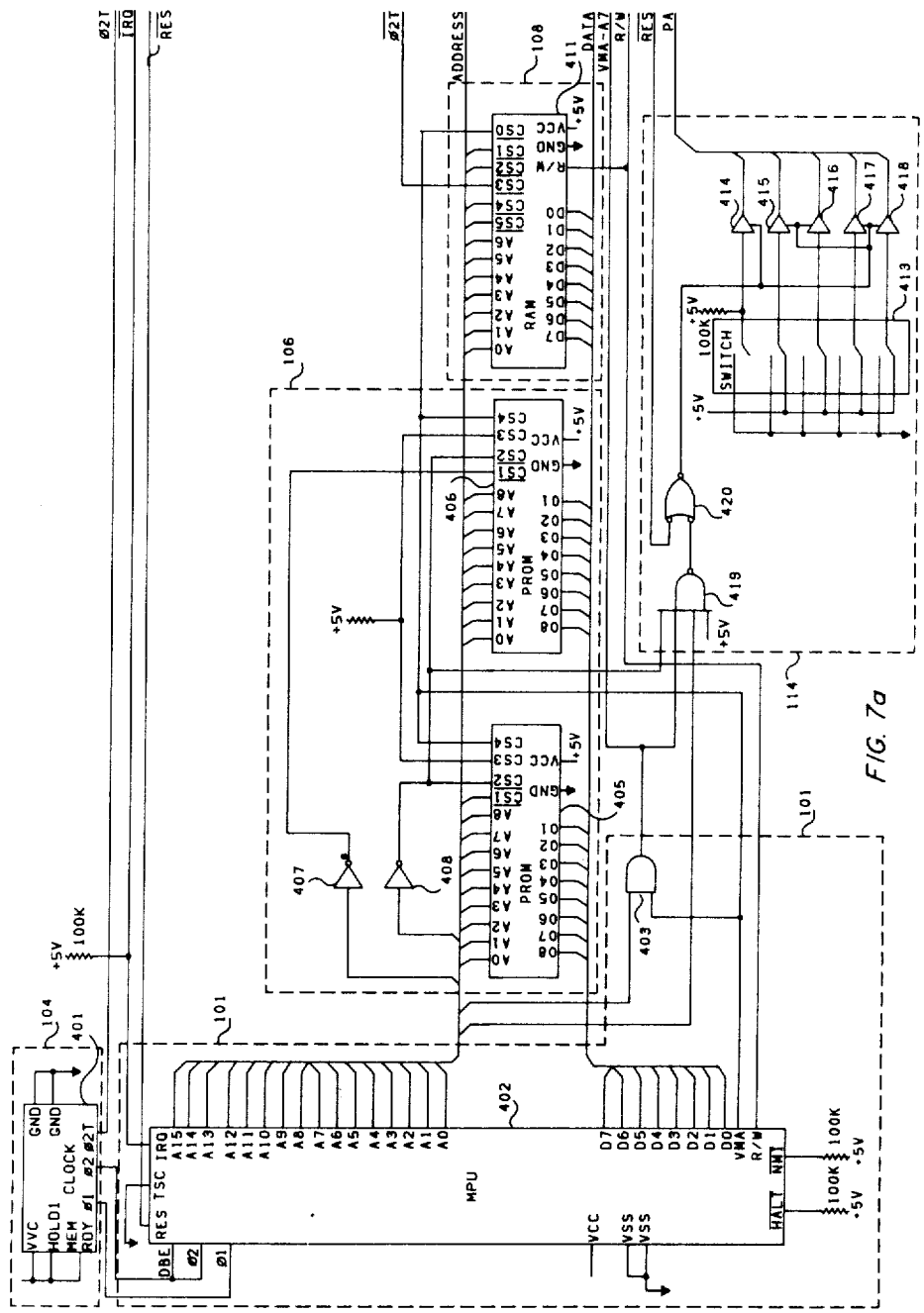
Figure 7B:
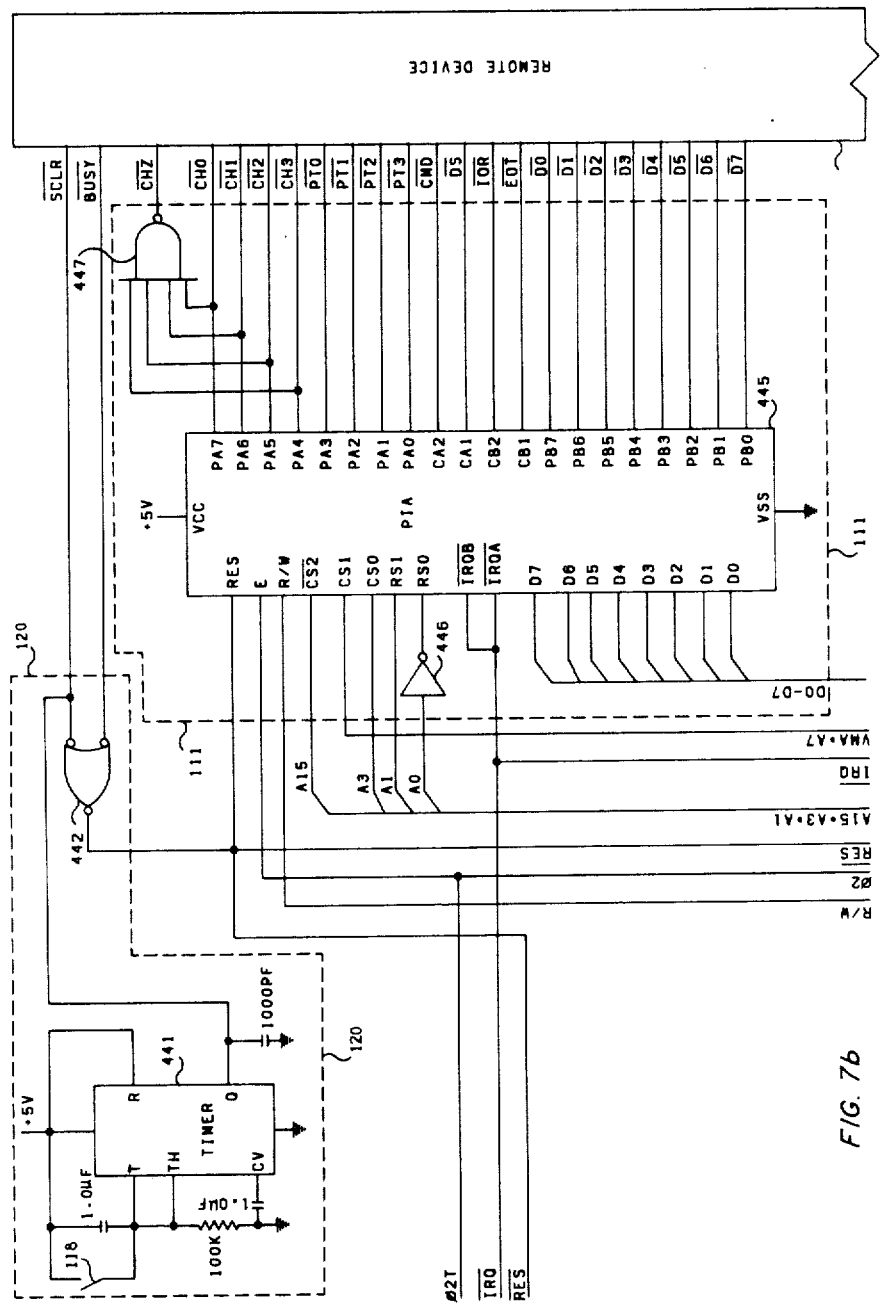
Figure 7C:
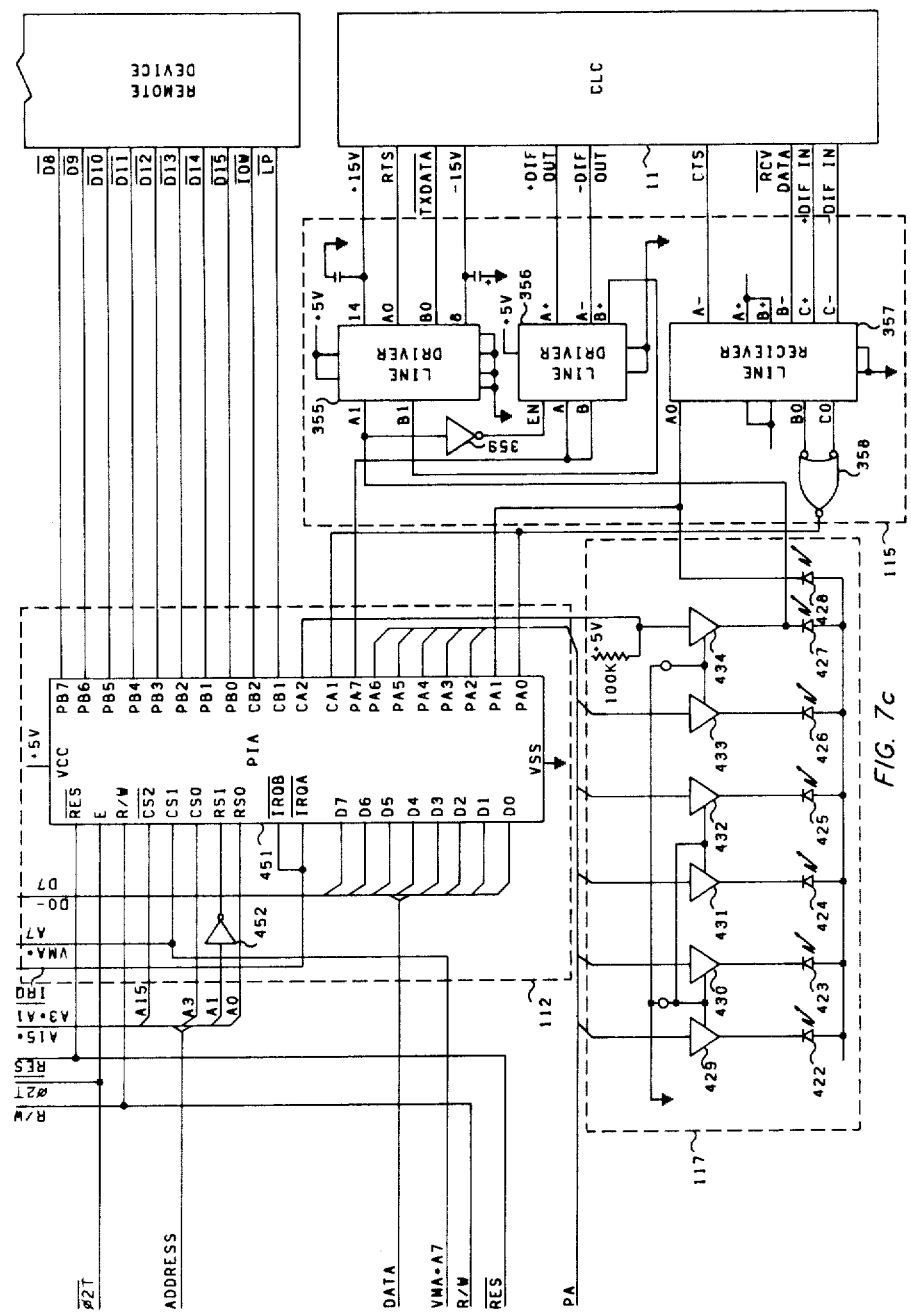

FIGS. 5a–f are a detailed schematic of the CLC illustrated in FIG. 2;

FIG. 6 is an illustration of the manner in which FIGS. 5a–f should be combined to make a complete schematic;

FIGS. 7a–c are a detailed schematic of the RDC illustrated in FIG. 4; and

Figure 8:
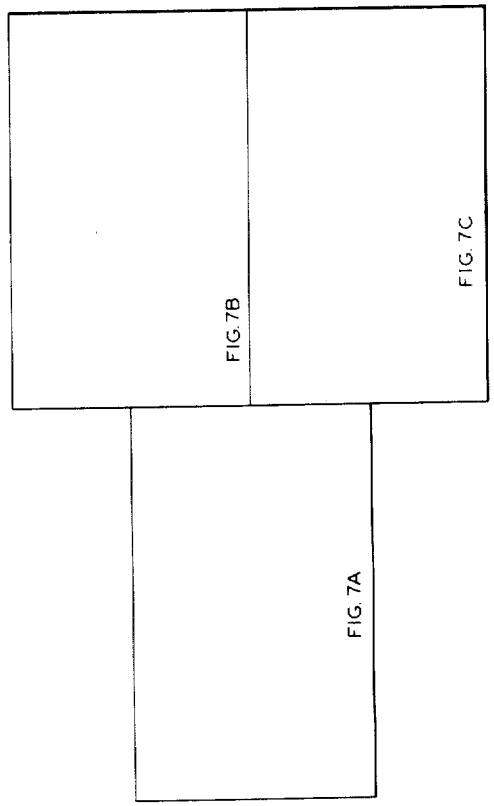

FIG. 8 is an illustration of the manner in which FIGS. 7a–c should be combined to make a complete schematic.

The present invention is described in terms of the Optrol 3600 Process I/O system manufactured by Applied Automation Inc., Bartlesville, Oklahoma for which the present invention was designed to be incorporated. However, the invention can be utilized in any serial line communication system.

The invention is described in terms of specific electronic components and specific computer systems. However, the invention is applicable to different electronic circuit configurations which carry out the purpose of the present invention and is also applicable to different circuit components and different computer systems which are supplied by a plurality of vendors.

Figure 1:
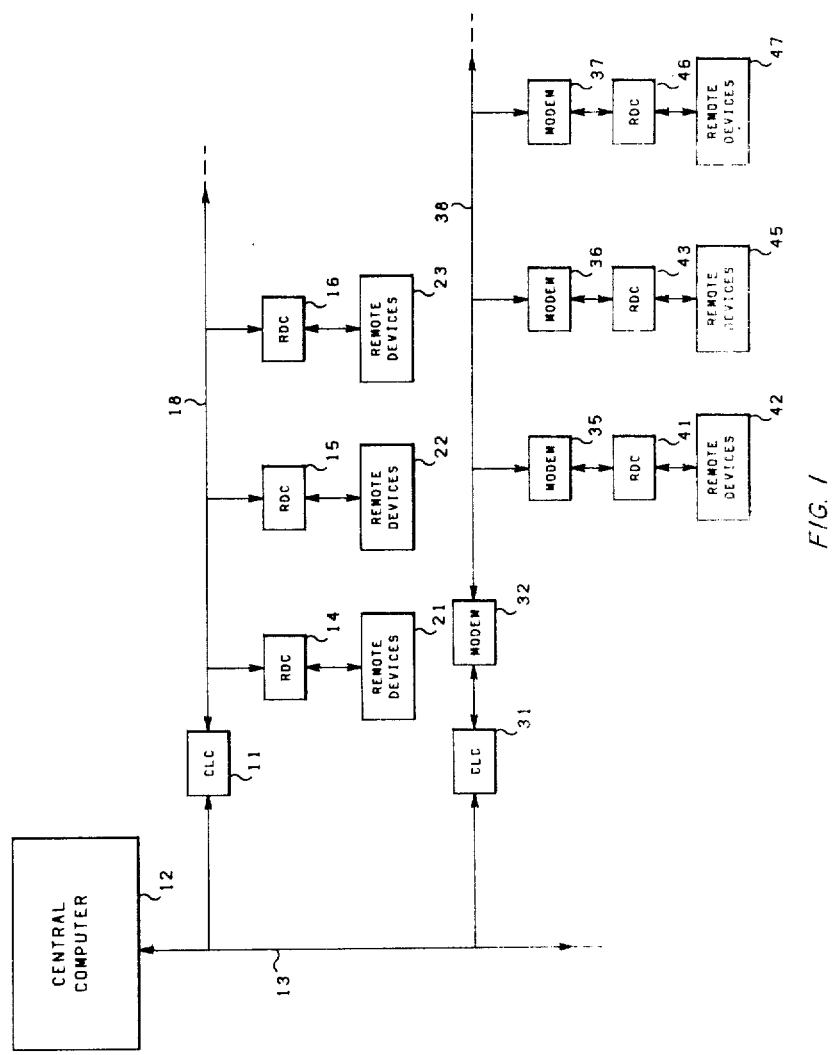
FIG. 1 is a block diagram of the serial line communication system of the present invention.

Referring now to FIG. 1, a communication system incorporated in the present invention is illustrated. The CLC 11 is interfaced to the central computer 12. The CLC 11 is connected to a plurality of RDCs 14, 15 and 16 by the serial transmission line 18. The serial transmission line 18 is preferably a twisted, shielded pair of wires. Modulators/demodulators (modems) are not required if the RDCs are located less than about ten thousand feet from the CLC 11. The RDC 14 is connected to the remote devices 21 which may be either a single remote device or a plurality of remote devices. In like manner RDC 15 is connected to the remote devices 22 and RDC 16 is connected to the remote devices 23.

The CLC 31 is connected to the central computer 12 by means of the computer bus 13. The CLC 31 is electrically connected to the modem 32. The modem 32 is connected to a plurality of modems 35, 36 and 37 by the serial communications line 38. The serial communications line 38 is preferably a telephone line which can be utilized to connect modems which are widely separated. The modem 35 is electrically connected to the RDC 41. The RDC 41 is electrically connected to the remote devices 42. In like manner, the modem 36 is connected to the RDC 43 and the RDC 43 is connected to the remote devices 45. Also the modem 37 is electrically connected to the RDC 46 and the RDC 46 is electrically connected to the remote devices 47. The modems 32, 35, 36, and 37 are preferably Optrol 3600 Modems manufactured by Applied Automation, Inc., Bartlesville, Oklahoma.

The CLC 11 and CLC 31 are identical. RDCs 14, 15, 16, 41, 43 and 46 are also identical. The invention will be described in terms of only one CLC and one RDC. However, this description is applicable to all of the CLCs and RDCs illustrated in FIG. 1. A larger or smaller number of RDC's and CLC's, than that illustrated in FIG. 1, could be utilized in a communication system if desired.

The following is a typical operational sequence for the communication system illustrated in FIG. 1. The CLC 11 receives commands and a message from the central computer 12. The CLC 11 formats the message as will be more fully described hereinafter. After the CLC 11 processes the message from the central computer 12, the formatted message is sent by means of the serial transmission line 18 to the RDC 14.

The RDC 14 is continually monitoring the serial transmission line 18. When the serial transmission line 18 goes active, the RDC 14 times and compares symmetry of the sync pattern which was established by the CLC 11. Based on the time required for the sync pattern, the RDC 14 determines the bit rate at which the message is being transmitted by the CLC 11. The message is received by the RDC at the determined bit rate and the BCH error detection code which was generated by the CLC 11 is checked. If no errors are detected and the RDC 14 detects its own address message, the RDC 14 will execute the command part of the message from the central computer 12. This execution will usually involve reading data from the remote devices 21 or some similar operation. The data from the remote devices 21 will then be generally transferred back from the RDC 14 through the CLC 11 to the central computer 12. The data or message from the RDC 14 is transmitted at the same bit rate and in the same format as the received message.

If the CLC 11 expected a reply from the RDC 14 and either did not get a reply or the reply contained an error, the CLC 11 will retransmit the message at the same bit rate. If the error persists, the CLC 11 will lower the bit rate and try once more. Many times a serial transmission line which is inoperative at a higher primary baud rate is operative at the lower bit rate. If the shift to the lower bit rate eliminates the error, the data or message from the RDC 14 is transferred to the central computer 12 and the CLC 11 automatically shifts back to the higher primary bit rate. If the shift to the lower secondary rate does not eliminate the error, the CLC 11 interrupts the central computer 12 and thus notifies the central computer 12 that a transmission problem exists.

The central computer 12 can transmit a command or message to any RDC simply by addressing that particular RDC. Since all of the RDCs can control a plurality of remote devices, the central computer must also provide the particular address of the remote device from which data or performance is required. A single central computer system can thus gather data from a very large number of remote devices simply by cyclically addressing all of the remote devices.

The CLC 11, which is illustrated in FIG. 1, is more fully illustrated in FIG. 2. Referring now to FIG. 2, the microprocessor (MPU) 51 is preferably an MC6800 Microprocessor manufactured by Motorola Semiconductor. The microprocessor 51 performs all arithmetic, logic and control functions for the CLC 11. The microprocessor 51 is an 8-bit microprocessor which has an 8-bit bidirectional data bus 54 and a 16-bit address bus 55. The microprocessor 51 communicates with the remaining circuits of the CLC 11 via the address bus 55 and the data bus 54. Hexadecimal addressing is used.

The microprocessor clock 52 is preferably an MC6870A manufactured by Motorola Semiconductor. The microprocessor clock 52 provides the clock signals required by the microprocessor 51.

The read-only memory 57 is made up of two 512×8 programmed read-only memories (ROM) which are preferably 93448 ROM's manufactured by Fairchild Semiconductor. The read-only memory 57 is addressed from locations FC00 to FFFF. The read-only memory 57 contains the sequential program instructions which the microprocessor 51 uses to perform its various tasks.

The random access memory (RAM) 59 consists of one 128×8 bit static semiconductor memory which is addressed from 0000 through 007F. The RAM 59 is preferably an MC6810 manufactured by Motorola Semiconductor. In addition to the assigned memory location which are addressed by the hexadecimal address 0000 through 007F, the RAM 59 contains a variable length stack starting at location 007F and extending toward location 0026. The variable length stack is used by the microprocessor 51 for temporary address and data storage. The RAM 59 is used as a scratch-pad memory by the microprocessor 51. The microprocessor 51 stores variable data in the RAM 59 such as data to be transmitted, data received and the baud rate at which the data is to be transmitted.

The output register file 61 and the input register file 62 interface the microprocessor 51 to the 16-bit data bus of the central computer 12 which is illustrated in FIG. 1. The register files are made up of a plurality of 74LS170 registers manufactured by National Semiconductor. The register files are arranged in two groups having a 4×16 bit storage area. The output register file 61 contains data which is to be presented to the data bus of the central computer 12. The input register files contain data received from the central computer 12. The output register file 61 and the input register file 62 may be written into and read from simultaneously thereby providing a high speed asynchronous interface to the central computer 12.

The output register file 61 and the input register file 62 act as a data storage buffer between the central computer 12 and the data bus 54 and the address bus 55 of the microprocessor 51. The register files store four 16-bit words. The output register file is an open collector output file which is written into by the microprocessor 51. The input register file is a 3-state output file which is read by the microprocessor 51. The inputs and outputs of the output register file 61 and the input register file 62 are isolated so that read and write operations may be performed without synchronization of the bus line from the central computer 12 and the data bus 54 and address bus 55 of the microprocessor 51. The output register files and the input register files are addressed at location 00F0-00F7.

The address decoder 64 compares the address from the central computer 12 to the address which has been preset in the address pack 65. When the central computer 12 is addressing the CLC 11, the address decoder 64 selects the proper register file and either gates the data from the central computer 12 into the input register file 62 or gates the data which is in the output register file 61 onto the data bus of the central computer 12. The address decoder 64 works independently of the microprocessor 51.

The baud rate pack 67 provides a means by which the primary and secondary baud rates for the CLC can be set. Options available are 9600 baud, 4800 baud, 2400 baud, 1200 baud, 600 baud, 300 baud and 150 baud. If the baud rate pack is set to a band rate of 1200, then the secondary baud rate will be 600 baud. Obviously other baud rates could be utilized if desired but the foregoing baud rates are presently preferred.

The serial line interface 69 converts the serial line voltages to transistor-transistor logic (TTL) levels of zero volts and +5 volts and also converts the TTL levels from the peripheral interface adapter 74 to voltages acceptable to the serial line. Either the RS232 or the differential (RS422) will be used for communication. Request to send (RTS) and clear to send (CTS) are modem control signals.

The status indicators 71 are a group of light emitting diodes (LED) which display self-test information as well as operational information in visual form to the operator. The LEDs are labeled for reset, self-test and operation.

The peripheral interface adapter (PIA) 74 provides the interface between the input/output (I/O) options of the CLC 11 and the microprocessor 51. The PIA 74 is preferably a MC6820 PIA manufactured by Motorola Semiconductor. The PIA 74 is a programmable I/O device which resides at memory location 00F8, 00F9, 00FA, and 00FB. Location 00F8 is the A side peripheral I/O port (PAs). Location 00F9 is the A side control register (CAs). Location 00FA is the B side peripheral I/O port (PBs). Location 00FB is the B side control register (CBs).

Since the PIA address is not fully decoded, images of the PIA reside at multiple memory locations. One of these images, 70F8, is used in reading the address pack 65. The A side of the PIA is used primarily for serial line communication and visual status indication. The B side of the PIA is used primarily for interfacing to the central computer 12 and reading the baud rate pack 67.

The A side of the PIA 74 is used first at power on or reset to read the contents of the address pack 65. The PAs are programmed as inputs. When the microprocessor 51 reads the PA image at location 70F8, the contents of the address pack are gated onto the PA lines at D5 through D2. After the reset sequence, the serial data output (TX) is programmed as an output and clear to send (CTS) and the serial data input (RX) are programmed as inputs. The status indicators are programmed as inputs except when one of the LED's is to be lit.

The A side control register (CAs) has D7 dedicated to the serial data input (RX). This is the same RX signal found on D0 of the PAs. The difference is that the CA input is edge sensitive while the PA input is level sensitive. The direction of the CA edge sensitivity is controlled by CA bits D1 and D0. When detecting a sync pattern, this edge sensitivity is programmed to detect the edges of the sync bits. After detecting the sync pattern, the serial data is sampled at the center of each bit cell at the RX input on the PAs. The CA bit D6 is programmed as an output via the request to send (RTS) control register bits D5 through D3. The RTS output is also programmed to be a high or low level through the RTS control register bits.

The B side of the PIA 74 is used to interface some of the central computer 12 control signals to the microprocessor 51. The B side of the PIA is also used to interface the baud rate pack 67 to the microprocessor 51. After each completed transmit/receive sequence, the microprocessor 51 reads the baud rate pack 67 at location 00FA bits D4 through D1. This provides a resetting of the proper baud rate in case the microprocessor 51 has shifted baud rates in a retry attempt. The PBs associated with the baud rate pack are always used as inputs.

The address decoding circuitry 64 will set flip-flop 76 when an input/output write (IOW) or an input/output read (IOR) occurs. The transmit input on D7 of the PBs notifies the microprocessor 51 that the central computer 12 has loaded all necessary data into the input register file 62 and transmission to the RDC should begin. This input also causes the microprocessor 51 to clear the status register of the PIA 74. The point 2 (PT2) IOR input of the PBs is used to notify the microprocessor 51 that the central computer 12 has read the data in the output register file 61. It is this bit which the microprocessor 51 interrogates prior to setting the data overrun error in the status registers of the PIA 74. The PT2 IOR bit also causes the MPU to clear the status register after the central computer 12 has read the data from the output register file 61. Once the flip-flop 76 has been set by the address decoding circuitry 64, the microprocessor 51 clears the flip-flop 76 by pulsing the clear output on D5 of the PBs.

The D0 output of the PBs is used to enable the end of transmission (EOT) output when the CLC 11 is addressed. When the CLC 11 is busy, the D0 output of the PBs is set to a "1".

The B side control register is used for the attention (ATN) interrupt interface to the central computer 12. D6 of the CBs is programmed as an output which, after being set low, will return to high when the ATN CLR bit is set. Bit D7 of the PBs is programmed to respond to a falling edge on the ATN CLR line. When the central computer 12 writes to channel 00, the address decoding hardware creates an ATN CLR pulse if the central computer 12 is trying to clear the ATN line. This pulse clears the ATN line and causes an interrupt to the microprocessor 51.

A typical operational sequence for the CLC illustrated in FIG. 2 is as follows. When the reset switch 81, which is associated with the reset circuit 82, is depressed or the system clear (SCLR) line is activated, the reset line 83 drops to a low level (0 volts). This low level resets and clears the peripheral interface adapter 74 and gates the address selected by the address pack 65 onto the status indicator 71 to allow the operator to verify proper addressing. The address will appear in binary form on the LEDs marked LS, address and MS on the reset line. The address will be displayed as long as the reset line 83 is held low.

When the reset switch is released or the system clear line is deactivated, the reset line 83 returns to high allowing the microprocessor 51 to retrieve the restart interrupt vector from the read-only memory 57. The microprocessor 51 then executes the reset initialization program for the CLC illustrated in FIG. 2. This same reset initialization sequence is performed when power is applied to the CLC.

At the beginning of the reset initialization, the microprocessor 51 programs the status indicator bits of the PIA 74 as low outputs. This turns on all of the LEDs located on the status indicator 71 to verify that all of the LEDs light.

The microprocessor 51 then executes a self-test program which tests the read-only memory 57, the random access memory 59, the peripheral interface adapter 74 and the serial communication line. The results of the test are displayed at the status indicator 71.

The random access memory locations 0000 through 007F are tested by writing an incrementing data pattern in each location and then reading that location to verify the contents. On the first pass, the contents of each RAM location contains its address. On the second pass, the contents of each RAM location contains its address plus one. This process is continued until 128 passes have been made. Should the contents of a RAM location not correspond to what was written into it, the test fails and the LEDs labeled "RAM" and "FAIL" on the self-test line will be lit.

The PIA 74, the serial communication line interface 69 and the serial communication line are tested together. This test requires that the serial communication line have at least one operational RDC on it. The microprocessor 51 reads the baud rate pack 67 and determines the serial communication line baud rate. Starting with RDC address 1, the CLC transmits a test pattern to the RDC. If no response is received, the CLC will try the next RDC address until all of the RDCs have been tried. If any addressed RDC responds, the test passes. If no RDC responds, the test fails and the LEDs labeled "COM LINE" and "FAIL" will be lit on the status indicator 71. The test will fail on any of the following conditions:

(1) No clear to send (CTS) is received on the serial communication line;
(2) No operational RDC is attached to the serial communication line;
(3) A communication line failure such as an inoperable serial communication line or an inoperable modem;
(4) The wrong baud rate back has been set up;
(5) A defective peripheral interface adapter 74; or
(6) A defective chip in the serial interface 69.

When all of the preceding tests have passed, the microprocessor 51 will turn off all of the LEDs on the status indicator 71 except the LED labeled "PASS" on the self-test line. The PASS LED will stay lit for about 4 seconds indicating that the CLC has passed the self-test portion of the reset initialization.

After a successful self-test, the microprocessor 51 will read the contents of the address pack 65. This number, which is the address of the CLC, is stored in the random access memory 59 for future reference and will not be changed unless a reset sequence is initiated. The CLC will then enter a waiting state in which the CLC waits for a command from the central computer 12 which tells the CLC that data has been loaded into the input register file 62 for transmission to an RDC. The central computer 12 initiates the activity of the CLC by checking the status of the CLC. If the CLC is not busy, the central computer 12 writes the data to be transmitted, if any, into the input register file 62 of the CLC. The central computer 12 then writes the operational code, the RDC address, and the remote device address into the input register file 62 of the CLC.

Upon receipt of a transmitted command, the microprocessor 51 sets the request-to-send (RTS) signal, clears the end-of-task (EOT) signal and sets a line-busy bit in the status register of the PIA 74. While waiting for the clear-to-send signal from the serial communication line, the microprocessor 51 transfers the data to be transmitted from the input register file 62 to the random access memory 59. If the clear-to-send signal has not been returned within 100 milliseconds, the microprocessor 51 will set the no clear-to-send bit in the status register of the peripheral interface adapter 74 and if enabled will interrupt the central computer 12 and wait for a new instruction.

If the clear-to-send has been received, the microprocessor 51 will transmit the message in the format shown in Table I.

TABLE I

| Bits | Definition |
|---|---|
| 0-3 | 4-bit sync pattern |
| 4-6 | 3-bit operational code |
| 7-11 | 5-bit RDC address |
| 12-15 | 4-bit remote device channel address |
| 16-19 | 4-bit remote device point address |
| 20-35 | 16-bit data field |
| 36-43 | 7-bit BCH character plus one stop bit |

The first four bits consist of a 4-bit sync pattern. The sync pattern consists of three level changes in the serial line. The first level change is from the inactive mark condition to the space condition. This space condition is maintained for 1.5 bit times. The line then transmits to a mark condition for 1.5 bit times and then returns to a space condition for 1.0 bit times.

Following the sync pattern is a 3-bit operational code (Opcode). The operational codes and data formats are set forth in Table II where C/A is representative of command/address.

TABLE II
OPCODES AND DATA FORMATS

| Opcodes | Function | Data RCVD | Data XMTD | Bus Control |
|---|---|---|---|---|
| 0 | Write/No Echo | C/A and data | None | IOW |
| 1 | Write/Echo | C/A and data | C/A only | IOW |
| 2 | Write/Read | C/A and data | C/A and data | IOW/IOR |
| 3 | Test | C/A and data | C/A and data | — |
| 4 | Read | C/A only | C/A and data | IOR |
| 5 | Stream | C/A only | C/A and data | IOR |
| 6 | Block | C/A only | C/A and data | IOR |
| 7 | Not assigned | — | — | — |

The functions set forth in Table II are further defined as follows:

Op Code 0—Write/No Echo—The RDC selects the remote device and writes data to it. Since no transmission is required to the CLC, the RDC goes to Wait for Sync.

Op Code 1—Write/Echo—The RDC selects the remote device and writes data to it. The RDC then transmits the C/A portion of the message to the CLC and goes to Wait for Sync.

Op Code 2—Write/Read—The RDC selects the remote device and writes data to it. The RDC then reads the device, transmits the C/A and data portions to the CLC and goes to Wait for Sync.

Op Code 3—Test—The RDC transmits the received data back to the CLC with no output to the Remote Device Bus. The RDC then goes to Wait for Sync.

Op Code 4—Read—The RDC selects the device and reads its data. The RDC then transmits the C/A and data portions to the CLC and goes to Wait for Sync.

Op Code 5—Stream—The Stream Op Code requires the RDC to read data from each available point between the channels designated in the channel address and point address fields of the received message. The channel address is the starting channel and the point address is the ending channel. For example; channel address=3, point address 9 is received with op code 5. The RDC starts reading at Channel 3 Point O and finishes with Channel 9 Point F.

The RDC successively selects each device point reads its data and transmits the C/A and data portion to the CLC. After the last point is selected and read, the RDC sets the end of data (EOD) bit, transmits the C/A and data and goes to Wait for Sync.

Op Code 6—Block—The Block op code requires the RDC to read the addressed channel and point 255 times or until the device indicates it has no more data by setting the Last Point (LP) line of the Device Bus. The RDC selects the device. It then reads the device data and transmits that data to the CLC. The read and transmit sequence is repeated 255 times or until the device sets LP, whichever comes first. The last transmission will contain an EOD status bit. The RDC then goes to Wait for Sync.

Op Code 7—Unassigned—The RDC will take no action except to go to Wait for Sync.

The operational code is followed by a 5-bit RDC address, a 4-bit channel and a 4-bit point address of the remote device, a 16-bit data field and a 7-bit BCH field followed by a 1-bit stop code.

Figure 3:
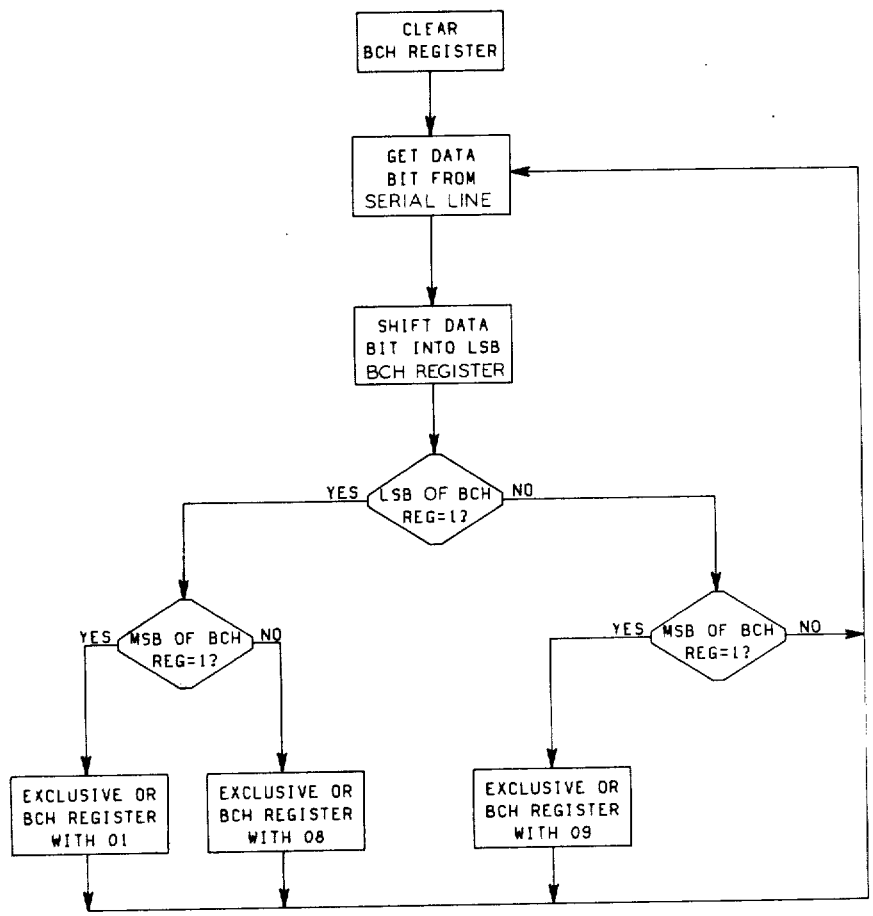
FIG. 3 is a logic flow diagram for the generation of the BCH error detection code.

As the microprocessor 51 shifts each message bit onto the serial line, it computes the BCH error detection code. The BCH polynomial is $X^7+X^3+1$. FIG. 3 illustrates a computer flow diagram for the generation of the BCH error detection code.

Referring to FIG. 3, the program is initialized by clearing the BCH register such that all of the bits in the register are zero. The BCH register may be considered as an 8-bit shift register. A data bit is then obtained and is shifted into the least significant bit of the BCH register. Assuming that the data bit was a 1, the program will branch in the YES direction and will then ask if the most significant bit of the BCH register is equal to 1. The most significant bit of the BCH register will be equal to zero and thus the contents of the BCH register will be exclusive with a ORed hexadecimal 08. The output is essentially 00001001. A second data bit is then obtained and shifted into the least significant bit of the BCH register. Assuming that this time the data bit is zero, the program will branch in the NO direction and will again ascertain whether the most significant bit of the BCH register is equal to 1. Since the most significant bit is still equal to zero, the program will return to the get data bit from the serial line block with the status of the BCH register being 00010010. This process is continued until the most significant of the BCH register is equal to 1 at which time the contents of the BCH register can be exclusive ORed with a hexadecimal 01 or a hexadecimal 09 depending upon whether the data bit is a zero or 1. This process is continued until the entire BCH polynomial has been generated for use as an error detection code.

When the transmission is complete, the microprocessor 51 sets the transmission complete bit in the status register of the peripheral interface adapter 74. If no response from the RDC is expected, the microprocessor 51 will clear the "line busy" status bit of the peripheral interface adapter 74 and return to a waiting status until a new instruction is received from the central computer 12.

If a response from the RDC is expected, the CLC will wait 100 milliseconds for the RDC to respond. If no response is received, the CLC will retransmit the message and wait 100 milliseconds for a response. If again no response is received, the CLC will drop the baud rate to the next lower baud rate and retransmit. If no response is received at the lower baud rate, the microprocessor 51 will reset the baud rate to the baud rate pack 67 setting, set the no response bit on the status register of the peripheral interface adapter 74 and if enabled will interrupt the central computer 12. The microprocessor 51 then enters a waiting state until a new instruction is received from the central computer 12.

If the RDC responds, the CLC will check the sync pattern, receive the message and check the appended BCH code. If the BCH is in error, the CLC will retry as in the no response condition. If the error persists, the BCH error bit will be set in the status register of the PIA and if enabled, the microprocessor 51 will again interrupt the central computer 12. The CLC would then return to a waiting state to await new instructions from the central computer 12.

If the received message from the RDC had no errors, the CLC will store the received message in the output register file 61, will set the received complete bit in the status registers of the peripheral interface adapter 74 and in the output register files and, if enabled, will interrupt the central computer 12. The central computer 12 reads the status of the output register files and reads the received message in the output register files. The microprocessor 51 also lights LEDs for request-to-send (RTS), clear-to-send (CTS), line busy, no response error (NO RES), BCH error (BCH ERR), data overrun error (DATA ORUN), and sync detection (SYN DET).

The RDCs 14, 15, 16, 41, 43 and 46, which are illustrated in FIG. 1, are more fully illustrated in FIG. 4. Referring now to FIG. 4, the microprocessor 101, which is preferably a MC-6800 microprocessor manufactured by Motorola Semiconductor, performs all the arithmetic, logic and control functions for the RDC. The microprocessor 101 has an 8 bit bidirectional data bus 102 and a 16 bit address bus 103. The microprocessor 101 communicates with the other parts of the RDC by means of the data bus 102 and the address bus 103. The microprocessor 101 detects serial line activity, determines the baud rate, checks for the proper sync pattern, receives the data, computes and checks the BCH code, checks for the proper remote unit address, and determines the RDC response by coding the operational code. If the operational code requires it, the microprocessor 101 transmits data back to the CLC and then waits for another sync code.

The microprocessor clock 104, which is preferably an M6870A manufactured by Motorola Semiconductor, supplies the clock signals required by the microprocessor 101.

The read-only (ROM) memory 106 contains the sequential program instructions which the microprocessor 101 uses to perform its various tasks. The read-only memory 106 is made up of two 512 × 8 program read-only memories which are preferably Model 93448 manufactured by Fairchild Semiconductor. The read-only memory 106 is addressed from location FC00 to FFFF.

The random access memory (RAM) 108 is used as a scratch pad memory by the microprocessor 101. The microprocessor 101 stores variable data in the random access memory such as received serial data, transmit data and the baud rate. The random access memory 108 consists of one 128 × 8 bit static semiconductor memory which is preferably an MC6810 manufactured by Motorola Semiconductor. The random access memory 108 is addressed from locations 0000 through 007F. In addition to the assigned memory locations located at 0000 through 007F, the random access memory 108 also contains a variable length stack starting at location 007F and extending toward location 0020. The variable length stack is used by the microprocessor 101 for temporary address data storage.

Two peripheral interface adaptors 111 and 112 are used to interface the remote device and the serial line to the RDC. The peripheral interface adapters 111 and 112 are preferably MC6820 manufactured by Motorola Semiconductor. The peripheral interface adapters 111 and 112 handle all input/output operations of the RDC. The peripheral interface adapters are treated as memory location 00F4 through 00FB. All microprocessor operations on the PIAs are addressed to these locations with the exception of reading the address pack 114 which contains the unit address of the RDC. The address pack 114 is read at the PIA image address of 70FA during initialization of the system. The PIA 111 is addressed at locations 00F4-00F7. The PIA 112 is addressed at locations 00F8-00FB.

The received (RX) data is found on both bit position 0 of 00FA and bit position 7 of 00FB. This allows the microprocessor 101 to scan the receive data line via 00FA or be interrupted by the falling edge of the receive data from location 00FB.

The initialization routines for the peripheral interface adapters 111 and 112 is as follows:
(A). Location 00F4 is programmed to detect a falling edge on D select ($\overline{DS}$), and command ($\overline{CMD}$) is programmed as a high output.
(B). Location 00F5 is programmed as outputs. These outputs are high except during device selection.
(C). Location 00F6 is programmed to detect a falling edge on $\overline{EOT}$, and $\overline{IOR}$ is programmed as a high output.
(D). Location 00F7 and 00F8 are programmed as inputs or outputs at the time they are needed for data transfer on the device bus.
(E). Location 00F9 is programmed to detect a falling edge on ($\overline{LP}$), and $\overline{IOW}$ is programmed as a high output.
(F). Location 00FA is read at its image location 70FA to get the remote unit address. Except when being used as an output all bit positions are programmed as inputs.
(G). Location 00FB is programmed to detect a falling edge on Received data, and RTS is programmed as a normally high output.

The serial line interface 115 provides a means for interfacing the serial line to the RDC. The serial line interface 115 converts the serial line voltage levels to TTL (0 volts and +5 volts) levels and also converts the TTL levels from the RDC into the voltage levels required by the serial line.

The status indicators 117 are a group of light emitting diodes which display self-test information as well as operational information. By depressing the reset switch 118, the light emitting diodes labeled LS, ADDRESS and MS on the reset line will display the RDC unit address. Upon releasing the reset switch 118, all of the LEDs associated with the status indicators 117 should light verifying that LEDs are operational.

During the time that all LEDs are lit, the RDC is executing a self-test. If a failure occurs during the test, the RDC will light the fail LED and the diagnostic LED on the self-test line. Tests are made on the read-only memory 106, the random access memory 108, the peripheral interface adapters 111 and 112 and the serial communication line. If no failures occur, the LED labeled "pass" will light and will stay lit for approximately 4 seconds. At that time, the RDC will enter into the operate mode and establish a baud rate after the serial line has been inactive for at least one second.

An operational sequence for the RDC illustrated in FIG. 4 is as follows. When the reset switch 118 is depressed, the reset line 119 drops to a low level (0 volts). This low level produces a "system clear" (SCLR) signal on the bus to the remote device which resets all attached remote devices. The reset signal 119 also gates the address selected by the address pack 114 onto the status indicators 117 to allow the operator to verify proper addressing. The address will appear in binary form on the LEDs marked ROM, RAM, PIA, PASS and FAIL. The LEDs marked FAIL and ROM are the most and least significant bits of the address, respectively. A low level on the reset line also causes the peripheral interface adapters 111 and 112 to be reset with all lines programmed as inputs.

When the reset switch 118 is released, the microprocessor 101 retrieves the reset interrupt vector from the read-only memory 106 and proceeds to execute the reset initialization program. This same reset initialization sequence is performed when power is applied to the RDC. At the beginning of the reset initialization program, the microprocessor 101 programs the status indicator bits of the peripheral interface adapter 112 as low outputs. This turns all of the LEDs on the status indicators 117 on so that the operator can verify that all of the LEDs do light.

After the test of the LEDs associated with the status indicator 117 is completed, the microprocessor 101 executes a self-test program which tests the read-only memory 106, the random access memory 108, the peripheral interface adapters 111 and 112 and the device bus which connects the remote device to the RDC. The two 512×8 read-only memory chips which are associated with the read-only memory 106 are tested separately. The contents of each location in the read-only memory is added together to produce a sum which is compared to an established check sum. If the sum and the check sum are the same, the test passes. If not, the LEDs labeled ROM and FAIL on the self-test line of the status indicator 117 will be lit if the error was in the read-only memory at address FEOO-FFFF. The LEDs labeled ROM, FAIL and CTS will be lit if the error was in the read-only memory 106 at addresses FCOO-FDFF.

Location 0000-007F of the random access memory 108 are tested by writing an incrementing data pattern in each location. Each memory location is then read to verify the contents. On the first pass, the contents of each random access memory location will contain its address. On the second pass, the contents of each random access memory location will contain its address plus one. This process is continued until 128 passes have been made. Should the contents of a RAM location not correspond to what was written into it, the test fails and the LEDs labeled RAM and FAIL on the status indicator 117 will be lit.

The PIAs 111 and 112 and the device bus which interfaces the remote device to the RDC are tested together. This test selectively programs the PIA bits as inputs and outputs checking for individuality and programmability. If the test fails, the microprocessor will light the LEDs labeled PIA and FAIL on the status indicator 117.

When all of the preceding tests have been passed, the microprocessor will turn off all of the LEDs except the LED labeled PASS on the status indicator 117. The PASS LED will stay lit for approximately 4 seconds.

After a successful self-test, the microprocessor 101 will read the contents of the address pack 114. This number is stored in the random access memory 108 as "my address" and is not changed unless a reset sequence is initiated. The peripheral interface adapters 111 and 112 are initialized for future device bus operations and for serial line communication.

The microprocessor 101 acquires a serial line baud rate automatically by timing the sync bits at the beginning of a message or using a previously established baud rate. To prevent erroneous reception after reset, the RDC waits for the serial line to be inactive, in mark condition for approximately 100 milliseconds. If the serial line has been inactive for approximately 100 milliseconds after a reset or 10 milliseconds after the last activity, the RDC will compute a new baud rate. The RDC will wait in this state scanning the serial line for a space condition to occur.

All communication on the serial line is initiated by the CLC. A message having the format previously described in conjunction with the description of the CLC is received by the RDC. In order to establish the baud rate of the serial message, the RDC times the duration of the sync bits which precede the message from the CLC. When the serial line transits from the inactive mark condition to the space condition of the first pulse of the sync bits, the microprocessor starts counting the number of microseconds to the next mark condition. This elapse time is used to determine the probable baud rate as set forth in Table III.

TABLE III

| AUTOMATIC BAUD RATE DETERMINATION | |
|---|---|
| Bit Time (μ sec) | Baud Rate |
| 104 | 9600 |
| 208 | 4800 |
| 416 | 2400 |
| 556 | 1800 |
| 832 | 1200 |
| 1666 | 600 |
| 3333 | 300 |
| 5000 | 200 |
| 6667 | 150 |
| 7435 | 134.5 |
| 9091 | 110 |
| 13333 | 75 |
| 20000 | 50 |

The microprocessor 101 stores the probable baud rate as the established baud rate and lights the sync detect (SYNDET) LED on the status indicator 117. The established baud rate may be used in future communications with the CLC. If a sync pattern was not valid, the microprocessor lights the sync error (SYNERR) LED on the status indicator 17 and goes to a waiting condition.

Having determined the baud rate, the microprocessor 101 samples the serial line in the center of each bit cell. As each bit is sampled, it is shifted into a location in the random access memory 108 to form a parallel word. Each bit is also used to update the BCH check code. The BCH check code is generated in the same manner as illustrated in FIG. 3.

After the microprocessor 101 has received the commands and address and/or data portion of the message, the computed BCH code is stored and the 7 bit BCH code generated by the CLC is received. The computed BCH code is compared to the receive BCH code to verify that no errors occurred in the serial transmission. If the BCH codes are not the same, the microprocessor 101 lights the BCH error (BCHERR) LED on the status indicator 117 and goes to a waiting condition.

If the message is valid, the RDC checks the remote unit address field against the address read from the address pack. If they are the same, the my address (MYADD) LED on the status indicator 117 is lit. Otherwise the microprocessor 101 goes to a waiting condition.

The microprocessor 101 determines the action to be taken by decoding the operational code portion of the received message. These actions are set forth in Table II which has been previously described.

To select a remote device, the RDC generally places the channel and point address of the remote device, as received, on the device bus. The RDC then pulses the command (CMD) line and checks for device selected (DS). If the device does not respond with DS, the RDC lights the device unavailable (DEV UNA) LED on the status indicator 117 and sets the device unavailable (DU) bit for transmission to the CLC.

If the DS line was set, the end of task (EOT) line will be checked. If the EOT line is not set, the RDC will wait 26.7 milliseconds for it to be set. If not set in that time, the RDC will light the device unavailable LED on the status indicator 117 and set the error (ERR) bit for transmission to the CLC. If DS and EOT are both set, the device is selected and the RDC may continue processing the operational code. The device will be deselected after the operational code has been processed.

When the operational code requires a write, the microprocessor 101 programs the direction of the device bus data line as outputs. The received data is placed on the lines and the IOW line is pulsed. When the operational code requires a read, the microprocessor 101 programs the direction of the device bus data lines as inputs. The IOR signal is set and the data is read and placed in the random access memory 108. The IOR line is then cleared.

When the operational code requires the RDC to return a message to the CLC, the microprocessor 101 sets the request to send (RTS) signal and waits for a clear to send (CTS) signal to be returned. The microprocessor 101 determines, from the received operational code, the number of bits to be transmitted of status, address or data. When the CTS signal is received by the RDC, the microprocessor 101 generates a sync pattern and transmits the requested data at the established baud rate. As each bit is being shifted on to the serial line, the microprocessor computes the BCH error detection code as has been previously described. The computed BCH error detection code is appended to the end of the transmission. When the transmission is complete, the microprocessor 101 clears the RTS signal, deselects the selected device and goes to wait for sync condition.

Once the microprocessor has finished the job required by the operational code, it waits for the CLC to initiate another message. The microprocessor 101 enables the serial line activity to interrupt it. The microprocessor 101 will wait to be interrupted for about 10 milliseconds. If the interrupt occurs within that period, the microprocessor 101 will time the sync bits to be within 0.375 bit time of the previous established baud rate. If the sync pattern is valid, the microprocessor will proceed to receive the serial message. If the sync pattern is not valid, the microprocessor will return to a wait for sync condition. If the serial line was inactive for over 10 milliseconds, the microprocessor 101 disables the serial line interrupt and proceeds to a wait for sync condition.

Referring now to FIGS. 5a and 5b, the microprocessor 51, illustrated in FIG. 2, includes the MC6800 microprocessor 201 together with NAND gate 202 and 203 and the AND gate 204 which are interfaced as is illustrated in FIG. 5b. The microprocessor 51 is also considered to include the decoder 209, the inverters 205 and 207 and the AND gates 210a-210d all of which are illustrated in FIG. 5a.

The reset switch 81 is interfaced to the reset circuit 82 as is illustrated in FIG. 5b. The reset circuit 82 includes the timer 206 and the AND gate 208 as illustrated in FIG. 5b.

The microprocessor clock 52 is illustrated in FIG. 5a. The microprocessor clock 52 is preferably the 6870A MPU clock 301 wired as illustrated.

The read-only memory 57 is illustrated in FIG. 5a. The read-only memory 57 consists of two read-only memories 303 and 304 which are wired as illustrated in FIG. 5a.

Referring now to FIG. 5d, the status indicator 71 includes the LEDs 211-217, the drivers 219-223 and the AND gate 224 which are interfaced as illustrated in FIG. 5d. The baud rate pack 67 consists of the switch 230 which is wired as is illustrated in FIG. 5d. The flip-flop 76 is preferably two flip-flops 226 and 227 which are interfaced as is illustrated in FIG. 5d. The peripheral interface adapter 74 includes the peripheral interface adapter 231 together with the inverter 232 which are interfaced as is illustrated in FIG. 5d. The driver 235 constitutes one of the bus drivers 60 which are illustrated in FIG. 2.

Referring now to FIG. 5c, the random access memory 59 consists of one random access memory 305 which is wired as is illustrated in FIG. 5c. The output register file 61 consists of four registers 306-309. The registers 306-309 are interfaced as is illustrated in FIG. 5c. The input register files 62 consists of four registers 310-313. The input register files 310-313 are also interfaced as is illustrated in FIG. 5c.

Referring now to FIGS. 5e and 5f, the inverter 241 and the NAND gate 242 form part of the ATN detector circuit 50. The serial interface 69 is made up of the line receiver 244, the line driver 245 and the line driver 245, together with the AND gate 248 and the inverter 247. The tri-state inverters 251 and 252 make up the remaining part of the bus driver 60. The address pack 65 consists of a switch 254 which is wired as is illustrated in FIG. 5e. The remaining portion of the ATN bit detector 50 is made up of multiplexers 261 and 262 together with NAND gates 264 and 265, NAND gate 266 and the inverter 267. The address decoder 264 is made up of the comparator 271 and the decoder 272 together with the tri-state inverter 273-276, the NAND gates 281-290, the inverters 292-296 and the NAND gate 298. The local device controller 200 is utilized to interface the CLC to the central computer 112. The local device controller is part of the Optrol 3600 system manufactured by Applied Automation Inc., Bartlesville, Oklahoma. The central computer 112 is the Interdata Model 716, 732 or 832 manufactured by Perkin-Elmer Data Systems.

Commercially available components which can be utilized in the circuit illustrated in FIGS. 5a-f are as follows:

| | | |
|---|---|---|
| Microprocessor 201 | MC6800 | Motorola Semiconductor |
| Reset switch 81 | 39250 | Grayhill |
| LEDs 211-217 | TIL210 | Texas Instruments |
| Drivers 219-223 and 235 | 7407 | National Semiconductor |
| Switches 230 and 254 | AMP 53137-1 | AMP |
| Flip-flops 226 and 227 | 74LS74 | National Semiconductor |
| Peripheral interface adapter 231 | MC6820 | Motorola Semiconductor |
| Line receiver 244 | AM26LS32 | Advanced Microdevices |
| Line driver 245 | MC3487 | Motorola Semiconductor |
| Line driver 246 | 9616 | Fairchild Semiconductor |
| Multiplexers 261 and 262 | 74LS151 | National Semiconductor |
| Comparator 271 | 74LS85 | National Semiconductor |
| Decoder 272 | 74LS138 | National Semiconductor |
| MPU Clock 301 | MC6870A | Motorola Semiconductor |
| Read-only Memories 303 & 304 | 93448 | Fairchild Semiconductor |
| Ramdom access memory 59 | MC6810 | Motorola Semiconductor |
| Registers 306-309 | 74LS170 | National Semidconductor |
| Registers 310-313 | 74LS670 | National Semiconductor |
| NAND gates 202,203,242,266, and 298 | 74LS10 | National Semiconductor |
| AND gates 204,208,224 and 248 | 74LS08 | National Semiconductor |
| Inverters 232,207,205,241, 247,267, and 292-296 | 74LS04 | National Semiconductor |
| Tri-state inverters 251,252, and 273-276 | 74LS367 | National Semiconductor |
| NAND gates 210a,b,c, & d,264, 265 and 281-290 | 74LS00 | National Semiconductor |

A schematic diagram of the remote device controller illustrated in FIG. 4 is illustrated in FIGS. 7a-7c. FIG. 8 illustrates the manner in which FIGS. 7a-7c should be put together to make a complete schematic of the remote device controller illustrated in FIG. 4.

Referring now to FIG. 7a, the microprocessor clock 104 consists of the MC6870a clock 401 which is manufactured by Motorola Semiconductor. The 6870a clock 401 is wired as is illustrated. The microprocessor 101 consists of the MC6800 microprocessor chip 402 and the AND gate 403 together with the associated wiring illustrated. The read-only memory 106 consists of two programmable read-only memories 405 and 406 together with the inverters 407 and 408. The random access memory 108 consists of one random access memory 411 wired as is illustrated. The address pack 14 consists of the switching circuit 413, the tri-state buffers 414-418, the NAND gate 419 and the AND gate 420.

All of the electrical components are interfaced as is illustrated.

Referring now to FIGS. 7b and 7c, the status indicators 117 consist of the light emitting diodes 422-427 together with the tri-state buffers 429-434. The tri-state buffers and the LEDs are interfaced as is illustrated. The reset switch 118 is interfaced to the reset circuit 120. The reset circuit 120 consists of the timer 441 together with the AND gate 442. The timer and the AND gate are interfaced as is illustrated. The peripheral interface adapter 111 is made up of the peripheral interface adapter 445, the inverter 446 and the NAND gate 447. The peripheral interface adapter 112 consists of the peripheral interface adapter 451 together with the inverter 452. The serial interface 115 consists of the two line drivers 355 and 356 together with the line receiver 357, the AND gate 358 and the inverter 359.

Electrical components which can be utilized in the circuit illustrated in FIGS. 7a-7c are as follows:

| | | |
|---|---|---|
| Clock 401 | MC6870A | Motorola Semiconductor |
| Microprocessor 402 | MC6800 | Motorola Semiconductor |
| Read-only memory 405 & 406 | 93448 | Fairchild Semiconductor |
| LEDs 422-428 | TIL210 | Texas Instruments |
| Reset switch 118 | 39250 | Grayhill |
| Timer 441 | NE555 | Signetics |
| Peripheral interface adapters 445 & 451 | MC6820 | Motorola Semiconductor |
| Line driver 356 | MC3487 | Motorola Semiconductor |
| Line driver 355 | 9616 | Fairchild Semiconductor |
| Line receiver 357 | AM26LS32 | Advanced Microdevices |
| AND gates 403,420,442 & 358 | 74LS08 | National Semiconductor |
| Inverters 407,408,446,452 and 359 | 74LS04 | National Semiconductor |
| NAND gate 419 and 447 | 74LS20 | National Semiconductor |
| Tri-state buffers 414-418 and 429-434 | 74LS367 | National Semiconductor |

The heart of the CLC is the microprocessor 51. In like manner, the heart of the RDC is the microprocessor 101. Many different types of software programs could be in different languages and formats which would allow the microprocessors 51 and 101 to carry out their required functions. While many different software programs could be developed to allow the computers 51 and 101 to accomplish their required functions, a preferred software program for the CLC illustrated in FIG. 2 is attached as Appendix I to the present application. A preferred software program for the RDC illustrated in FIG. 4 is attached as Appendix II to the present application. The software programs employ a standard language developed by Motorola Semiconductor for the 6800 microprocessor. Various steps in the program are defined and the language is defined in extensive documentation that is provided by Motorola Semiconductor for the 6800 microprocessor.

Specific references are the "6800 Microprocessor Programming Manual" (1976) and "Microprocessor Course" (1976) both of which are provided by Motorola Semiconductor.

The following example is provided to further illustrate the present invention.

EXAMPLE

Ten remotes located from Houston to Chicago need to be updated every second. The remotes are to be connected into a central computer at Bartlesville, Oklahoma, using a leased telephone line. The bit rate is limited to 1200 bits/second due to the use of frequency shift keying modems. The transmission of data is half duplex, that is, only one communication device can talk at any one time. The Chicago remote, being the most distant, will not always respond to 1200 bits/second, but will respond to 600 bits/second. All of the other remotes function well as 1200 bits/second. The message required to update each remote and the response of the remote require 72 bits of information.

If prior art systems were utilized, all of the remotes would have to be strapped to 600 bits/second to be compatible with the Chicago remote. The line use time is computed as follows:

600 bits/second = 0.001667 seconds/bit 72 bits/remote × 0.101667 seconds/bit × 10 remotes = 1.2 seconds The line use time thus exceeds the required update cycle time of 1 second. To solve this problem, the telephone lines could be leased, one to service the Chicago remote and one to service the other nine remotes. This also requires two communication line controllers and two modems at the central computer site.

Utilizing the present invention, the CLC would be strapped to a prime rate of 1200 bits/second. When the Chicago remote would not communicate at 1200 bits/second, the CLC will automatically shift to 600 bits/second. After communicating with the Chicago remote at 600 bits/second, the CLC will shift back to 1200 bits/second to update the other remotes. The worst case line use time would be computed as follows:

1200 bits per second = 0.000833 seconds per bit. The line use time for nine remotes is:

$$72 \frac{\text{bits}}{\text{remote}} \times 0.000833 \frac{\text{sec}}{\text{bit}} \times 9 \text{ remotes} = 0.539784 \text{ seconds}$$

When the Chicago remote causes errors at 1200 bits per second, the third try requires:

$$72 \frac{\text{bits}}{\text{remote}} \times 0.001667 \text{ sec} \times 1 \text{ remote} = 0.120024 \text{ seconds}$$

The total line use time is the sum of all tries:

| | |
|---|---|
| Remotes 1-9 | 0.539784 sec |
| Chicago remote 1st try | 0.059976 sec |
| Chicago remote 2nd try | 0.059976 sec |
| Chicago remote 3rd try | 0.120024 sec |
| Total | 0.779760 sec |

The line use time is well under the one second update time required.

A single telephone line will support all remotes.

Comparing both solutions, there is a savings in the initial cost of one communication line controller and one modem at the central site. Although this is significant, the cost of leasing two telephone lines compared to one could amount to over $6,000 per year.

Another factor which must be considered when computing line use times is the time used for retransmission because of errors occurring in the first nine remotes. Since the CLC retries automatically, no computer interrupt times need to be considered. The time for retransmission would be only 0.059976 seconds. Several retry times could be added to the line use time of the second solution without exceeding the one second update cycle time.

The invention has been described in terms of a preferred embodiment in which detailed schematics of the CLC and the RDCs have been set forth. The invention is not limited to these detailed schematics. It is well known that there are many circuit configurations which can be utilized to perform specified functions. This is especially true with regard to many elements in the circuits which may be supplied by a plurality of manufacturers.

While the invention has been described in terms of the presently preferred embodiment, reasonable variations and modifications are possible by those skilled in the art within the scope of the described invention and the appended claims.

APPENDIX 1

```
                     2 *   THIS IS THE PROGRAM LISTING FOR THE OPTROL 3600 COMMUNICATION    BAY00020
                     3 *   LINE CONTROLLER (CLC-3) APPLIED AUTOMATION, INC. #E06676.          BAY00030
                     4 *   THIS PROGRAM IS BURNED INTO TWO 512X8 PROMS APPLIED AUTOMATION,   BAY00040
                     5 *   INC. #D24000 AND #D24001. PROM #D24000 CONTAINS THE PROGRAM       BAY00050
                     6 *   FROM MEMORY LOCATION FC00 TO FDFF. PROM #D24001 CONTAINS THE      BAY00060
                     7 *   PROGRAM FROM MEMORY LOCATION FE00 TO FFFF.                         BAY00070
                     8 *                                                                       BAY00080
                     9 *   EXECUTION OF THIS PROGRAM BEGINS AT LOCATION FC14 (RES). WHEN      BAY00090
                    10 *   NOT ACTIVE THE PROGRAM RESIDES AT THE 'WAIT FOR INSTRUCTION'       BAY00100
                    11 *   LOOP LOCATED AT FCED.                                              BAY00110
                    12 *                                                                       BAY00120
                    13 *   THIS PROGRAM TRANSMITS AND RECEIVES SERIAL DATA BIT BY BIT.        BAY00130
                    14 *   TIMING IS CONTROLLED BY THE FREQUENCY OF THE MICROPROCESSOR        BAY00140
                    15 *   CLOCK (1MHZ) AND THE NUMBER OF CLOCK CYCLES REQUIRED BY EACH       BAY00150
                    16 *   INSTRUCTION. SHOULD IT BE NECESSARY TO MODIFY ANY OF THE           BAY00160
                    17 *   TRANSMIT OR RECEIVE PROGRAMS, CARE SHOULD BE TAKEN TO PRESERVE     BAY00170
                    18 *   THE CURRENT ELAPSED TIME.                                          BAY00180
                    19 *                                                                       BAY00190
                    20 *   BAUD RATES MAY BE CHANGED OR ADDED TO THE BAUD RATE TABLE          BAY00200
                    21 *   AT FFE8: A MAXIMUM OF 8 BAUD RATES WILL BE ACCOMODATED WITHOUT     BAY00210
                    22 *   HARDWARE MODIFICATION. ALL BAUD RATE ENTRIES SHOULD BE IN          BAY00220
                    23 *   DESCENDING ORDER FROM LOCATION FFE8. SHOULD BAUD RATES LESS        BAY00230
                    24 *   THAN 150 BAUD BE ADDED, THE SYNC 2 LIMIT (FF9B) MAY NEED TO        BAY00240
                    25 *   BE CHANGED.                                                        BAY00250
                    26 *                                                                       BAY00260
                    27 *   TWO TIME OUTS ARE PROVIDED, 66 AND 220 MSEC. THESE MAY BE          BAY00270
                    28 *   CHANGED AT LOCATIONS FC6F AND FC78 RESPECTIVELY.                   BAY00280
                    29 *   SHOULD A PROGRAM CHANGE BE MADE, THE ROM CHECK SUMS WILL NEED      BAY00290
                    30 *   TO BE ADJUSTED. ROMB (FC00-FDFF) CHECKSUM ADJUST IS LOCATED        BAY00300
                    31 *   AT FC00. ROM A CHECK SUM ADJUST IS AT FF77.                        BAY00310
                    32 *                                                                       BAY00320
                    33 *   LOCATIONS FF78 THRU FFE7 ARE NOT USED. RAM AND PIA LOCATIONS       BAY00330
                    34 *   ARE LISTED BELOW:                                                   BAY00340
                    35 *                                                                       BAY00350
0000                36           ORG    0                                                      BAY00360
0000                37 UNUSED    RMB    1                                                      BAY00370
0001                38 RBITC     RMB    1        RECEIVE BIT COUNT                             BAY00380
0002                39 BT1       RMB    2        1.0 BIT TIME                                  BAY00390
0004                40 BT15      RMB    2        1.5 BIT TIME                                  BAY00400
0006                41 BT178     RMB    2        1.0 BIT TIME - 78 USEC                        BAY00410
0008                42 BT1526    RMB    2        1.5 BIT TIME - 26 USEC                        BAY00420
000A                43 XBITC     RMB    1        XMIT BIT COUNT                                BAY00430
000B                44 BT375     RMB    2        .375 BIT TIME                                 BAY00440
000D                45 BT15X     RMB    2        1.5 BIT TIME - 130 USEC                       BAY00450
000F                46 MYADDR    RMB    1        CLC-3 ADDRESS                                 BAY00460
0010                47 RSTAD     RMB    1        RECIEVE STATUS AND ADDRESS                    BAY00470
0011                48 RCHPT     RMB    1        RECEIVE CHANNEL AND POINT                     BAY00480
0012                49 RMDATA    RMB    1        RECEIVE DATA MS BYTE                          BAY00490
0013                50 RLDATA    RMB    1        RECEIVE DATA LS BYTE                          BAY00500
0014                51 XOPAD     RMB    1        XMIT OP CODE AND ADDRESS                      BAY00510
0015                52 XCHPT     RMB    1        XMIT CHANNEL AND POINT                        BAY00520
0016                53 XMDATA    RMB    1        XMIT DATA MS BYTE                             BAY00530
0017                54 XLDATA    RMB    1        XMIT DATA LS BYTE                             BAY00540
0018                55 SYNC1     RMB    2        SYNC 1 TIME                                   BAY00550
001A                56 SYNC2     RMB    2        SYNC 2 TIME                                   BAY00560
001C                57 OPFLAG    RMB    1        OP CHECK FLAG                                 BAY00570
001D                58 ATNMSK    RMB    2        ATTENTION MASK                                BAY00580
001F                59 BRV       RMB    2        BAUD RATE VECTOR                              BAY00590
0021                60 XTEMP     RMB    2        TEMPORARY STORAGE                             BAY00600
0023                61 RETRY     RMB    1        RETRY COUNTER                                 BAY00610
0024                62 ORUN      RMB    1        OVER RUN FLAG                                 BAY00620
0025                63 TOUT      RMB    2        TIME OUT FOR CTS AND NO RESPONSE              BAY00630
0027                64           ORG    $F0      REGISTERS AND PIA                             BAY00640
00F0                65 REG0      RMB    2        STATUS REGISTER                               BAY00650
00F2                66 REG1      RMB    2        DATA REGISTER                                 BAY00660
00F4                67 REG2      RMB    2        C/A REGISTER                                  BAY00670
00F6                68 REG3      RMB    2        ATN REGISTER                                  BAY00680
00F8                69 PIAPA     RMB    1        PIA PERIPHERAL A SIDE                         BAY00690
00F9                70 PIACA     RMB    1        PIA CONTROL SIDE A                            BAY00700
00FA                71 PIAPB     RMB    1        PIA PERIPHERAL B SIDE                         BAY00710
00FB                72 PIACB     RMB    1        PIA CONTROL SIDE B                            BAY00720
00FC                73           ORG    $FC00                                                  BAY00730
FC00   EA           74           FCB    $EA      ROMB CHECK SUM ADJUST                         BAY00740
FC01   C638         75 LLED      LDA B  #$38     LIGHT LEDS                                    BAY00750
FC03   D7F9         76           STA B  $F9      ENTER WITH A REG = LEDS TO BE LIT             BAY00760
FC05   97F8         77           STA A  $F8                                                    BAY00770
FC07   C63C         78           LDA B  #$3C                                                   BAY00780
FC09   D7F9         79           STA B  $F9                                                    BAY00790
FC0B   8680         80           LDA A  #$80     KEEP TX (DATA OUT) HIGH                       BAY00800
FC0D   97F8         81           STA A  $F8                                                    BAY00810
FC0F   39           82           RTS                                                           BAY00820
FC10   8DEF         83 FAIL      BSR    LLED                                                   BAY00830
FC12   2015         84           BRA    ROM      CONTINUE TO REPEAT TEST                       BAY00840
FC14   8E007F       85 RES       LDS    #$007F   INZ STACK POINTER                             BAY00850
FC17   8621         86           LDA A  #$21     SET EOT & CLR AS HIGH OUTPUTS                 BAY00860
FC19   97FA         87           STA A  $FA                                                    BAY00870
FC1B   C604         88           LDA B  #$04                                                   BAY00880
FC1D   D7FB         89           STA B  $FB                                                    BAY00890
FC1F   97FA         90           STA A  $FA                                                    BAY00900
FC21   86FC         91           LDA A  #$FC     TURN STATUS LEDS ON                           BAY00910
FC23   8DDC         92           BSR    LLED     KEEP TX HIGH                                  BAY00920
FC25   C634         93           LDA B  #$34     SET RTS LOW                                   BAY00930
FC27   D7F9         94           STA B  $F9                                                    BAY00940
                    95 *                         ROM TEST                                      BAY00950
                    96 *                         ROMA=FE00-FFFF                                BAY00960
                    97 *                         ROMB=FC00-FDFF                                BAY00970
```

| Addr | Code | Line | Label | Op | Operand | Comment | Ref |
|---|---|---|---|---|---|---|---|
| FC29 | CEFC00 | 98 | ROM | LDX | #$FC00 | | BAY00980 |
| FC2C | 862A | 99 | | LDA A | #$2A | SET REG A TO TURN ON ROM FAIL AND CTS | BAY00990 |
| FC2E | 5F | 100 | | CLR B | | | BAY01000 |
| FC2F | EB00 | 101 | SUMB | ADD B | $00,X | ADD CONTENTS OF LOCATIONS FROM | BAY01010 |
| FC31 | 08 | 102 | | INX | | FC00 TO FDFF TO FORM THE | BAY01020 |
| FC32 | 8CFE00 | 103 | | CPX | #$FE00 | ROMB CHECK SUM | BAY01030 |
| FC35 | 26F8 | 104 | | BNE | SUMB | | BAY01040 |
| FC37 | C128 | 105 | | CMP B | #$28 | IF CHECK SUM NOT EQUAL 28 | BAY01050 |
| FC39 | 26D5 | 106 | | BNE | FAIL | GO TO FAIL, ELSE | BAY01060 |
| FC3B | 8628 | 107 | | LDA A | #$28 | SET REG A TO TURN ON ROM FAIL LEDS | BAY01070 |
| FC3D | 5F | 108 | | CLR B | | | BAY01080 |
| FC3E | EB00 | 109 | SUMA | ADD B | $00,X | ADD CONTENTS OF LOCATIONS FROM | BAY01090 |
| FC40 | 08 | 110 | | INX | | FE00 TO FFFF TO FORM THE | BAY01100 |
| FC41 | 26FB | 111 | | BNE | SUMA | ROMA CHECK SUM | BAY01110 |
| FC43 | C17A | 112 | | CMP B | #$7A | IF CHECK SUM NOT EQUAL 7A | BAY01120 |
| FC45 | 26C9 | 113 | | BNE | FAIL | GO TO FAIL, ELSE GO TO RAM TEST | BAY01130 |
| | | 114 | * | | | INZ STATUS REG AND ATN REQUEST REG | BAY01140 |
| FC47 | CEFFFF | 115 | | LDX | #$FFFF | | BAY01150 |
| FC4A | DFF0 | 116 | | STX | $F0 | | BAY01160 |
| FC4C | DFF6 | 117 | | STX | $F6 | | BAY01170 |
| | | 118 | * | | | RAM TEST | BAY01180 |
| FC4E | 5F | 119 | | CLR B | | | BAY01190 |
| FC4F | 17 | 120 | PASNO | TBA | | | BAY01200 |
| FC50 | CEFF80 | 121 | | LDX | #$FF80 | | BAY01210 |
| FC53 | A780 | 122 | WRAM | STA A | $80,X | WRITE A REG IN RAM LOCATION | BAY01220 |
| FC55 | 4C | 123 | | INC A | | | BAY01230 |
| FC56 | 08 | 124 | | INX | | | BAY01240 |
| FC57 | 26FA | 125 | | BNE | WRAM | | BAY01250 |
| FC59 | 17 | 126 | | TBA | | SET A EQUAL TO FIRST LOCATION | BAY01260 |
| FC5A | CEFF80 | 127 | | LDX | #$FF80 | CONTENTS | BAY01270 |
| FC5D | A180 | 128 | CRAM | CMP A | $80,X | COMPARE A REG TO RAM LOCATION | BAY01280 |
| FC5F | 2704 | 129 | | BEQ | OK | | BAY01290 |
| FC61 | 86B0 | 130 | | LDA A | #$B0 | IF NOT OK SET UP RAM FAIL LEDS | BAY01300 |
| FC63 | 20AB | 131 | BFAIL | BRA | FAIL | AND GO TO FAIL | BAY01310 |
| FC65 | 4C | 132 | OK | INC A | | | BAY01320 |
| FC66 | 08 | 133 | | INX | | | BAY01330 |
| FC67 | 26F4 | 134 | | BNE | CRAM | | BAY01340 |
| FC69 | 5C | 135 | | INC B | | IF END OF PASS INCREMENT TEST | BAY01350 |
| FC6A | 26E3 | 136 | | BNE | PASNO | WORD. IF TEST WORD NOT EQUAL TO | BAY01360 |
| | | 137 | * | | | ZERO CONTINUE TEST. | BAY01370 |
| FC6C | BDFE09 | 138 | | JSR | BAUD | GET BAUD RATE. | BAY01380 |
| FC6F | CE02F9 | 139 | | LDX | #$02F9 | GET TIME OUT | BAY01390 |
| FC72 | 96FA | 140 | | LDA A | $FA | | BAY01400 |
| FC74 | 8410 | 141 | | AND A | #$10 | IF BIT 4 IS ZERO SET TIME OUT TO 66 MSEC | BAY01410 |
| FC76 | 2703 | 142 | | BEQ | STOUT | | BAY01420 |
| FC78 | CE31C5 | 143 | | LDX | #$31C5 | ELSE SET TIME OUT TO 220 MSEC | BAY01430 |
| FC7B | DF25 | 144 | STOUT | STX | TOUT | | BAY01440 |
| | | 145 | * | | | SERIAL COM LINE SELF TEST | BAY01450 |
| FC7D | 8620 | 146 | | LDA A | #$20 | SET RECEIVE BIT COUNT TO 32 | BAY01460 |
| FC7F | 9701 | 147 | | STA A | RBITC | | BAY01470 |
| FC81 | C661 | 148 | | LDA B | #$61 | SET UP OP CODE 3 RDC#1 | BAY01480 |
| FC83 | D714 | 149 | XOP3AD | STA B | XOPAD | | BAY01490 |
| FC85 | 8634 | 150 | | LDA A | #$34 | SET RTS LOW | BAY01500 |
| FC87 | 97F9 | 151 | | STA A | $F9 | | BAY01510 |
| FC89 | 8655 | 152 | | LDA A | #$55 | SET UP DATA (ALTERNATE 1S AND 0S) | BAY01520 |
| FC8B | 9715 | 153 | | STA A | XCHPT | | BAY01530 |
| FC8D | 9716 | 154 | | STA A | XMDATA | | BAY01540 |
| FC8F | 9717 | 155 | | STA A | XLDATA | | BAY01550 |
| FC91 | 8620 | 156 | | LDA A | #$20 | SET UP XMIT BIT COUNTER | BAY01560 |
| FC93 | 970A | 157 | | STA A | XBITC | | BAY01570 |
| FC95 | 86A4 | 158 | | LDA A | #$A4 | SET UP FOR COM FAIL | BAY01580 |
| FC97 | 8D13 | 159 | | BSR | CKCTS | CHECK FOR CTS | BAY01590 |
| FC99 | 26C8 | 160 | | BNE | BFAIL | IF NO CTS GO TO FAIL | BAY01600 |
| FC9B | BDFF21 | 161 | | JSR | XMIT | TRANSMIT MESSAGE | BAY01610 |
| FC9E | BDFE6D | 162 | | JSR | WFRES | WAIT FOR RESPONSE | BAY01620 |
| FCA1 | 2717 | 163 | | BEQ | STPASS | IN AN RDC RESPONDED GO TO SELF TEST PA | BAY01630 |
| FCA3 | 86A4 | 164 | | LDA A | #$A4 | SET UP FOR COM FAIL | BAY01640 |
| FCA5 | D614 | 165 | | LDA B | XOPAD | | BAY01650 |
| FCA7 | 5C | 166 | | INC B | | | BAY01660 |
| FCA8 | 2AD9 | 167 | | BPL | XOP3AD | IF RDC # LESS THAN 0 TRY NEXT RDC | BAY01670 |
| FCAA | 20B7 | 168 | | BRA | BFAIL | ELSE GO TO FAIL | BAY01680 |
| FCAC | DE25 | 169 | CKCTS | LDX | TOUT | LOAD CTS TIME OUT COUNTER | BAY01690 |
| FCAF | 09 | 170 | CTS | DEX | | DECREMENT CTS TIMER | BAY01700 |
| FCB0 | 2602 | 171 | | BNE | CCTS | IF ZERO | BAY01710 |
| FCB1 | 09 | 172 | | DEX | | SET CONDITION NOT = | BAY01720 |
| FCB2 | 39 | 173 | | RTS | | | BAY01730 |
| FCB3 | D6F8 | 174 | CCTS | LDA B | $F8 | CHECK FOR CTS (BIT 1 OF 00F8) | BAY01740 |
| FCB5 | C402 | 175 | | AND B | #$02 | | BAY01750 |
| FCB7 | 26F5 | 176 | | BNE | CTS | IF NO CTS CONTINUE TO CHECK. | BAY01760 |
| FCB9 | 39 | 177 | | RTS | | | BAY01770 |
| | | 178 | * | | | SELF TEST PASS | BAY01780 |
| FCBA | 86C0 | 179 | STPASS | LDA A | #$C0 | TURN PASS LED ON | BAY01790 |
| FCBC | BDFC01 | 180 | | JSR | LLED | | BAY01800 |
| FCBF | 8608 | 181 | | LDA A | #$08 | DELAY ABOUT 4 SECONDS. | BAY01810 |
| FCC1 | 09 | 182 | PDLY | DEX | | | BAY01820 |
| FCC2 | 26FD | 183 | | BNE | PDLY | | BAY01830 |
| FCC4 | 4A | 184 | | DEC A | | | BAY01840 |
| FCC5 | 26FA | 185 | | BNE | PDLY | THEN | BAY01850 |
| FCC7 | 9724 | 186 | START | STA A | ORUN | INZ OVER RUN FLAG TO + | BAY01860 |
| FCC9 | 8680 | 187 | | LDA A | #$80 | | BAY01870 |
| FCCB | BDFC01 | 188 | | JSR | LLED | TURN PASS LED OFF | BAY01880 |
| | | 189 | * | | | MY ADDRESS | BAY01890 |
| FCCE | B670F8 | 190 | ADDR | LDA A | $70F8 | READ ADDRESS PACK AT 70F8 | BAY01900 |
| FCD1 | 44 | 191 | | LSR A | | | BAY01910 |
| FCD2 | 44 | 192 | | LSR A | | | BAY01920 |
| FCD3 | 43 | 193 | | COM A | | | BAY01930 |

| Addr | Code | Line | Label | Op | Operand | Comment | Ref |
|---|---|---|---|---|---|---|---|
| FCD4 | 840F | 194 | | AND A | #$0F | MASK AND STORE AS | BAY01940 |
| FCD6 | 970F | 195 | | STA A | MYADDR | MY ADDRESS (000F) | BAY01950 |
| FCD8 | CEFFFF | 196 | | LDX | #$FFFF | COMPUTE ATN ENABLE MASK | BAY01960 |
| FCDB | DF1D | 197 | | STX | ATNMSK | | BAY01970 |
| FCDD | 0C | 198 | | CLC | | | BAY01980 |
| FCDE | 661E | 199 | RBIT | ROR | ATNMSK+1,X | | BAY01990 |
| FCE0 | 661F | 200 | | ROR | ATNMSK+2,X | | BAY02000 |
| FCE2 | 4A | 201 | | DEC A | | | BAY02010 |
| FCE3 | 2AF9 | 202 | | BPL | RBIT | | BAY02020 |
| | | 203 | * | | | WAIT FOR INSTRUCTION | BAY02030 |
| FCE5 | C620 | 204 | WFNI | LDA B | #$20 | SET EOT LOW | BAY02040 |
| FCE7 | D7FA | 205 | | STA B | $FA | | BAY02050 |
| FCE9 | 8601 | 206 | | LDA A | #$01 | SET RETRY COUNT TO +1 | BAY02060 |
| FCEB | 9723 | 207 | | STA A | RETRY | | BAY02070 |
| FCED | 96FA | 208 | WFI | LDA A | $FA | TEST XMIT FLAG | BAY02080 |
| FCEF | 2B0F | 209 | | BMI | NEWI | IF XMIT = 1 GO TO NEW INSTRUCTION | BAY02090 |
| FCF1 | 48 | 210 | | ASL A | | TEST PT2IOR | BAY02100 |
| FCF2 | 2AF9 | 211 | | BPL | WFI | IF NOT SET WAIT FOR INSTRUCTION | BAY02110 |
| FCF4 | 4F | 212 | | CLR A | | IF SET PULSE CLR. | BAY02120 |
| FCF5 | 97FA | 213 | | STA A | $FA | | BAY02130 |
| FCF7 | D7FA | 214 | | STA B | $FA | | BAY02140 |
| FCF9 | 9724 | 215 | | STA A | ORUN | CLEAR OVER RUN FLAG | BAY02150 |
| FCFB | 43 | 216 | | COM A | | | BAY02160 |
| FCFC | 97F1 | 217 | | STA A | $F1 | AND CLEAR STATUS REGISTER | BAY02170 |
| FCFE | 20ED | 218 | | BRA | WFI | THEN WAIT FOR INSTRUCTION | BAY02180 |
| FD00 | 43 | 219 | NEWI | COM A | | SET EOT HIGH AND PULSE CLR | BAY02190 |
| FD01 | 97FA | 220 | | STA A | $FA | | BAY02200 |
| FD03 | 5C | 221 | | INC B | | | BAY02210 |
| FD04 | D7FA | 222 | | STA B | $FA | | BAY02220 |
| FD06 | 8684 | 223 | | LDA A | #$84 | TURN LINE BUSY LED ON | BAY02230 |
| FD08 | BDFC01 | 224 | | JSR | LLED | | BAY02240 |
| FD0B | 8634 | 225 | RTRY | LDA A | #$34 | SET RTS LOW | BAY02250 |
| FD0D | 97F9 | 226 | | STA A | $F9 | | BAY02260 |
| FD0F | 86FE | 227 | | LDA A | #$FE | SET LINE BUSY IN STATUS | BAY02270 |
| FD11 | 97F1 | 228 | | STA A | $F1 | | BAY02280 |
| FD13 | C610 | 229 | | LDA B | #$10 | SET NUMBER OF TRANSMIT BITS TO 16 | BAY02290 |
| FD15 | 96F4 | 230 | | LDA A | $F4 | READ C/A FOR OP CODE | BAY02300 |
| FD17 | 43 | 231 | | COM A | | | BAY02310 |
| FD18 | 2B02 | 232 | | BMI | SXBC | IF OP CODE IS LESS THAN 4 SET | BAY02320 |
| FD1A | C620 | 233 | | LDA B | #$20 | NUMBER OF BITS TO 32. | BAY02330 |
| FD1C | D70A | 234 | SXBC | STA B | XBITC | STORE # OF BITS AT TRANSMIT BIT COUNT | BAY02340 |
| FD1E | D724 | 235 | | STA B | ORUN | SET OVER RUN FLAG + | BAY02350 |
| FD20 | 9714 | 236 | | STA A | XOPAD | TRANSFER C/A AND DATA FROM | BAY02360 |
| FD22 | 96F5 | 237 | | LDA A | $F5 | REGISTER FILES TO RAM | BAY02370 |
| FD24 | 43 | 238 | | COM A | | | BAY02380 |
| FD25 | 9715 | 239 | | STA A | XCHPT | | BAY02390 |
| FD27 | 96F2 | 240 | | LDA A | $F2 | | BAY02400 |
| FD29 | 43 | 241 | | COM A | | | BAY02410 |
| FD2A | 9716 | 242 | | STA A | XMDATA | | BAY02420 |
| FD2C | 96F3 | 243 | | LDA A | $F3 | | BAY02430 |
| FD2E | 43 | 244 | | COM A | | | BAY02440 |
| FD2F | 9717 | 245 | | STA A | XLDATA | | BAY02450 |
| FD31 | BDFCAC | 246 | | JSR | CKCTS | CHECK FOR CTS | BAY02460 |
| FD34 | 2703 | 247 | | BEQ | JXMIT | | BAY02470 |
| FD36 | 7EFDC6 | 248 | | JMP | CTSERR | IF NO CTS GO TO CTS TIME OUT FAIL | BAY02480 |
| FD39 | BDFF21 | 249 | JXMIT | JSR | XMIT | ELSE TRANSMIT MESSAGE | BAY02490 |
| FD3C | 8EEE | 250 | | LDA A | #$EE | SET XMIT COMPLETE IN STATUS (00F1) | BAY02500 |
| FD3E | 97F1 | 251 | | STA A | $F1 | KEEPING LINE BUSY SET. | BAY02510 |
| FD40 | 9614 | 252 | | LDA A | XOPAD | CHECK FOR OP CODE 0 OR 7 | BAY02520 |
| FD42 | 84E0 | 253 | | AND A | #$E0 | | BAY02530 |
| FD44 | 971C | 254 | | STA A | OPFLAG | STORE AS CURRENT OP CODE | BAY02540 |
| FD46 | 2704 | 255 | | BEQ | CLRLED | IF OP CODE 7 OR 0 GO TO CLEAR LED | BAY02550 |
| FD48 | 81E0 | 256 | | CMP A | #$E0 | | BAY02560 |
| FD4A | 260B | 257 | | BNE | WFR | | BAY02570 |
| FD4C | 8680 | 258 | CLRLED | LDA A | #$80 | CLEAR STATUS LEDS | BAY02580 |
| FD4E | BDFC01 | 259 | | JSR | LLED | | BAY02590 |
| FD51 | 86EF | 260 | CLRLB | LDA A | #$EF | CLEAR LINE BUSY | BAY02600 |
| FD53 | 97F1 | 261 | | STA A | $F1 | | BAY02610 |
| FD55 | 2043 | 262 | | BRA | CKATN | SET ATN IF ENABLED | BAY02620 |
| FD57 | C610 | 263 | WFR | LDA B | #$10 | | BAY02630 |
| FD59 | 8120 | 264 | | CMP A | #$20 | IF OP CODE EQUAL 1 SET OPFLAG TO + | BAY02640 |
| FD5B | 2702 | 265 | | BEQ | OPFLG | AND SET BIT COUNT TO 16 | BAY02650 |
| FD5D | C620 | 266 | | LDA B | #$20 | ELSE SET BIT COUNT TO 32 | BAY02660 |
| FD5F | 4A | 267 | OPFLG | DEC A | | IF OP CODE = 4 OR LESS SET OPFLAG TO + | BAY02670 |
| FD60 | 971C | 268 | | STA A | OPFLAG | | BAY02680 |
| FD62 | D701 | 269 | | STA B | RBITC | IF OP CODE= 5 OR 6 SET OPFLAG TO | BAY02690 |
| FD64 | BDFE6D | 270 | JWFRES | JSR | WFRES | | BAY02700 |
| | | 271 | * | | | RECEIVE COMPLETE | BAY02710 |
| FD67 | 2667 | 272 | | BNE | RECERR | IF NOT = GO TO RECEIVE ERROR | BAY02720 |
| FD69 | 96FA | 273 | | LDA A | $FA | | BAY02730 |
| FD6B | 48 | 274 | | ASL A | | TEST PT2IOR | BAY02740 |
| FD6C | 2A0E | 275 | | BPL | CKORUN | | BAY02750 |
| FD6E | 8601 | 276 | | LDA A | #$01 | | BAY02760 |
| FD70 | 97FA | 277 | | STA A | $FA | | BAY02770 |
| FD72 | C621 | 278 | | LDA B | #$21 | | BAY02780 |
| FD74 | D7FA | 279 | | STA B | $FA | | BAY02790 |
| FD76 | 4F | 280 | | CLR A | | | BAY02800 |
| FD77 | 9724 | 281 | | STA A | ORUN | CLEAR OVER RUN FLAG | BAY02810 |
| FD79 | 43 | 282 | | COM A | | | BAY02820 |
| FD7A | 97F1 | 283 | | STA A | $F1 | AND CLEAR STATUS REGISTER | BAY02830 |
| FD7C | 9624 | 284 | CKORUN | LDA A | ORUN | CHECK OVER RUN FLAG | BAY02840 |
| FD7E | 2B4A | 285 | | BMI | OVRUN | IF PREV DATA NOT READ GO TO OVERRUN | BAY02850 |
| FD80 | 9610 | 286 | | LDA A | RSTAD | COMPLEMENT DATA AND C/A AND | BAY02860 |
| FD82 | 43 | 287 | | COM A | | STORE IT IN REGISTER FILE | BAY02870 |
| FD83 | 97F4 | 288 | | STA A | $F4 | | BAY02880 |
| FD85 | 9611 | 289 | | LDA A | RCHPT | | BAY02890 |
| FD87 | 43 | 290 | | COM A | | | BAY02900 |

```
FD88  97F5    291            STA  A   $F5
FD8A  9612    292            LDA  A   RMDATA
FD8C  43      293            COM  A
FD8D  97F2    294            STA  A   $F2
FD8F  9613    295            LDA  A   RLDATA
FD91  43      296            COM  A
FD92  97F3    297            STA  A   $F3
FD94  86AF    298  STRCOM    LDA  A   #$AF         SET RECEIVE & TRANSMIT COMPLETE
FD96  97F1    299            STA  A   $F1          IN STATUS
FD98  9724    300            STA  A   ORUN         SET OVER RUN FLAG NEGATIVE
FD9A  96F6    301  CKATN     LDA  A   $F6          CHECK ATN ENABLE
FD9C  9A1D    302            ORA  A   ATNMSK       IF MASK BIT IS SET
FD9E  43      303            COM  A
FD9F  2607    304            BNE      SETATN       GO TO SET ATN
FDA1  96F7    305            LDA  A   $F7
FDA3  9A1E    306            ORA  A   ATNMSK+1
FDA5  43      307            COM  A
FDA6  270D    308            BEQ      CK5OR6       OTHERWISE CHECK FOR OP CODE 5 OR 6
              309  *                                SET POLL BIT
FDA8  DE1D    310  SETATN    LDX      ATNMSK       GET MASK AND
FDAA  DFF6    311            STX      $F6          STORE IT IN REGISTER FILE AS POLL BIT
FDAC  96FA    312            LDA  A   $FA
FDAE  8625    313            LDA  A   #$25         ENABLE IRQ ON CB1
FDB0  97FB    314            STA  A   $FB          AND SET CB2 TO GO HIGH ON IRQ.
FDB2  4A      315            DEC  A
FDB3  97FA    316            STA  A   $FA          SETS ATN LOW IF ENABLED
FDB5  961C    317  CK5OR6    LDA  A   OPFLAG       CHECK FOR OP 5 OR 6
FDB7  2B05    318            BMI      OP5OR6
FDB9  8D4E    319  DONE      BSR      BAUD         RECOMPUTE BAUD RATE
FDBB  7EFCE5  320            JMP      WFNI         GO TO WAIT FOR NEW INSTRUCTION
FDBE  9610    321  OP5OR6    LDA  A   RSTAD        CHECK FOR EOD BIT
FDC0  8440    322            AND  A   #$40
FDC2  27A0    323            BEQ      JWFRES       IF NOT EOD GO TO WAIT FOR RESPONSE
FDC4  20F3    324            BRA      DONE         IF EOD GO TO DONE
FDC6  C6DF    325  CTSERR    LDA  B   #$DF         CTS TIME OUT ERROR
FDC8  2034    326            BRA      ERR          AND TRANSMIT COMPLETE & STORE IN STATUS
FDCA  C6AB    327  OVRUN     LDA  B   #$AB         DATA OVER RUN ERROR
FDCC  86A0    328            LDA  A   #$A0
FDCE  2029    329            BRA      LEDERR
FDD0  07      330  RECERR    TPA                   SAVE ERROR CONDITION
FDD1  D61C    331            LDA  B   OPFLAG       CHECK FOR OP CODE 5 OR 6
FDD3  2B1D    332            BMI      SETERR       IF SO GO SET ERROR
FDD5  D623    333            LDA  B   RETRY        ELSE CHECK RETRY
FDD7  2B19    334            BMI      SETERR       IF RETRY HAS BEEN TRIED 3 TIMES SET ERROR
FDD9  5A      335            DEC  B
FDDA  D723    336            STA  B   RETRY        ELSE DECREMENT RETRY
FDDC  2A11    337            BPL      JRETRY       IF 1ST RETRY TRY AGAIN
FDDE  DE1F    338            LDX      BRV          ELSE LOWER BAUD RATE
FDE0  08      339            INX
FDE1  08      340            INX
FDE2  8CFFF8  341            CPX      #$FFF8       IF ALREADY LOWEST BAUD GO SET ERROR ELSE
FDE5  270B    342            BEQ      SETERR       COMPUTE BAUD RATE FROM NEW BAUD RATE VECTO
FDE7  8D34    343            BSR      COMBR
FDE9  CE0600  344            LDX      #$0600       DELAY 12.28 MSEC
FDEC  09      345  DLAY      DEX
FDED  26FD    346            BNE      DLAY
FDEF  7EFD0B  347  JRETRY    JMP      RTRY         TRY AGAIN
FDF2  06      348  SETERR    TAP                   RESTORE ERROR CONDITION CODE
FDF3  2B0E    349            BMI      BCHERR       IF MINUS GO TO BCH ERROR
FDF5  C66F    350  RESERR    LDA  B   #$6F         ELSE SET NO RESPONSE ERROR
FDF7  8688    351            LDA  A   #$88
FDF9  37      352  LEDERR    PSH  B
FDFA  BDFC01  353            JSR      LLED         LIGHT ERROR LED
FDFD  33      354            PUL  B
FDFE  D7F1    355  ERR       STA  B   $F1          SET ERROR IN STATUS
FE00  7EFD9A  356            JMP      CKATN        AND SET ATN IF ENABLED
FE03  C6AD    357  BCHERR    LDA  B   #$AD         SET BCH ERROR IN STATUS
FE05  8690    358            LDA  A   #$90         AND LIGHT BCH ERROR LED
FE07  20F0    359            BRA      LEDERR
              360  *                                BAUD RATE
FE09  CEFFE8  361  BAUD      LDX      #$FFE8       INITIALIZE BAUD RATE VECTOR
FE0C  DF1F    362            STX      BRV
FE0E  DE0B    363            LDX      BT375        DELAY .375 BIT TIME
FE10  BDFF04  364            JSR      DELAY
FE13  96FA    365            LDA  A   $FA
FE15  840E    366            AND  A   #$0E
FE17  9B20    367            ADD  A   BRV+1
FE19  9720    368            STA  A   BRV+1
FE1B  DE1F    369  COMPBR    LDX      BRV          COMPUTE BAUD RATE ON BRV
FE1D  A600    370  COMBR     LDA  A   $00,X        COMPUTE BAUD RATE ON INDEX
FE1F  E601    371            LDA  B   $01,X
FE21  9702    372            STA  A   BT1          SET UP 1.0 BIT TIME
FE23  D703    373            STA  B   BT1+1
FE25  44      374            LSR  A                COMPUTE 1.5 BIT TIME
FE26  56      375            ROR  B
FE27  DD03    376            ADD  B   BT1+1
FE29  9902    377            ADC  A   BT1
FE2B  9704    378            STA  A   BT15
FE2D  D705    379            STA  B   BT15+1
FE2F  44      380            LSR  A                COMPUTE .375 BIT TIME
FE30  56      381            ROR  B                THIS VALUE IS USED AS
FE31  44      382            LSR  A
FE32  56      383            ROR  B                THE LIMITS IN COMPARING
FE33  970B    384            STA  A   BT375        A MEASURED SYNC PULSE
FE35  D70C    385            STA  B   BT375+1      TO AN ESTABLISHED BAUD RATE.
FE37  9602    386            LDA  A   BT1          COMPUTE RECEIVE AND TRANSMIT DELAYS
FE39  D603    387            LDA  B   BT1+1        DURING SYNC 3.
```

| Addr | Code | Line | Label | Op | Operand | Comment |
|---|---|---|---|---|---|---|
| FE3B | C006 | 388 | | SUB B | #06 | THE OVERHEAD IN RECEIVING AND TRANSMITTING BAY03880 |
| FE3D | 8200 | 389 | | SBC A | #00 | EACH DATA BIT IS 78 USEC. BAY03890 |
| FE3F | 9706 | 390 | | STA A | BT178 | THE DELAY TIME IS THEN 1.0 BIT TIME-78 USE BAY03900 |
| FE41 | D707 | 391 | | STA B | BT178+1 | BAY03910 |
| FE43 | 9604 | 392 | | LDA A | BT15 | WHEN TRANSMITTING THE SYNC PATTERNS 26 USE BAY03920 |
| FE45 | D605 | 393 | | LDA B | BT15+1 | OF OVERHEAD IS USED. BAY03930 |
| FE47 | C002 | 394 | | SUB B | #02 | THE DELAY TIME IS THEN BAY03940 |
| FE49 | 8200 | 395 | | SBC A | #00 | 1.5 BIT TIME - 26 USEC. BAY03950 |
| FE4B | 9708 | 396 | | STA A | BT1526 | BAY03960 |
| FE4D | D709 | 397 | | STA B | BT1526+1 | BAY03970 |
| FE4F | C008 | 398 | | SUB B | #08 | THE TIME BETWEEN DETECTING SYNC 3 AND BAY03980 |
| FE51 | 8200 | 399 | | SBC A | #00 | THE POINT WHERE RECEPTION MAY OCCUR IS BAY03990 |
| FE53 | 970D | 400 | | STA A | BT15X | 130 USEC. THIS DELAY IS 1.5 BIT TIME-130 BAY04000 |
| FE55 | D70E | 401 | | STA B | BT15X+1 | BAY04010 |
| FE57 | 39 | 402 | | RTS | | BAY04020 |
| FE58 | D005 | 403 | CKSYNC | SUB B | BT15+1 | CHECK SYNC ENTERED WITH A= SYNC MS BAY04030 |
| FE5A | 9204 | 404 | | SBC A | BT15 | & B = SYNC LS. SUBTRACT 1.5 BT FROM SYNC1 BAY04040 |
| FE5C | 2B0B | 405 | | BMI | ANG2 | IF RESULT NEGATIVE GO TO ADD NEGATIVE BAY04050 |
| FE5E | 43 | 406 | | COM A | | RESULT, ELSE NEGATE THEN BAY04060 |
| FE5F | 53 | 407 | | COM B | | BAY04070 |
| FE60 | CB01 | 408 | | ADD B | #01 | BAY04080 |
| FE62 | 8900 | 409 | | ADC A | #00 | BAY04090 |
| FE64 | DB0C | 410 | ANG | ADD B | BT375+1 | ADD NEGATIVE RESULT TO .375 BT BAY04100 |
| FE66 | 990B | 411 | | ADC A | BT375 | BAY04110 |
| FE68 | 39 | 412 | | RTS | | IF RESULT IS NEGATIVE BAY04120 |
| FE69 | 2000 | 413 | ANG2 | BRA | ANG1 | TEST FAILS. THIS IS A CONTROLLED TIME SUB BAY04130 |
| FE6B | 20F7 | 414 | ANG1 | BRA | ANG | WHICH REQUIRES 29 USEC. BAY04140 |
| FE6D | DE25 | 415 | WFRES | LDX | TOUT | LOAD NO RESPONSE TIME OUT COUNTER BAY04150 |
| FE6F | 09 | 416 | RESP | DEX | | DECREMENT RESPONSE TIMER BAY04160 |
| FE70 | 2602 | 417 | | BNE | CKACT | IF ZERO BAY04170 |
| FE72 | 5D | 418 | | TST B | | SET CONDITION PLUS AND EXIT BAY04180 |
| FE73 | 39 | 419 | | RTS | | BAY04190 |
| FE74 | D6F8 | 420 | CKACT | LDA B | $F8 | CHECK FOR ACTIVITY BAY04200 |
| FE76 | 54 | 421 | | LSR B | | BAY04210 |
| FE77 | 25F6 | 422 | | BCS | RESP | IF NONE CONTINUE TO CHECK. BAY04220 |
| FE79 | DF21 | 423 | | STX | XTEMP | IF ACTIVITY STORE TIME OUT COUNTER BAY04230 |
| FE7B | CE0002 | 424 | RECV | LDX | #$0002 | RECEIVE SYNC AND DATA BAY04240 |
| FE7E | 01 | 425 | | NOP | | BAY04250 |
| FE7F | 0F | 426 | | SEI | | DISABLE INTERRUPTS BAY04260 |
| FE80 | 08 | 427 | TS1 | INX | | TIME S1 (TIME SYNC 1) BAY04270 |
| FE81 | D6F8 | 428 | | LDA B | $F8 | TIME THE SPACE BY INCREMENTING THE X BAY04280 |
| FE83 | 54 | 429 | | LSR B | | REGISTER FOR EACH 13 USEC OF SPACE. BAY04290 |
| FE84 | 24FA | 430 | | BCC | TS1 | BAY04300 |
| FE86 | DF18 | 431 | | STX | SYNC1 | WHEN MARK RETURNS, STORE THE SYNC 1 COUNT BAY04310 |
| FE88 | 9618 | 432 | | LDA A | SYNC1 | THEN CHECK THIS TIME AGAINST THE ESTABLISH BAY04320 |
| FE8A | D619 | 433 | | LDA B | SYNC1+1 | BAUD RATE. BAY04330 |
| FE8C | 8DCA | 434 | | BSR | CKSYNC | BAY04340 |
| FE8E | 2A06 | 435 | | BPL | IRCV | IF SYNC 1 DOES NOT SATISFY THE 1.5 BIT TIM BAY04350 |
| FE90 | DE21 | 436 | SYNERR | LDX | XTEMP | RESTORE NO RESPONSE TIME OUT COUNTER BAY04360 |
| FE92 | 01 | 437 | | NOP | | BAY04370 |
| FE93 | 0E | 438 | | CLI | | ENABLE INTERRUPTS BAY04380 |
| FE94 | 20D9 | 439 | | BRA | RESP | CONTINUE TO CHECK FOR RESPONSE. BAY04390 |
| FE96 | CE0005 | 440 | IRCV | LDX | #$0005 | SET THE SYNC 2 COUNTER TO PROPER ELAPSED T BAY04400 |
| FE99 | 08 | 441 | TS2 | INX | | TIME SYNC 2 BAY04410 |
| FE9A | 08 | 442 | | INX | | BAY04420 |
| FE9B | 8C0400 | 443 | | CPX | #$0400 | LIMITS SYNC 2 TO 13312 USEC BAY04430 |
| FE9E | 2AF0 | 444 | | BPL | SYNERR | BAY04440 |
| FEA0 | 01 | 445 | | NOP | | BAY04450 |
| FEA1 | D6F8 | 446 | | LDA B | $F8 | TIME MARK INTERVAL BY BAY04460 |
| FEA3 | 54 | 447 | | LSR B | | INCREMENTING THE X REGISTER FOR EACH BAY04470 |
| FEA4 | 25F3 | 448 | | BCS | TS2 | 13 USEC OF MARK CONDITION. BAY04480 |
| FEA6 | DF1A | 449 | | STX | SYNC2 | WHEN A SPACE OCCURS INDICATING SYNC 3 BAY04490 |
| FEA8 | 961A | 450 | | LDA A | SYNC2 | HAS OCCURRED, BAY04500 |
| FEAA | D61B | 451 | | LDA B | SYNC2+1 | CHECK SYNC 2 AGAINST ESTABLISHED BAUD RATE BAY04510 |
| FEAC | 8DAA | 452 | | BSR | CKSYNC | BAY04520 |
| FEAE | 2BE0 | 453 | | BMI | SYNERR | IF SYNC 2 NOT WITHIN .375BT GO TO BAY04530 |
| FEB0 | 86C0 | 454 | | LDA A | #$C0 | SYNC ERROR. ELSE TURN SYNC DET. BAY04540 |
| FEB2 | BDFC01 | 455 | | JSR | LLED | LED-ON KEEPING TX HIGH. BAY04550 |
| FEB5 | DE0D | 456 | | LDX | BT15X | LOAD X REGISTER WITH DELAY AND BAY04560 |
| FEB7 | BDFF04 | 457 | RCA | JSR | DELAY | RECEIVE FIRST 16 BITS (RECEIVE). BAY04570 |
| FEBA | 9601 | 458 | | LDA A | RBITC | GET BIT COUNT BAY04580 |
| FEBC | 5F | 459 | | CLR B | | CLEAR B REG. FOR BCH BAY04590 |
| FEBD | 7700F8 | 460 | NXTCA | ASR | $00F8 | SHIFT IN DATA BIT INTO CARRY BAY04600 |
| FEC0 | 8D48 | 461 | | BSR | BCHC | COMPUTE BCH BAY04610 |
| FEC2 | DE06 | 462 | | LDX | BT178 | DELAY TO NEXT BIT BAY04620 |
| FEC4 | 8D3E | 463 | | BSR | DELAY | BAY04630 |
| FEC6 | 6911 | 464 | | ROL | RCHPT,X | SHIFT CARRY INTO DATA AREA BAY04640 |
| FEC8 | 6910 | 465 | | ROL | RSTAD,X | BAY04650 |
| FECA | 4A | 466 | | DEC A | | DECREMENT BIT COUNTER BAY04660 |
| FECB | 2718 | 467 | | BEQ | RBCH | IF BIT COUNT = 0 GO RECEIVE BCH BAY04670 |
| FECD | 01 | 468 | | NOP | | TIMING DUMMY BAY04680 |
| FECE | 8110 | 469 | | CMP A | #$10 | IF BIT COUNT GT 16 BAY04690 |
| FED0 | 26EB | 470 | | BNE | NXTCA | GO TO NEXT CA BIT BAY04700 |
| FED2 | 67F8 | 471 | NXTBIT | ASR | $F8,X | SHIFT BIT INTO CARRY BAY04710 |
| FED4 | 8D34 | 472 | | BSR | BCHC | COMPUTE BCH BAY04720 |
| FED6 | 6913 | 473 | | ROL | RLDATA,X | SHIFT BIT INTO RECEIVE DATA LOCATION BAY04730 |
| FED8 | 6912 | 474 | | ROL | RMDATA,X | BAY04740 |
| FEDA | DE06 | 475 | | LDX | BT178 | DELAY TO CENTER OF NEXT BIT BAY04750 |
| FEDC | 8D26 | 476 | | BSR | DELAY | BAY04760 |
| FEDE | 4A | 477 | | DEC A | | DECREMENT BIT COUNTER, IF EQUAL TO ZERO GO BAY04770 |
| FEDF | 2704 | 478 | | BEQ | RBCH | RECEIVE BCH. BAY04780 |
| FEE1 | 9500 | 479 | | BIT A | $00 | ELSE CONTINUE TO RECEIVE DATA AT BAY04790 |
| FEE3 | 20ED | 480 | | BRA | NXTBIT | SHIFT BIT INTO CARRY. BAY04800 |
| FEE5 | 58 | 481 | RBCH | ASL B | | RECEIVE BCH BAY04810 |
| FEE6 | 37 | 482 | | PSH B | | SAVE COMPUTED BCH BAY04820 |
| FEE7 | 8607 | 483 | | LDA A | #$07 | SET BIT COUNTER TO 7 BAY04830 |

```
EE9  67F8      484 NXTBCH  ASR   $F8,X           SHIFT BIT INTO CARRY.                    BAY04840
EEB  59        485         ROL B                 SHIFT CARRY BIT INTO B REGISTER.         BAY04850
EEC  4A        486         DEC A                 DECREMENT BIT COUNTER.                   BAY04860
EED  270B      487         BEQ   CKBCH           IF IT EQUALS ZERO GO TO CHECK BCH        BAY04870
EEF  DE06      488         LDX   BT178           ELSE DELAY TO CENTER OF NEXT BIT.        BAY04880
EF1  08        489         INX                                                            BAY04890
EF2  08        490         INX                                                            BAY04900
EF3  BDFF04    491         JSR   DELAY                                                    BAY04910
EF6  6D00      492         TST   $00,X           CONTINUE TO REC. BCH AT SHIFT BIT INTO CAR BAY04920
EF8  20EF      493         BRA   NXTBCH                                                   BAY04930
               494 *                             CHECK BCH                                BAY04940
                                                                                          BAY04950
EFA  32        495 CKBCH   PUL A                                                          BAY04960
EFB  58        496         ASL B                 COMPARE COMPUTED & RECEIVED BCH          BAY04970
EFC  11        497         CBA                   IF BCH OK SET CONDITION EQUAL            BAY04980
EFD  2702      498         BEQ   EXIT            IF NOT EQUAL SET CONDITION MINUS         BAY04990
EFF  86FF      499         LDA A #$FF                                                     BAY05000
F01  01        500 EXIT    NOP                   ENABLE INTERRUPTS                        BAY05010
F02  0E        501         CLI                                                            BAY05020
F03  39        502         RTS                                                            BAY05030
F04  A500      503 DELAY   BIT A $00,X           DELAY                                    BAY05040
F06  09        504 DELY    DEX                   THE DELAY IS 13 USEC TIMES               BAY05050
F07  26FB      505         BNE   DELAY           THE VALUE OF THE X REGISTER              BAY05060
F09  39        506         RTS                                                            BAY05070
F0A  250A      507 BCHC    BCS   ROLB            COMPUTE BCH                              BAY05080
F0C  59        508         ROL B                 THIS SUBROUTINE HAS A FIXED TIME DELAY OF BAY05090
F0D  2B03      509         BMI   EORB9           19 USEC INCLUDING THE RTS.               BAY05100
F0F  01        510         NOP                                                            BAY05110
F10  0C        511         CLC                   THE CARRY BIT CONTAINS THE LAST BIT TRANSM BAY05120
F11  39        512         RTS                                                            BAY05130
F12  C809      513 EORB9   EOR B #$09                                                     BAY05140
F14  0C        514         CLC                   BCH IS COMPUTED ON EACH BIT BY THE       BAY05150
F15  39        515         RTS                   POLYNOMIAL X7 + X3 + 1                   BAY05160
F16  59        516 ROLB    ROL B                                                          BAY05170
F17  2B04      517         BMI   EORB1                                                    BAY05180
F19  C808      518         EOR B #$08                                                     BAY05190
F1B  0D        519         SEC                                                            BAY05200
F1C  39        520         RTS                                                            BAY05210
F1D  C801      521 EORB1   EOR B #$01                                                     BAY05220
F1F  0D        522         SEC                                                            BAY05230
F20  39        523         RTS                                                            BAY05240
F21  01        524 XMIT    NOP                   DISABLE INTERRUPT.                       BAY05250
F22  0F        525         SEI                                                            BAY05260
F23  5F        526         CLR B                 TRANSMIT SYNC PATTERN.                   BAY05270
F24  D7F8      527         STA B $F8             TRANSMIT C/A                             BAY05280
F26  9614      528         LDA A  XOPAD          1.5 BIT TIME - 26 USEC                   BAY05290
F28  DE08      529 SYNC    LDX   BT1526                                                   BAY05300
F2A  8DD8      530         BSR   DELAY                                                    BAY05310
F2C  53        531         COM B                                                          BAY05320
F2D  D7F8      532         STA B $F8                                                      BAY05330
F2F  26F7      533         BNE   SYNC                                                     BAY05340
F31  CE0003    534         LDX  #$0003                                                    BAY05350
F34  8DD0      535         BSR   DELY                                                     BAY05360
F36  01        536         NOP                   TRANSMIT DATA                            BAY05370
F37  DE06      537 XDATA   LDX   BT178           DELAY 1.0 BIT TIME - 78 USEC             BAY05380
F39  8DC9      538         BSR   DELAY           SERIALIZE DATA                           BAY05390
F3B  97F8      539         STA A $F8                                                      BAY05400
F3D  780017    540         ASL   XLDATA                                                   BAY05410
F40  790016    541         ROL   XMDATA                                                   BAY05420
F43  790015    542         ROL   XCHPT                                                    BAY05430
F46  49        543         ROL A                 COMPUTE BCH IN B REGISTER.               BAY05440
F47  8DC1      544         BSR   BCHC            DECREMENT XMIT BIT COUNTER               BAY05450
F49  7A000A    545         DEC   XBITC           IF IT IS NOT ZERO TRANSMIT NEXT BIT      BAY05460
F4C  26E9      546         BNE   XDATA           TRANSMIT BCH                             BAY05470
F4E  0D        547         SEC                                                            BAY05480
F4F  59        548         ROL B                                                          BAY05490
F50  A500      549         BIT A $00,X           TIMING DUMMY                             BAY05500
F52  DE06      550         LDX   BT178           GET 1.0 BIT TIME - 78 USEC               BAY05510
F54  09        551         DEX                   PREPARE FOR 1.0 BIT TIME - 91 USEC       BAY05520
F55  8DAD      552 BCHDLY  BSR   DELAY           DELAY TO NEXT BIT                        BAY05530
F57  D7F8      553         STA B $F8             SHIFT OUT BCH                            BAY05540
F59  58        554         ASL B                                                          BAY05550
F5A  2708      555         BEQ   CLRRTS          IF BCH TRANSMITTED GO CLEAR RTS          BAY05560
F5C  DE06      556         LDX   BT178           ELSE CONTINUE TO TRANSMIT BCH            BAY05570
F5E  08        557         INX                   PREPARE FOR 1.0 BIT TIME - 52 USEC       BAY05580
F5F  08        558         INX                                                            BAY05590
F60  8D08      559         BSR   RTS             TIMING DUMMY                             BAY05600
F62  20F1      560         BRA   BCHDLY                                                   BAY05610
F64  863C      561 CLRRTS  LDA A #$3C            CLEAR RTS                                BAY05620
F66  97F9      562         STA A $F9                                                      BAY05630
F68  01        563         NOP                   ENABLE INTERRUPT                         BAY05640
F69  0E        564         CLI                   RETURN FROM SUBROUTINE                   BAY05650
F6A  39        565 RTS     RTS                   CLEAR POLL BIT                           BAY05660
F6B  CEFFFF    566 IRQ     LDX  #$FFFF           CLEAR ATN MASK                           BAY05670
F6E  DFF6      567 CLRATN  STX   $F6             RESET PIA CLR ATN                        BAY05680
F70  8604      568         LDA A #$04                                                     BAY05690
F72  97FB      569         STA A $FB             CLEAR INTERRUPT FLAG                     BAY05700
F74  96FA      570         LDA A $FA                                                      BAY05710
F76  3B        571         RTI                   ROM A CHECK SUM ADJUST                   BAY05720
F77  3D        572         FCB   $3D                                                      BAY05730
               573 *                             BAUD RATE TABLE                          BAY05740
               574 *                             EACH DOUBLE BYTE REPRESENTS 1.0 BIT TIME BAY05750
               575 *                             EACH ENTRY = 1.0 BIT TIME / 13 USEC      BAY05760
               576 *                             EXAMPLE: 9600 BAUD                       BAY05770
               577 *                             1.0 BIT TIME = 104 USEC                  BAY05780
               578 *                             ENTRY = 104/13 = 0008                    BAY05790
               579 *
```

|       |      |     |     |     |      |      |      |     |     |
|-------|------|-----|-----|-----|------|------|------|-----|-----|
| FF78  |      | 580 |     | ORG | $FFE8|      |      |     |     |
| FFE8  | 0008 | 581 |     | FDB | 0008 |      | 9600 |     |     |
| FFEA  | 0010 | 582 |     | FDB | $0010|      | 4800 |     |     |
| FFEC  | 0020 | 583 |     | FDB | $0020|      | 2400 |     |     |
| FFEE  | 0040 | 584 |     | FDB | $0040|      | 1200 |     |     |
| FFF0  | 0080 | 585 |     | FDB | $0080|      | 600  |     |     |
| FFF2  | 0100 | 586 |     | FDB | $0100|      | 300  |     |     |
| FFF4  | 0200 | 587 |     | FDB | $0200|      | 150  |     |     |
| FFF6  | 0200 | 588 |     | FDB | $0200|      | 150  |     |     |
| FFF8  | FF6B | 589 |     | FDB | IRQ  |      |      |     |     |
| FFFA  | FC14 | 590 |     | FDB | RES  |      |      |     |     |
| FFFC  | FC14 | 591 |     | FDB | RES  |      |      |     |     |
| FFFE  | FC14 | 592 |     | FDB | RES  |      |      |     |     |
| 0000  |      | 593 |     | END |      |      |      |     |     |

| Symbol | Addr | Ref | Ref | Ref | Ref | Ref | Ref | Ref | Ref |
|--------|------|-----|-----|-----|-----|-----|-----|-----|-----|
| ADDR   | FCCE | 190 |     |     |     |     |     |     |     |
| ANG    | FE64 | 410 | 414 |     |     |     |     |     |     |
| ANG1   | FE6B | 414 | 413 |     |     |     |     |     |     |
| ANG2   | FE69 | 413 | 405 |     |     |     |     |     |     |
| ATNMSK | 001D | 58  | 197 | 199 | 200 | 302 | 306 | 310 |     |
| BAUD   | FE09 | 361 | 138 | 319 |     |     |     |     |     |
| BCHC   | FF0A | 507 | 461 | 472 | 544 |     |     |     |     |
| BCHDLY | FF55 | 552 | 560 |     |     |     |     |     |     |
| BCHERR | FE03 | 357 | 349 |     |     |     |     |     |     |
| BFAIL  | FC63 | 131 | 160 | 168 |     |     |     |     |     |
| BRV    | 001F | 59  | 338 | 362 | 367 | 368 | 369 | 387 |     |
| BT1    | 0002 | 39  | 372 | 373 | 376 | 377 | 386 | 387 |     |
| BT15   | 0004 | 40  | 378 | 379 | 392 | 393 | 403 | 404 |     |
| BT1526 | 0008 | 42  | 396 | 397 | 529 |     |     |     |     |
| BT15X  | 000D | 45  | 400 | 401 | 456 |     |     |     |     |
| BT178  | 0006 | 41  | 390 | 391 | 462 | 475 | 488 | 537 | 550 | 556 |
| BT375  | 000B | 44  | 363 | 384 | 385 | 410 | 411 |     |     |
| CCTS   | FCB3 | 174 | 171 |     |     |     |     |     |     |
| CK5OR6 | FDB5 | 317 | 308 |     |     |     |     |     |     |
| CKACT  | FE74 | 420 | 417 |     |     |     |     |     |     |
| CKATN  | FD9A | 301 | 262 | 356 |     |     |     |     |     |
| CKBCH  | FEFA | 495 | 487 |     |     |     |     |     |     |
| CKCTS  | FCAC | 169 | 159 | 246 |     |     |     |     |     |
| CKORUN | FD7C | 284 | 275 |     |     |     |     |     |     |
| CKSYNC | FE58 | 403 | 434 | 452 |     |     |     |     |     |
| CLRATN | FF6E | 567 |     |     |     |     |     |     |     |
| CLRLB  | FD51 | 260 |     |     |     |     |     |     |     |
| CLRLED | FD4C | 258 | 255 |     |     |     |     |     |     |
| CLRRTS | FF64 | 561 | 555 |     |     |     |     |     |     |
| COMBR  | FE1D | 370 | 343 |     |     |     |     |     |     |
| COMPBR | FE1B | 369 |     |     |     |     |     |     |     |
| CRAM   | FC5D | 128 | 134 |     |     |     |     |     |     |
| CTS    | FCAE | 170 | 176 |     |     |     |     |     |     |
| CTSERR | FDC6 | 325 | 248 |     |     |     |     |     |     |
| DELAY  | FF04 | 503 | 364 | 457 | 463 | 476 | 491 | 506 | 530 | 538 | 552 | 5 |
| DELY   | FF06 | 504 | 535 |     |     |     |     |     |     |
| DLAY   | FDEC | 345 | 346 |     |     |     |     |     |     |
| DONE   | FDB9 | 319 | 324 |     |     |     |     |     |     |
| EORB1  | FF1D | 521 | 517 |     |     |     |     |     |     |
| EORB9  | FF12 | 513 | 509 |     |     |     |     |     |     |
| ERR    | FDFE | 355 | 326 |     |     |     |     |     |     |
| EXIT   | FF01 | 500 | 498 |     |     |     |     |     |     |
| FAIL   | FC10 | 83  | 106 | 113 | 131 |     |     |     |     |
| IRCV   | FE96 | 440 | 435 |     |     |     |     |     |     |
| IRQ    | FF6B | 566 | 589 |     |     |     |     |     |     |
| JRETRY | FDEF | 347 | 337 |     |     |     |     |     |     |
| JUFRES | FD64 | 270 | 323 |     |     |     |     |     |     |
| JXMIT  | FD39 | 249 | 247 |     |     |     |     |     |     |
| LEDERR | FDF9 | 352 | 329 | 369 |     |     |     |     |     |
| LLED   | FC01 | 75  | 83  | 92  | 180 | 188 | 224 | 259 | 363 | 455 |
| MYADDR | 000F | 46  | 195 |     |     |     |     |     |     |
| NEWI   | FD00 | 219 | 209 |     |     |     |     |     |     |
| NXTBCH | FEE9 | 484 | 493 |     |     |     |     |     |     |
| NXTBIT | FED2 | 471 | 480 |     |     |     |     |     |     |
| NXTCA  | FEBD | 460 | 470 |     |     |     |     |     |     |
| OK     | FC65 | 132 | 129 |     |     |     |     |     |     |
| OPSOR6 | FDBE | 321 | 318 |     |     |     |     |     |     |
| OPFLAG | 001C | 57  | 254 | 268 | 317 | 331 |     |     |     |
| OPFLG  | FD5F | 267 | 265 |     |     |     |     |     |     |
| ORUN   | 0024 | 62  | 186 | 215 | 235 | 281 | 284 | 300 |     |
| OVRUN  | FDCA | 327 | 285 |     |     |     |     |     |     |
| PASNO  | FC4F | 120 | 136 |     |     |     |     |     |     |
| PDLY   | FCC1 | 182 | 183 | 185 |     |     |     |     |     |
| PIACA  | 00F9 | 70  |     |     |     |     |     |     |     |
| PIACB  | 00FB | 72  |     |     |     |     |     |     |     |
| PIAPA  | 00F8 | 69  |     |     |     |     |     |     |     |
| PIAPB  | 00FA | 71  |     |     |     |     |     |     |     |
| RBCH   | FEE5 | 481 | 467 | 478 |     |     |     |     |     |
| RBIT   | FCDE | 199 | 202 |     |     |     |     |     |     |
| RBITC  | 0001 | 38  | 147 | 269 | 458 |     |     |     |     |
| RCA    | FEB7 | 457 |     |     |     |     |     |     |     |
| RCHPT  | 0011 | 48  | 289 | 464 |     |     |     |     |     |
| RECERR | FDD0 | 330 | 272 |     |     |     |     |     |     |
| RECV   | FE7B | 424 |     |     |     |     |     |     |     |
| REG0   | 00F0 | 65  |     |     |     |     |     |     |     |
| REG1   | 00F2 | 66  |     |     |     |     |     |     |     |
| REG2   | 00F4 | 67  |     |     |     |     |     |     |     |
| REG3   | 00F6 | 68  |     |     |     |     |     |     |     |
| RES    | FC14 | 85  | 590 | 591 | 592 |     |     |     |     |
| RESERR | FDF5 | 350 |     |     |     |     |     |     |     |
| RESP   | FE6F | 416 | 422 | 439 |     |     |     |     |     |

| | | | | | |
|---|---|---|---|---|---|
| RETRY | 0023 | 61 | 207 | 333 | 336 |
| RLDATA | 0013 | 50 | 295 | 473 | |
| RMDATA | 0012 | 49 | 292 | 474 | |
| ROLB | FF16 | 516 | 507 | | |
| ROM | FC29 | 98 | 84 | | |
| RSTAD | 0010 | 47 | 286 | 321 | 465 |
| RTRY | FD0B | 225 | 347 | | |
| RTS | FF6A | 565 | 559 | | |
| SETATN | FDA8 | 310 | 304 | | |
| SETERR | FDF2 | 348 | 332 | 334 | 342 |
| START | FCC7 | 186 | | | |
| STOUT | FC7B | 144 | 142 | | |
| STPASS | FCBA | 179 | 163 | | |
| STRCOM | FD94 | 298 | | | |
| SUMA | FC3E | 109 | 111 | | |
| SUMB | FC2F | 101 | 104 | | |
| SXBC | FD1C | 234 | 232 | | |
| SYNC | FF28 | 529 | 533 | | |
| SYNC1 | 0018 | 55 | 431 | 432 | 433 |
| SYNC2 | 001A | 56 | 449 | 450 | 451 |
| SYNERR | FE90 | 436 | 444 | 453 | |
| TOUT | 0025 | 63 | 144 | 169 | 415 |
| TS1 | FE80 | 427 | 430 | | |
| TS2 | FE99 | 441 | 448 | | |
| UNUSED | 0000 | 37 | | | |
| WFI | FCED | 208 | 211 | 218 | |
| WFNI | FCE5 | 204 | 320 | | |
| WFR | FD57 | 263 | 257 | | |
| WFRES | FE6D | 415 | 162 | 270 | |
| WRAM | FC53 | 122 | 125 | | |
| XBITC | 000A | 43 | 157 | 234 | 545 |
| XCHPT | 0015 | 52 | 153 | 239 | 542 |
| XDATA | FF37 | 537 | 546 | | |
| XLDATA | 0017 | 54 | 155 | 245 | 540 |
| XMDATA | 0016 | 53 | 154 | 242 | 541 |
| XMIT | FF21 | 524 | 161 | 249 | |
| XOP3AD | FC83 | 149 | 167 | | |
| XOPAD | 0014 | 51 | 149 | 165 | 236 | 252 | 528 |
| XTEMP | 0021 | 60 | 423 | 436 | |

APPENDIX 2

```
       1 **BCK                                                                         BCK00000
       3 *    THIS PROGRAM LISTING IS FOR THE OPTROL 3600 REMOTE DEVICE                BCK00020
       4 *    CONTROLLER (RDC-3), APPLIED AUTOMATION, INC. #B06G74.  THIS              BCK00030
       5 *    PROGRAM IS BURNED INTO TWO 512X8 PROMS, APPLIED AUTOMATION, INC.          BCK00040
       6 *    #D24002 AND #D24003.  PROM #D24002 CONTAINS THE PROGRAM FROM              BCK00050
       7 *    MEMORY LOCATION FC00 TO FDFF. PROM #D24003 CONTAINS THE PROGRAM           BCK00060
       8 *    FROM MEMORY LOCATION FE00 TO FFFF.                                        BCK00070
       9 *                                                                              BCK00080
      10 *    EXECUTION OF THIS PROGRAM BEGINS AT LOCATION FF46 (RES).                  BCK00090
      11 *    WHEN NOT ACTIVE THE PROGRAM NORMALLY RESIDES AT THE 'CHECK FOR            BCK00100
      12 *    SPACE' (CKFSP) ROUTINE, LOCATION FE60, WAITING FOR A SYNC                 BCK00110
      13 *    PATTERN.                                                                  BCK00120
      14 *                                                                              BCK00130
      15 *    THIS PROGRAM TRANSMITS AND RECEIVES SERIAL DATA BIT BY BIT.               BCK00140
      16 *    TIMING IS CONTROLLED BY THE FREQUENCY OF THE MICROPROCESSOR               BCK00150
      17 *    CLOCK (1MHZ) AND THE NUMBER OF CLOCK CYCLES REQUIRED BY EACH              BCK00160
      18 *    INSTRUCTION.  SHOULD IT BE NECESSARY TO MODIFY ANY OF THE                 BCK00170
      19 *    TRANSMIT OR RECEIVE PROGRAMS, CARE SHOULD BE TAKEN TO PRESERVE            BCK00180
      20 *    THE CURRENT ELAPSED TIME.                                                 BCK00190
      21 *    BAUD RATES MAY BE CHANGED OR ADDED TO THE BAUD RATE TABLE AT FFE8 BCK00200
      22 *    ANY NUMBER OF BAUD RATES MAY BE ADDED HOWEVER LOCATIONS FE66              BCK00210
      23 *    AND FE95 MAY NEED TO BE CHANGED TO ACCOMODATE A LARGER TABLE.             BCK00220
      24 *    ALL BAUD RATE ENTRIES SHOULD BE IN DESCENDING ORDER.  SHOULD              BCK00230
      25 *    BAUD RATES LESS THAN 150 BAUD BE ADDED, THE SYNC 2 TIME LIMIT             BCK00240
      26 *    (FEF3) MAY NEED TO BE CHANGED.                                            BCK00250
      27 *                                                                              BCK00260
      28 *    SHOULD A PROGRAM CHANGE BE MADE, THE ROM CHECK SUMS WILL NEED TO          BCK00270
      29 *    BE ADJUSTED.  ROM B (FC00-FDFF) CHECK SUM IS LOCATED AT FC00.             BCK00280
      30 *    ROM A CHECK SUM IS LOCATED AT THE END OF THE PROGRAM                      BCK00290
      31 *                                                                              BCK00300
      32 *    LOCATIONS FFD5 THRU FFE7 ARE NOT USED.                                    BCK00310
      33 *    RAM AND PIA LOCATIONS ARE LISTED BELOW:                                   BCK00320
0000  34          ORG   0                                                               BCK00330
0000  35          RMB   2        ZERO CONSTANT                                          BCK00340
0002  36          RMB   2        1.0 BIT TIME                                           BCK00350
0004  37          RMB   2        1.5 BIT TIME                                           BCK00360
0006  38          RMB   2        1.0 BIT TIME - 78 USEC                                 BCK00370
0008  39          RMB   2        1.5 BIT TIME - 26 USEC                                 BCK00380
000A  40          RMB   1        TRANSMIT BIT COUNTER                                   BCK00390
000B  41          RMB   2        0.375 BIT TIME                                         BCK00400
000D  42          RMB   2        1.5 BIT TIME - 104 USEC                                BCK00410
000F  43          RMB   1        MY ADDRESS                                             BCK00420
0010  44          RMB   1        RECEIVE OP CODE AND RTU ADDRESS                        BCK00430
0011  45          RMB   1        RECEIVE CHANNEL AND POINT                              BCK00440
0012  46          RMB   2        RECEIVE DATA                                           BCK00450
0014  47          RMB   1        TRANSMIT STATUS AND ADDRESS                            BCK00460
0015  48          RMB   1        TRANSMIT CHANNEL AND POINT                             BCK00470
0016  49          RMB   2        TRANSMIT DATA                                          BCK00480
0018  50          RMB   2        SYNC 1                                                 BCK00490
001A  51          RMB   2        SYNC 2                                                 BCK00500
001C  52          RMB   1        BLOCK COUNTER                                          BCK00510
001D  53          RMB   2        ELAPSED TIME                                           BCK00520
001F  54          RMB   1        END CHANNEL AND POINT (STREAM)                         BCK00530
0020  55          RMB   1        START CHANNEL AND POINT (STREAM)                       BCK00540
```

```
0021          56 *
              57       ORG    $F4
00F4          58       RMB    1             PIA
00F5          59       RMB    1             3600 BUS DS AND CMD
00F6          60       RMB    1             3600 BUS ADDRESS
00F7          61       RMB    2             3600 BUS EOT AND IOR
00F9          62       RMB    1             3600 BUS DATA
00FA          63       RMB    1             3600 BUS LP AND IOW
00FB          64       RMB    1             SERIAL LINE AND STATUS INDICATORS
00FC          65       ORG    $FC00         SERIAL LINE CONTROL
FC00 DB       66       FCB    $DB           ROMB CHECK SUM ADJUST
FC01 C638     67 SETBUS LDA B  #$38         SET BUS DIRECTION
FC03 D7F6     68       STA B  $F6           SELECT DATA DIRECTION REGISTERS
FC05 D7F9     69       STA B  $F9
FC07 DFF7     70       STX    $F7           STORE DATA DIRECTION DATA
FC09 C63C     71       LDA B  #$3C          SELECT PERIPHERAL REGISTERS
FC0B D7F6     72       STA B  $F6
FC0D D7F9     73       STA B  $F9
FC0F 39       74       RTS                  RETURN FROM SUBROUTINE
FC10 9610     75 OPCODE LDA A  $10          OP CODE DECODE
FC12 2B01     76       BMI    SXCHPT        IF FIRST BIT OF OP CODE EQUALS A 1
FC14 09       77       DEX                  SET BUS AS INPUTS
FC15 8DEA     78 SXCHPT BSR    SETBUS       ELSE SET BUS AS OUTPUTS
FC17 D611     79       LDA B  $11           SET UP TRANSMIT CHANNEL AND POINT
FC19 D715     80       STA B  $15
FC1B 84E0     81       AND A  #$E0          ELIMINATE ADDRESS BITS
FC1D 44       82       LSR A
FC1E 273B     83       BEQ    OP0           IF OP CODE EQUALS ZERO, GO TO OP 0
FC20 8170     84       CMP A  #$70          IF OP CODE EQUALS 7, GO TO CLEAR
FC22 2745     85       BEQ    JCLRCH        CHANNEL AND POINT
FC24 CC35     86       LDA B  #$35          OTHERWISE SET RTS LOW AND
FC26 D7FB     87       STA B  $FB           RX FOR FALLING EDGE IRQ
FC28 D6FA     88       LDA B  $FA           CLEAR THE FLAG BIT AND
FC2A 01       89       NOP
FC2B 0E       90       CLI                  ENABLE THE INTERRUPT
FC2C DE0D     91       LDX    $0D           DELAY 1.5 BIT TIME - 130 USEC
FC2E BDFDAE   92       JSR    DELAY
FC31 8110     93       CMP A  #$10          IF OP CODE EQUALS 1 GO TO OP 1
FC33 2737     94       BEQ    OP1
FC35 C620     95       LDA B  #$20          ELSE SET UP TRANSMIT BIT COUNTER = 32 BITS
FC37 D70A     96       STA B  $0A
FC39 8130     97       CMP A  #$30
FC3B 2D38     98       BLT    OP2           IF OP CODE IS LESS THAN 3 GO TO OP 2
FC3D 2742     99       BEQ    OP3           IF OP CODE EQUALS 3 GO TO OP 3
FC3F 8150    100       CMP A  #$50
FC41 2D44    101       BLT    OP4           IF OP CODE IS LESS THAN 5 GO TO OP 4
FC43 2600    102       BNE    OP6           IF OP CODE IS NOT EQUAL TO 5 GO TO OP 6
FC45 7EFD00  103       JMP    OP5           ELSE GO TO OP 5
FC48 730012  104 SELWR COM    $0012         SELECT DEVICE AND WRITE DATA
FC4B 730013  105       COM    $0013         COMPLEMENT RECEIVED DATA
FC4E 8D3B    106       BSR    SELECT        SELECT DEVICE
FC50 2A03    107       BPL    SWEND         IF DEVICE NOT AVAILABLE RETURN FROM SUBROU
FC52 DE12    108 WRITE LDX    $12           ELSE WRITE DATA BY
FC54 DFF7    109       STX    $F7           PUTTING DATA ON BUS AND
FC56 97F9    110       STA A  $F9           PULSING IOW
FC58 D7F9    111       STA B  $F9
FC5A 39      112 SWEND RTS                  RETURN FROM SUBROUTINE.
             113 *                          OP CODE 0 (WRITE NO ECHO)
FC5B 8DEB    114 OP0   BSR    SELWR         SELECT DEVICE AND WRITE DATA
FC5D 2B0A    115       BMI    JCLRCH        IF DEV AVAIL GO CLEAR CHANNEL AND POINT
FC5F 9611    116       LDA A  $11           IF DEVICE NOT AVAILABLE CHECK FOR
FC61 84F0    117       AND A  #$F0          CHANNEL ZERO
FC63 2604    118       BNE    JCLRCH        IF NOT CHANNEL ZERO GO CLEAR CHANNEL & POI
FC65 8634    119       LDA A  #$34          ELSE WRITE DATA
FC67 8DE9    120       BSR    WRITE
FC69 7EFD56  121 JCLRCH JMP   CLRCH         JUMP TO CLEAR CHANNEL AND POINT.
             122 *                          OP CODE 1 (WRITE/ECHO)
FC6C 8DDA    123 OP1   BSR    SELWR         SELECT DEVICE AND WRITE DATA
FC6E C610    124       LDA B  #$10          SET TRANSMIT BIT COUNTER TO 16
FC70 D70A    125       STA B  $0A
FC72 7EFD4E  126 JEND  JMP    END           GO TO END
             127 *                          OP CODE 2 (WRITE/READ)
FC75 8DD1    128 OP2   BSR    SELWR         SELECT DEVICE AND WRITE DATA
FC77 27F9    129       BEQ    JEND          IF DEVICE NOT AVAILABLE GO TO END
FC79 DE00    130       LDX    $00           OTHERWISE SET BUS DIRECTION TO INPUTS.
FC7B 8D34    131       BSR    SETBUS
FC7D 8DED    132       BSR    READ          READ DATA FROM THE DEVICE
FC7F 20F1    133       BRA    JEND          GO TO 'END'
             134 *                          OP CODE 3 (TEST)
FC81 DE12    135 OP3   LDX    $12           PLACE RECEIVED DATA IN
FC83 DF16    136       STX    $16           TRANSMIT DATA AREA
FC85 20EB    137       BRA    JEND          GO TO 'END'
             138 *                          OP CODE 4 (READ)
FC87 8D5F    139 OP4   BSR    SELRD         SELECT DEVICE AND READ DATA
FC89 20E7    140       BRA    JEND          GO TO 'END'
             141 *                          SELECT DEVICE
FC8B DEF7    142 SELECT LDX   $F7           CLEAR FLAGS
FC8D 96F5    143       LDA A  $F5           EOT, LP, & DS
FC8F 8634    144       LDA A  #$34
FC91 D615    145       LDA B  $15           LOAD B REG. WITH XMIT CHANNEL AND POINT
FC93 53      146       COM B                COMPLEMENT IT AND
FC94 D7F5    147       STA B  $F5           PUT CHANNEL AND POINT ON BUS
FC96 C63C    148       LDA B  #$3C
FC98 97F4    149       STA A  $F4           PULSE CMD
FC9A D7F4    150       STA B  $F4
```

```
FC9C  DFF4    151         LDA B   $F4              CHECK DS                                        BCK01500
FC9E  2A23    152         BPL     SETDU            IF NO DS GO TO 'SET DU' ELSE                    BCK01510
FCA0  D6F6    153         LDA B   $F6              CHECK EOT                                       BCK01520
FCA2  2A36    154         BPL     EOTO             IF NO EOT GO TO 'EOTO' (EOT TIME OUT) ELSEBCK01530
FCA4  39      155         RTS                      RETURN FROM SUBROUTINE WITH MINUS CONDITIOBCK01540
              156 *                                OP CODE 6 (BLOCK)                               BCK01550
FCA5  8D41    157 OP6     BSR     SELRD            SELECT DEVICE AND READ DATA                     BCK01560
FCA7  26C9    158         BNE     JEND             IF DEVICE NOT AVAILABLE GO TO 'END'             BCK01570
FCA9  4A      159         DEC A                    ELSE SET BLOCK COUNT EQUAL TO 255               BCK01580
FCAA  971C    160         STA A   $1C                                                              BCK01590
FCAC  5D      161 CKLP    TST B                    CHECK FOR LP, IF LAST POINT GO TO 'END'         BCK01600
FCAD  2BC3    162         BMI     JEND                                                             BCK01610
FCAF  7A001C  163         DEC     $001C            ELSE DECREMENT BLOCK COUNT                      BCK01620
FCB2  275E    164         BEQ     JEND             IF BLOCK COUNT EQUALS ZERO GO TO 'END'.         BCK01630
FCB4  BDFD48  165         JSR     XANDLY           ELSE TRANSMIT DATA AND DELAY 1 BIT TIME         BCK01640
FCB7  8620    166         LDA A   #$20             SET UP TRANSMIT BIT COUNTER                     BCK01650
FCB9  970A    167         STA A   $0A                                                              BCK01660
FCBB  9611    168         LDA A   $11              SET UP TRANSMIT CHANNEL AND POINT               BCK01670
FCBD  9715    169         STA A   $15                                                              BCK01680
FCBF  8D2B    170         BSR     READ             READ DATA FROM DEVICE                           BCK01690
FCC1  20E9    171         BRA     CKLP             CONTINUE TO CHECK FOR LP                        BCK01700
              172 *                                SET DEVICE UNAVAILABLE BIT                      BCK01710
FCC3  8620    173 SETDU   LDA A   #$20             SET DU BIT                                      BCK01720
FCC5  9A0F    174 SETBIT  ORA A   $0F              SET DU BIT AND ADDRESS IN TRANSMIT ARE          BCK01730
FCC7  9714    175         STA A   $14                                                              BCK01740
FCC9  8631    176         LDA A   #$31                                                             BCK01750
FCCB  01      177         NOP                                                                      BCK01760
FCCC  0F      178         SEI                                                                      BCK01770
FCCD  97FB    179         STA A   $FB                                                              BCK01780
FCCF  86A4    180         LDA A   #$A4             LIGHT DEVICE UNAVAILABLE AND MY ADDRESS LEBCK01790
FCD1  97FA    181         STA A   $FA                                                              BCK01800
FCD3  8635    182         LDA A   #$35             LEAVING RTS LOW                                 BCK01810
FCD5  97FB    183         STA A   $FB                                                              BCK01820
FCD7  01      184         NOP                                                                      BCK01830
FCD8  0E      185         CLI                                                                      BCK01840
FCD9  39      186 EXITA   RTS                      RETURN FROM SUBROUTINE                          BCK01850
              187 *                                EOT TIME OUT                                    BCK01860
FCDA  CE0683  188 EOTO    LDX     #$0683           SET UP COUNT                                    BCK01870
FCDD  D6F6    189 CKEOT   LDA B   $F6              CHECK FOR EOT TO OCCUR DURING A 26.7 MS         BCK01880
FCDF  2DF8    190         BMI     EXITA            TIME OUT.                                       BCK01890
FCE1  09      191         DEX                      IF IT DOES, RETURN FROM SUBROUTINE              BCK01900
FCE2  26F9    192         BNE     CKEOT            OTHERWISE SET EOT BIT AND LIGHT DEVICE          BCK01910
FCE4  8680    193         LDA A   #$80             UNAVAILABLE LED                                 BCK01920
FCE6  20DD    194         BRA     SETBIT           AND RETURN FROM SUBROUTINE                      BCK01930
              195 *                                SELECT DEVICE AND READ DATA                     BCK01940
FCE8  8DA1    196 SELRD   BSR     SELECT           SELECT DEVICE.  IF DEVICE                       BCK01950
FCEA  2A13    197         BPL     SREND            NOT AVAILABLE GO TO RETURN FROM SUBROUTINEBCK01960
              198 *                                READ DATA FROM SELECTED DEVICE                  BCK01970
FCEC  D6F9    199 READ    LDA B   $F9              GET LP STATUS IN B REG.                         BCK01980
FCEE  8634    200         LDA A   #$34                                                             BCK01990
FCF0  97F6    201         STA A   $F6              RAISE IOR                                       BCK02000
FCF2  DEF7    202         LDX     $F7              READ DATA                                       BCK02010
FCF4  D7F6    203         STA B   $F6              DROP IOR                                        BCK02020
FCF6  DF16    204         STX     $16              STORE DATA                                      BCK02030
FCF8  730016  205         COM     $0016            COMPLEMENT DATA                                 BCK02040
FCFB  730017  206         COM     $0017                                                            BCK02050
FCFE  4F      207         CLR A                    SET CONDITION TO EQUAL AND                      BCK02060
FCFF  39      208 SREND   RTS                      RETURN FROM SUBROUTINE.                         BCK02070
              209 *                                OP CODE 5 (STREAM)                              BCK02080
FD00  9611    210 OP5     LDA A   $11              SEPARATE START CHANNEL ADN END CHANNEL          BCK02100
FD02  16      211         TAB                                                                      BCK02110
FD03  84F0    212         AND A   #$F0                                                             BCK02120
FD05  58      213         ASL B                                                                    BCK02130
FD06  58      214         ASL B                                                                    BCK02140
FD07  58      215         ASL B                                                                    BCK02150
FD08  58      216         ASL B                                                                    BCK02160
FD09  CA0F    217         ORA B   #$0F                                                             BCK02170
FD0B  D71F    218         STA B   $1F              STORE END CHANNEL POINT F                       BCK02180
FD0D  11      219         CBA                      CHECK FOR START LT END CHANNEL                  BCK02190
FD0E  224A    220         BHI     CLRRTS                                                           BCK02200
FD10  9715    221 STCHPT  STA A   $15              STORE CURRENT CHANNEL AND POINT                 BCK02210
FD12  9720    222         STA A   $20                                                              BCK02220
FD14  8620    223         LDA A   #$20             SET UP TRANSMIT BIT COUNTER                     BCK02230
FD16  970A    224         STA A   $0A                                                              BCK02240
FD18  8DCE    225         BSR     SELRD            SELECT DEVICE AND READ DATA                     BCK02250
FD1A  270B    226         BEQ     LPFLG            IF DEVICE NOT AVAILABLE                         BCK02260
FD1C  8D21    227         BSR     CKCH             CHECK FOR CURRENT CHANNEL AND POINT AGAINSBCK02270
FD1E  272E    228         BEQ     END              END CHANNEL AND POINT.  IF EQUAL GO TO ENDBCK02280
FD20  D60F    229         LDA B   $0F              ELSE CLEAR DU BIT                               BCK02290
FD22  D714    230         STA B   $14                                                              BCK02300
FD24  4C      231         INC A                    INCREMENT CHANNEL AND POINT AND BRANCH TO BCK02310
FD25  20E9    232         BRA     STCHPT           STORE CURRENT CHANNEL AND POINT                 BCK02320
FD27  5D      233 LPFLG   TST B                    CHECK FOR LP FLAG                               BCK02330
FD28  2A0A    234         BPL     LSTCH            IF FLAG NOT SET GO TO CHECK FOR LAST CHANNBCK02340
FD2A  9620    235         LDA A   $20              AND POINT.  IF LP FLAG IS SET                   BCK02350
FD2C  9A0F    236         ORA A   #$0F             CHECK FOR END CHANNEL..                         BCK02360
FD2E  8D11    237         BSR     CLCHPT                                                           BCK02370
FD30  271C    238         BEQ     END              IF END CHANNEL GO TO END                        BCK02380
FD32  2004    239         BRA     INCX             ELSE BRANCH TO INCREMENT AND TRANSMIT           BCK02390
FD34  8D09    240 LSTCH   BSR     CKCH             CKECK FOR LAST CHANNEL AND POINT                BCK02400
FD36  2716    241         BEQ     END                                                              BCK02410
FD38  4C      242 INCX    INC A                    INCREMENT AND TRANSMIT.  SAVE CURRENT           BCK02420
FD39  36      243         PSH A                    CHANNEL AND POINT                               BCK02430
FD3A  8DCC    244         BSR     XANDLY           TRANSMIT AND DELAY 1.0 BT. RECOVER              BCK02440
FD3C  32      245         PUL A                    CURRENT CHANNEL AND POINT                       BCK02450
```

```
FD3D  20D1    246          BRA    STCHPT   BRANCH TO STORE CURRENT CHANNEL AND POINT  BCK02450
FD3F  9620    247 CKCH     LDA A  $20      CHANNEL CHECK                              BCK02460
FD41  CCFF    248 CLCHPT   LDA B  #$FF     CLEAR CHANNEL AND POINT ON DEVICE BUS      BCK02470
FD43  D7F5    249          STA B  $F5                                                 BCK02480
FD45  911F    250          CMP A  $1F      IF THIS IS END CH. AND PT EXIT WITH COND   BCK02490
FD47  39      251          RTS             EQUAL.                                     BCK02500
FD48  8D17    252 XANDLY   BSR    XMIT     TRANSMIT AND DELAY                         BCK02510
FD4A  CE02    253          LDX    #02      TRANSMIT DATA AND DELAY 1.0 BIT TIME       BCK02520
FD4C  2060    254          BRA    DELAY    RETURN FROM SUBROUTINE VIA DELAY           BCK02530
FD4E  D614    255 END      LDA B  $14                                                 BCK02540
FD50  CA40    256          ORA B  #$40     SET END OF DATA BIT                        BCK02550
FD52  D714    257          STA B  $14                                                 BCK02560
FD54  8D0B    258          BSR    XMIT     TRANSMIT DATA                              BCK02570
FD56  86FF    259 CLRCH    LDA A  #$FF     CLEAR CHANNEL AND POINT                    BCK02580
FD58  97F5    260          STA A  $F5                                                 BCK02590
FD5A  863D    261 CLRRTS   LDA A  #$3D     CLEAR RTS                                  BCK02600
FD5C  97FB    262          STA A  $FB                                                 BCK02610
FD5E  7EFE3F  263          JMP    WFS      GO TO WAIT FOR SYNC                        BCK02620
              264 *                        TRANSMIT DATA                              BCK02630
FD61  D6FA    265 XMIT     LDA B  $FA                                                 BCK02640
FD63  C402    266          AND B  #$02     CHECK FOR CLEAR TO SEND                    BCK02650
FD65  26FA    267          BNE    XMIT     IF NOT CLEAR TO SEND CONTINUE TO CHECK     BCK02660
FD67  01      268          NOP                                                        BCK02670
FD68  0F      269          SEI             ELSE DISABLE INTERRUPT.                    BCK02680
FD69  D7FA    270          STA B  $FA      TRANSMIT SYNC PATTERN.                     BCK02690
FD6B  8614    271          LDA A  $14                                                 BCK02700
FD6D  CE08    272 DLY1S    LDX    #08                                                 BCK02710
FD6F  8D3D    273          BSR    DELAY                                               BCK02720
FD71  53      274          COM B                                                      BCK02730
FD72  D7FA    275          STA B  $FA                                                 BCK02740
FD74  26F7    276          BNE    DLY1S                                               BCK02750
FD76  CE0003  277          LDX    #$0003                                              BCK02760
FD79  8D35    278          BSR    DLAY                                                BCK02770
FD7D  01      279          NOP                                                        BCK02780
FD7C  DE06    280 XDATA    LDX    $06      TRANSMIT DATA                              BCK02790
FD7E  8D2E    281          BSR    DELAY                                               BCK02800
FD80  97FA    282          STA A  $FA      SERIALIZE DATA                             BCK02810
FD82  780017  283          ASL    $0017                                               BCK02820
FD85  790016  284          ROL    $0016                                               BCK02830
FD88  790015  285          ROL    $0015                                               BCK02840
FD8B  49      286          ROL A                                                      BCK02850
FD8C  8D26    287          BSR    BCHC     COMPUTE BCH IN B REGISTER.                 BCK02860
FD8E  7A000A  288          DEC    $000A    DECREMENT XMIT BIT COUNTER                 BCK02870
FD91  26E9    289          BNE    XDATA    IF IT IS NOT ZERO TRANSMIT NEXT BIT        BCK02880
FD93  0D      290          SEC             TRANSMIT BCH                               BCK02890
FD94  59      291          ROL B                                                      BCK02900
FD95  A500    292          BIT A  $00,X    TIMING DUMMY                               BCK02910
FD97  DE06    293          LDX    $06                                                 BCK02920
FD99  09      294          DEX                                                        BCK02930
FD9A  8D12    295 DLY10    BSR    DELAY                                               BCK02940
FD9C  D7FA    296          STA B  $FA      SHIFT OUT BCH                              BCK02950
FD9E  58      297          ASL B                                                      BCK02960
FD9F  2708    298          BEQ    CLRFLG   IF BCH TRANSMITTED GO CLEAR FLAG AND RETUR BCK02970
FDA1  DE06    299          LDX    $06      ELSE CONTINUE TO TRANSMIT BCH              BCK02980
FDA3  08      300          INX                                                        BCK02990
FDA4  08      301          INX                                                        BCK03000
FDA5  8D06    302          BSR    XIT      TIMING DUMMY                               BCK03010
FDA7  20F1    303          BRA    DLY10                                               BCK03020
FDA9  D6FA    304 CLRFLG   LDA B  $FA      CLEAR FLAGS                                BCK03030
FDAB  01      305          NOP                                                        BCK03040
FDAC  CE      306          CLI             ENABLE INTERRUPT                           BCK03050
FDAD  39      307 XIT      RTS             RETURN FROM SUBROUTINE                     BCK03060
FDAE  A500    308 DELAY    BIT A  $00,X    DELAY                                      BCK03070
FDB0  09      309 DLAY     DEX             THE DELAY IS 13 USEC TIMES                 BCK03080
FDB1  26FB    310          BNE    DELAY    THE VALUE OF THE X REGISTER                BCK03090
FDB3  39      311          RTS                                                        BCK03100
FDB4  250A    312 BCHC     BCS    ROLB     COMPUTE BCH                                BCK03110
FDB6  59      313          ROL B           THIS SUBROUTINE HAS A FIXED TIME DELAY     BCK03120
FDB7  2B03    314          BMI    EOR09    OF 19 USEC INCLUDING THE RTS.              BCK03130
FDB9  01      315          NOP                                                        BCK03140
FDBA  0C      316          CLC                                                        BCK03150
FDBB  39      317          RTS             THE CARRY BIT CONTAINS THE LAST BIT TRANSM BCK03160
FDBC  C809    318 EOR09    EOR B  #$09                                                BCK03170
FDBE  0C      319          CLC                                                        BCK03180
FDBF  39      320          RTS             BCH IS COMPUTED ON EACH BIT BY THE         BCK03190
FDC0  59      321 ROLB     ROL B           POLYNOMIAL X7 + X3 + 1                     BCK03200
FDC1  2B04    322          BMI    EOR01                                               BCK03210
FDC3  C808    323          EOR B  #$08                                                BCK03220
FDC5  0D      324          SEC                                                        BCK03230
FDC6  39      325          RTS                                                        BCK03240
FDC7  C801    326 EOR01    EOR B  #$01                                                BCK03250
FDC9  0D      327          SEC                                                        BCK03260
FDCA  39      328          RTS                                                        BCK03270
FDCB  8DE1    329 RECV     BSR    DELAY    RECEIVE FIRST 16 BITS                      BCK03280
FDCD  8610    330          LDA A  #$10     SET BIT COUNT TO 16                        BCK03290
FDCF  5F      331          CLR B           CLEAR B REG. FOR BCH                       BCK03300
FDD0  7400FA  332 NXTBIT   LSR    $00FA    SHIFT IN DATA BIT INTO CARRY               BCK03310
FDD3  8DDF    333          BSR    BCHC     COMPUTE BCH                                BCK03320
FDD5  DE06    334          LDX    $06      DELAY TO NEXT BIT                          BCK03330
FDD7  8DD5    335          BSR    DELAY                                               BCK03340
FDD9  6911    336          ROL    $11,X    SHIFT CARRY INTO DATA AREA                 BCK03350
FDDB  6910    337          ROL    $10,X                                               BCK03360
FDDD  2B1B    338          BMI    GETBCH   IF 16 BITS HAVE BEEN SHIFTED IN AND        BCK03370
FDDF  4A      339          DEC A           THE FIRST BIT WAS 1 GO TO RECEIVE BCH,     BCK03380
FDE0  2702    340          BEQ    RDATA    IF IT WAS A ZERO GO TO RECEIVE DATA.       BCK03390
```

```
FDE2  20FC      341         BRA         NXTBIT      IF 16 BITS NOT SHIFTED IN CONTINUE TO RCV. BCK03400
FDE4  01        342  RDATA  NOP                     RECEIVE DATA                                BCK03410
FDE5  8610      343         LDA  A  #$10           SET BIT COUNTER TO 16                        BCK03420
FDE7  64FA      344  NXDBIT LSR  $FA,X             SHIFT BIT INTO CARRY                         BCK03430
FDE9  8DC9      345         BSR         BCHC       COMPUTE BCH                                  BCK03440
FDEB  6913      346         ROL  $13,X                                                          BCK03450
FDED  6912      347         ROL  $12,X             SHIFT BIT INTO RECEIVE DATA LOCATION         BCK03460
FDEF  CE06      348         LDX  #06                                                            BCK03470
FDF1  8DBB      349         BSR         DELAY      DELAY TO CENTER OF NEXT BIT                  BCK03480
FDF3  4A        350         DEC  A                                                              BCK03490
FDF4  2704      351         BEQ         GETBCH     DECREMENT BIT COUNTER, IF EQUAL TO ZERO GO   BCK03500
FDF6  9500      352         BIT  A  $00            RECEIVE BCH,                                 BCK03510
FDF8  20ED      353         BRA         NXDBIT     ELSE CONTINUE TO RECEIVE DATA AT             BCK03520
FDFA  58        354  GETBCH ASL  B                 SHIFT BIT INTO CARRY.                        BCK03530
FDFB  37        355         PSH  B                 GET BCH                                      BCK03540
FDFC  8607      356         LDA  A  #$07           SAVE COMPUTED BCH                            BCK03550
FDFE  64FA      357  NXBBIT LSR  $FA,X             SET BIT COUNTER TO 7                         BCK03560
FE00  59        358         ROL  B                 SHIFT BIT INTO CARRY.                        BCK03570
FE01  4A        359         DEC  A                 SHIFT CARRY BIT INTO B REGISTER.             BCK03580
FE02  270B      360         BEQ         CKBCH      DECREMENT BIT COUNTER.                       BCK03590
FE04  CE06      361         LDX  #06              IF IT EQUALS ZERO GO TO CHECK BCH             BCK03600
FE06  08        362         INX                    ELSE DELAY TO CENTER OF NEXT BIT.            BCK03610
FE07  08        363         INX                                                                 BCK03620
FE08  BDFDAE    364         JSR         DELAY                                                   BCK03630
FE0B  6D00      365         TST  $00,X             CONTINUE TO REC. BCH AT SHIFT BIT INTO CAR   BCK03640
FE0D  20EF      366         BRA         NXBBIT                                                  BCK03650
FE0F  32        367  CKBCH  PUL  A                 CHECK BCH                                    BCK03660
FE10  58        368         ASL  B                                                              BCK03670
FE11  11        369         CBA                    COMPARE RECEIVED AND COMPUTED BCH'S.         BCK03680
FE12  2705      370         BEQ         CKADD      IF EQUAL GO TO CHECK FOR MY ADDRESS          BCK03690
FE14  8610      371         LDA  A  #$10           ELSE LOAD A REGISTER WITH BCH.               BCK03700
FE16  7EFEC6    372         JMP         DISERR     ERR-ON AND JUMP TO DISPLAY ERROR.            BCK03710
FE19  9610      373  CKADD  LDA  A  $10            CHECK FOR MY ADDRESS                         BCK03720
FE1B  2703      374         BEQ         CLFLG      IF OP-0 & ADD-0 GO TO CLEAR FLAG BIT         BCK03730
FE1D  841F      375         AND  A  #$1F           ELSE COMPARE ADDRESS TO MY ADDRESS           BCK03740
FE1F  910F      376         CMP  A  $0F                                                         BCK03750
FE21  261C      377         BNE         WFS        IF NOT EQUAL GO TO WAIT FOR SYNC             BCK03760
FE23  9714      378         STA  A  $14            ELSE SET UP TRANSMIT STATUS AND ADDRESS      BCK03770
FE25  96FA      379  CLFLG  LDA  A  $FA            THEN CLEAR FLAG BIT                          BCK03780
FE27  86E0      380         LDA  A  #$E0           THEN TURN MY ADD LED ON KEEPING SYNC         BCK03790
FE29  97FA      381         STA  A  $FA                                                         BCK03800
FE2B  BDFF33    382         JSR         SETLED     DET LED ON.                                  BCK03810
FE2E  7EFC10    383  JOPCD  JMP         OPCODE                                                  BCK03820
FE31  D6FA      384  WFPOMT LDA  B  $FA            WAIT FOR POWER ON MARK TIME                  BCK03830
FE33  CE1A0B    385         LDX  #$1A0B            REQUIRES MARK TIME OF 100 MSEC               BCK03840
FE36  D6FB      386  WFMT   LDA  B  $FB            PRIOR TO WAIT FOR BAUD RATE SYNC.            BCK03850
FE38  2BF7      387         BMI         WFPOMT                                                  BCK03860
FE3A  09        388         DEX                                                                 BCK03870
FE3B  26F9      389         BNE         WFMT       IF MARK TIME >100 MSEC GO TO                 BCK03880
FE3D  201A      390         BRA         WFBRS      WAIT FOR BAUD RATE SYNC.                     BCK03890
FE3F  96FA      391  WFS    LDA  A  $FA            WAIT FOR SYNC                                BCK03900
FE41  43        392         COM  A                                                              BCK03910
FE42  845C      393         AND  A  #$5C           ENABLE SYNC DETECT KEEPING PREVIOUS          BCK03920
FE44  8A40      394         ORA  A  #$40           LEDS LIT                                     BCK03930
FE46  BDFF33    395         JSR         SETLED     SET UP SYNC DET. LED BUT KEEP IT OFF         BCK03940
FE49  01        396         NOP                                                                 BCK03950
FE4A  0E        397         CLI                                                                 BCK03960
FE4B  86C0      398         LDA  A  #$C0                                                        BCK03970
FE4D  97FA      399         STA  A  $FA                                                         BCK03980
FE4F  CE00      400         LDX  #00               INITIALIZE RECEIVE AREA                      BCK03990
FE51  DF10      401         STX  $10                                                            BCK04000
FE53  CE0500    402         LDX  #$0500                                                         BCK04010
FE56  09        403  WFINT  DEX                    IF INTERRUPT OCCURS WITHIN 10MSEC CURRENT    BCK04020
FE57  26FD      404         BNE         WFINT      BAUD RATE WILL BE USED, OTHERWISE            BCK04030
FE59  01        405  WFBRS  NOP                                                                 BCK04040
FE5A  0F        406         SEI                    WAIT FOR BAUD RATE SYNC                      BCK04050
FE5B  CE000A    407         LDX  #$000A            BY DISABLING INTERRUPT, INITIALIZING         BCK04060
FE5E  DF1D      408         STX  $1D               ELAPSED TIME, AND                            BCK04070
FE60  DE00      409         LDX  $00               SCANNING SERIAL LINE FOR A SPACE.            BCK04080
FE62  D6FB      410  CKFSP  LDA  B  $FB                                                         BCK04090
FE64  2AFC      411         BPL         CKFSP      IF A SPACE OCCURS                            BCK04100
FE66  8D3E      412         BSR         TS1        TIME IT AT TIME SYNC 1.                      BCK04110
FE68  CEFFE8    413         LDX  #$FFE8            DETERMINE BAUD RATE FROM SYNC 1              BCK04120
FE6B  A600      414  FINDBR LDA  A  $00,X          GET CURRENT 1.0 BIT TIME FROM TABLE          BCK04130
FE6D  E601      415         LDA  B  $01,X                                                       BCK04140
FE6F  9702      416         STA  A  $02                                                         BCK04150
FE71  D703      417         STA  B  $03                                                         BCK04160
FE73  44        418         LSR  A                 COMPUTE CURRENT 1.5 BIT TIME                 BCK04170
FE74  56        419         ROR  B                                                              BCK04180
FE75  DB03      420         ADD  B  $03                                                         BCK04190
FE77  9902      421         ADC  A  $02                                                         BCK04200
FE79  9704      422         STA  A  $04                                                         BCK04210
FE7B  D705      423         STA  B  $05                                                         BCK04220
FE7D  A602      424         LDA  A  $02,X          GET NEXT ENTRY'S 1.0 BIT TIME FROM TABLE     BCK04230
FE7F  E603      425         LDA  B  $03,X          COMPUTE NEXT 1.5 BIT TIME                    BCK04240
FE81  44        426         LSR  A                                                              BCK04250
FE82  56        427         ROR  B                                                              BCK04260
FE83  EB03      428         ADD  B  $03,X                                                       BCK04270
FE85  A902      429         ADC  A  $02,X                                                       BCK04280
FE87  D005      430         SUB  B  $05            SUBTRACT CURRENT 1.5 BIT TIME FROM           BCK04290
FE89  9204      431         SBC  A  $04            NEXT 1.5 TIME.                               BCK04300
FE8B  44        432         LSR  A                 HALVE THE DIFFERENCE.                        BCK04310
FE8C  56        433         ROR  B                                                              BCK04320
FE8D  DB05      434         ADD  B  $05            ADD THAT TO THE CURRENT 1.5 BIT TIME         BCK04330
FE8F  9904      435         ADC  A  $04            TO FORM UPPER LIMIT.                         BCK04340
```

| | | | | | | |
|---|---|---|---|---|---|---|
| FE91 | D019 | 436 | | SUB B | $19 | SUBTRACT SYNC 1 FROM UPPER LIMIT. BCK04350 |
| FE93 | 9218 | 437 | | SBC A | $18 | BCK04360 |
| FE95 | 2A1E | 438 | | BPL | COM375 | IF SYNC 1 IS SMALLER GO TO COMPUTE BCK04370 |
| FE97 | 8CFFF4 | 439 | | CPX | #$FFF4 | .375 BT ELSE IS THIS THE LAST ENTRY? BCK04380 |
| FE9A | 2723 | 440 | | BEQ | SYNERR | IF SO GO TO SYNC ERROR BCK04390 |
| FE9C | 08 | 441 | | INX | | OTHERWISE ADVANCE TABLE POINTER. BCK04400 |
| FE9D | 08 | 442 | | INX | | BCK04410 |
| FE9E | 961E | 443 | | LDA A | $1E | AND ADD TIME SPENT TO ELAPSED TIME BCK04420 |
| FEA0 | 8B09 | 444 | | ADD A | #$09 | COUNTER BCK04430 |
| FEA2 | 971E | 445 | | STA A | $1E | BCK04440 |
| FEA4 | 20C5 | 446 | | BRA | FINDBR | THEN CONTINUE BY GOING TO GET CURRENT BCK04450 |
| | | 447 | * | | | 1.0 BIT TIME. BCK04460 |
| FEA6 | 08 | 448 | TS1 | INX | | TIME SYNC 1 BCK04470 |
| FEA7 | D6FA | 449 | | LDA B | $FA | TIME THE SPACE BY INCREMENTING THE X BCK04480 |
| FEA9 | 54 | 450 | | LSR B | | REGISTER FOR EACH 13 USEC OF SPACE. BCK04490 |
| FEAA | 24FA | 451 | | BCC | TS1 | BCK04500 |
| FEAC | DF18 | 452 | | STX | $18 | WHEN MARK RETURNS, STORE THE SYNC 1 COUNT BCK04510 |
| FEAE | 39 | 453 | | RTS | | THEN RETURN FROM SUBROUTINE. BCK04520 |
| FEAF | D005 | 454 | CKSYN | SUB B | $05 | CHECK SYNC. ENTERED WITH A= SYNC MS BCK04530 |
| FEB1 | 9204 | 455 | | SBC A | $04 | &B = SYNC LS. SUBTRACT 1.5 BT FROM SYNC BCK04540 |
| FEB3 | 2B0B | 456 | | BMI | ANG2 | IF RESULT NEGATIVE GO TO ADD NEGATIVE BCK04550 |
| FEB5 | 43 | 457 | | COM A | | RESULT, ELSE NEGATE THEN BCK04560 |
| FEB6 | 53 | 458 | | COM B | | BCK04570 |
| FEB7 | CB01 | 459 | | ADD B | #$01 | BCK04580 |
| FEB9 | 8900 | 460 | | ADC A | #$00 | BCK04590 |
| FEBB | DB0C | 461 | ANG | ADD B | $0C | ADD NEGATIVE RESULT TO .375 BT BCK04600 |
| FEBD | 990B | 462 | | ADC A | $0B | BCK04610 |
| FEBF | 39 | 463 | | RTS | | IF RESULT IS NEGATIVE BCK04620 |
| FFC0 | 20D0 | 464 | ANG2 | BRA | ANG1 | TEST FAILS. THIS IS A CONTROLLED TIME BCK04630 |
| FEC2 | 20F7 | 465 | ANG1 | BRA | ANG | SUBROUTINE WHICH TAKES 29 USEC. BCK04640 |
| FEC4 | 8608 | 466 | SYNERR | LDA A | #$08 | SYNC ERROR. SYNC ERROR LED ON BCK04650 |
| FEC6 | 8D6B | 467 | DISERR | BSR | SETLED | DISPLAY ERROR TURN LEDS ON THEN BCK04660 |
| FEC8 | 7EFE3F | 468 | | JMP | WFS | GO TO WAIT FOR SYNC. BCK04670 |
| FECB | CE0002 | 469 | IRQ | LDX | #$0002 | IRQ SERVICE ROUTINE BCK04680 |
| FECE | 8DD6 | 470 | | BSR | TS1 | TIME SPACE AS SYNC 1 BCK04690 |
| FED0 | 9618 | 471 | | LDA A | $18 | THEN CHECK THIS TIME AGAINST THE ESTABLISHED BCK04700 |
| FED2 | D619 | 472 | | LDA B | $19 | BAUD RATE. BCK04710 |
| FED4 | 8DD9 | 473 | | BSR | CKSYN | BCK04720 |
| FED6 | 2A01 | 474 | | BPL | INZ | IF SYNC 1 DOES NOT SATISFY THE 1.5 BIT TIM BCK04730 |
| FED8 | 3B | 475 | | RTI | | RETURN FROM INTERRUPT. BCK04740 |
| FED9 | DE00 | 476 | INZ | LDX | $00 | ELSE INITIALIZE RECEIVE AREA BCK04750 |
| FEDB | DF10 | 477 | | STX | $10 | BCK04760 |
| FEDD | CE0005 | 478 | | LDX | #$0005 | SET THE SYNC 2 COUNTER TO PROPER ELAPSED T BCK04770 |
| FEE0 | 8E007F | 479 | | LDS | #$007F | INITIALIZE THE STACK POINTER. BCK04780 |
| FEE3 | 200E | 480 | | BRA | TS2 | THEN GO TIME SYNC 2. BCK04790 |
| FEE5 | 9604 | 481 | COM375 | LDA A | $04 | COMPUTE .375 BIT TIME BY BCK04800 |
| FEE7 | D605 | 482 | | LDA B | $05 | DIVIDING 1.5 BIT TIME BY 4. BCK04810 |
| FEE9 | 44 | 483 | | LSR A | | BCK04820 |
| FEEA | 56 | 484 | | ROR B | | THIS VALUE IS USED AS BCK04830 |
| FEEB | 44 | 485 | | LSR A | | BCK04840 |
| FEEC | 56 | 486 | | ROR B | | THE LIMITS IN COMPARING BCK04850 |
| FEED | 970B | 487 | | STA A | $0B | A MEASURED SYNC PULSE BCK04860 |
| FEEF | D70C | 488 | | STA B | $0C | TO AN ESTABLISHED BAUD RATE. BCK04870 |
| FEF1 | DE1D | 489 | | LDX | $1D | LOAD X REGISTER WITH ELAPSED TIME THEN BCK04880 |
| FEF3 | 08 | 490 | TS2 | INX | | TIME SYNC 2 BCK04890 |
| FEF4 | 08 | 491 | | INX | | BCK04900 |
| FEF5 | 8C0400 | 492 | | CPX | #$400 | LIMITS SYNC 2 TO 13312 USEC BCK04910 |
| FEF8 | 2ACA | 493 | | BPL | SYNERR | BCK04920 |
| FEFA | 01 | 494 | | NOP | | BCK04930 |
| FEFB | D6FA | 495 | | LDA B | $FA | TIME MARK INTERVAL BY BCK04940 |
| FEFD | 54 | 496 | | LSR B | | INCREMENTING THE X REGISTER FOR EACH BCK04950 |
| FEFE | 25F3 | 497 | | BCS | TS2 | 13 USEC OF MARK CONDITION. BCK04960 |
| FF00 | DF1A | 498 | | STX | $1A | WHEN A SPACE OCCURS INDICATING SYNC 3 BCK04970 |
| FF02 | 961A | 499 | | LDA A | $1A | HAS OCCURRED, BCK04980 |
| FF04 | D61B | 500 | | LDA B | $1B | CHECK SYNC 2 AGAINST ESTABLISHED BAUD RATE BCK04990 |
| FF06 | 8DA7 | 501 | | BSR | CKSYN | BCK05000 |
| FF08 | 2BBA | 502 | | BMI | SYNERR | IF SYNC 2 =/ 1.5 .375 BIT TIME GO TO BCK05010 |
| FF0A | 8E30 | 503 | | LDA A | #$30 | SYNC ERROR. ELSE TURN SYNC DET. BCK05020 |
| FF0C | 97FA | 504 | | STA A | $FA | LED-ON KEEPING TX HIGH. BCK05030 |
| FF0E | 9602 | 505 | | LDA A | $02 | COMPUTE RECEIVE AND TRANSMIT DELAYS BCK05040 |
| FF10 | D603 | 506 | | LDA B | $03 | DURING SYNC 3. BCK05050 |
| FF12 | C006 | 507 | | SUB B | #$06 | THE OVERHEAD IN RECEIVING AND TRANSMITTING BCK05060 |
| FF14 | 8200 | 508 | | SBC A | #$00 | EACH DATA BIT IS 78 USEC. BCK05070 |
| FF16 | 9706 | 509 | | STA A | $06 | THE DELAY TIME IS THEN 1.0 BIT TIME-78 USE BCK05080 |
| FF18 | D707 | 510 | | STA B | $07 | BCK05090 |
| FF1A | 9604 | 511 | | LDA A | $04 | WHEN TRANSMITTING THE SYNC PATTERNS 26 USE BCK05100 |
| FF1C | D605 | 512 | | LDA B | $05 | OF OVERHEAD IS USED. BCK05110 |
| FF1E | C002 | 513 | | SUB B | #$02 | THE DELAY TIME IS THEN BCK05120 |
| FF20 | 8200 | 514 | | SBC A | #$00 | 1.5 BIT TIME - 26 USEC. BCK05130 |
| FF22 | 9708 | 515 | | STA A | $08 | BCK05140 |
| FF24 | D709 | 516 | | STA B | $09 | BCK05150 |
| FF26 | C008 | 517 | | SUB B | #$08 | THE TIME BETWEEN DETECTING SYNC 3 AND BCK05160 |
| FF28 | 8200 | 518 | | SBC A | #$00 | THE POINT WHERE RECEPTION MAY OCCUR IS BCK05170 |
| FF2A | 970D | 519 | | STA A | $0D | 130 USEC. THIS DELAY IS BCK05180 |
| FF2C | D70E | 520 | | STA B | $0E | 1.5 BIT TIME - 130 USEC. BCK05190 |
| FF2E | DE0D | 521 | | LDX | $0D | LOAD X REGISTER WITH THIS DELAY AND BCK05200 |
| FF30 | 7EFDCB | 522 | | JMP | RECV | DELAY TO CENTER OF FIRST BIT AT RECEIVE. BCK05210 |
| FF33 | C639 | 523 | SETLED | LDA B | #$39 | SELECT THE DATA DIRECTION BCK05220 |
| FF35 | 01 | 524 | | NOP | | BCK05230 |
| FF36 | 0F | 525 | | SEI | | BCK05240 |
| FF37 | D7FB | 526 | | STA B | $FB | REGISTER OF THE PIA BCK05250 |
| FF39 | 97FA | 527 | | STA A | $FA | A ONE IN THE A REGISTER WILL TURN LED ON. BCK05260 |
| FF3B | C63D | 528 | | LDA B | #$3D | BCK05270 |
| FF3D | D7FB | 529 | | STA B | $FB | SELECT THE PERIPHERAL REGISTER OF THE PIA. BCK05280 |
| FF3F | 8680 | 530 | | LDA A | #$80 | TURN THE SELECTED LED ON BCK05290 |
| FF41 | 97FA | 531 | | STA A | $FA | KEEPING TX HIGH. BCK05300 |
| FF43 | 39 | 532 | | RTS | | RETURN FROM SUBROUTINE. BCK05310 |

```
FF44  C639      533  STFAIL  LDA B  #$39           SELF TEST FAIL                              BCK05320
FF46  2004      534          BRA    LEDON          SET UP TO TURN FAIL LEDS ON AND             BCK05330
                535  *                             CONTINUE TO TEST.                           BCK05340
                536  *              WHEN POWER IS APPLIED OR THE RESET BUTTON IS DEPRESSED     BCK05350
                537  *                             THE MPU STARTS EXECUTION HERE.              BCK05360
FF48  C631      538  RES     LDA B  #$31           POWER ON RESTART                            BCK05370
FF4A  867C      539          LDA A  #$7C           SET PA1 - 5 AS OUTPUTS                      BCK05380
FF4C  97FA      540  LEDON   STA A  $FA            TURN LEDS ON                                BCK05390
FF4E  D7FB      541          STA B  $FB                                                        BCK05400
FF50  8E007F    542          LDS    #$007F         INITIALIZE STACK POINTER                    BCK05410
FF53  CEFC00    543          LDX    #$FC00         ROM SELF TEST. ROM A = FE00-FFFF            BCK05420
FF56  8646      544          LDA A  #$46           ROM B = FC00-FDFF                           BCK05430
FF58  5F        545          CLR B                 ADD CONTENTS OF LOCATIONS FC00 TO FDFF      BCK05440
FF59  EB00      546  ROMB    ADD B  $00,X          TO FORM THE ROM B CHECK SUM                 BCK05450
FF5B  08        547          INX                                                               BCK05460
FF5C  8CFE00    548          CPX    #$FE00                                                     BCK05470
FF5F  26F8      549          BNE    ROMB                                                       BCK05480
FF61  C12B      550          CMP B  #$2B           IF THE CHECK SUM DOES NOT EQUAL 2B, LIGHT   BCK05490
FF63  2CDF      551          BNE    STFAIL         THE ROM, FAIL, AND CTS LEDS.                BCK05500
FF65  8644      552          LDA A  #$44           IF ROM B CHECK SUM IS OK ADD THE CONTENTS   BCK05510
FF67  5F        553          CLR B                 OF LOCATIONS FE00 TO FFFF TO FORM THE       BCK05520
FF68  EB00      554  ROMA    ADD B  $00,X          ROM A CHECK SUM.                            BCK05530
FF6A  08        555          INX                                                               BCK05540
FF6B  26F8      556          BNE    ROMA                                                       BCK05550
FF6D  C17A      557          CMP B  #$7A           IF THE CHECK SUM DOES NOT EQUAL 7A          BCK05560
FF6F  26D3      558          BNE    STFAIL         LIGHT THE ROM AND FAIL LED'S                BCK05570
FF71  5F        559          CLR B                 RAM SELF TEST                               BCK05580
FF72  17        560  RAM     TBA                                                               BCK05590
FF73  CEFF80    561          LDX    #$FF80         TESTS RAM LOCATIONS 0000 THROUGH 007F.      BCK05600
FF76  A780      562  RAMWR   STA A  $80,X          THIS TEST WRITES AND READS AN INCREMENTING  BCK05610
FF78  4C        563          INC A                 DATA PATTERN IN ALL LOCATIONS.              BCK05620
FF79  08        564          INX                                                               BCK05630
FF7A  26FA      565          BNE    RAMWR          PASS 1: EACH LOCATION CONTAINS ITS ADDRES   BCK05640
                                                                                               BCK05650
FF7C  17        566          TBA                   PASS 2: EACH LOCATION CONTAINS ITS ADDRES   BCK05660
FF7D  CEFF80    567          LDX    #$FF80         PASS 3: EACH LOCATION CONTAINS ITS ADDRES   BCK05670
FF80  A180      568  RAMCOM  CMP A  $80,X                                                      BCK05680
FF82  2704      569          BEQ    RAMOK          PASS 256: EACH LOCATION CONTAINS ITS ADDRE  BCK05690
FF84  8648      570          LDA A  #$48                                                       BCK05700
FF86  20BC      571          BRA    STFAIL         IF TEST FAILS TURN ON                       BCK05710
FF88  4C        572  RAMOK   INC A                 RAM AND FAIL LEDS,                          BCK05720
FF89  08        573          INX                   AND CONTINUE TO TEST.                       BCK05730
FF8A  26F4      574          BNE    RAMCOM                                                     BCK05740
FF8C  5C        575          INC B                                                             BCK05750
FF8D  26E3      576          BNE    RAM                                                        BCK05760
FF8F  8638      577  PIA     LDA A  #$38           PIA AND DEVICE BUS SELF TEST                BCK05770
FF91  8D36      578          BSR    SETPIA         THIS TEST EXERCISES THE PIA ATTACHED TO THE BCK05780
FF93  53        579          COM B                 DEVICE BUS (ADDRESSES 00F4 THROUGH 00F9)    BCK05790
FF94  863C      580          LDA A  #$3C           PASS 1: SET PAS & PBS AS INPUTS STORE 1'S   BCK05800
FF96  8D31      581          BSR    SETPIA         IN PA'S AND PB'S. READ SHOULD BE ONES       BCK05810
FF98  96F5      582          LDA A  $F5            PASS 2: SET PA0 & PB0 AS OUTPUTS. STORE     BCK05820
FF9A  94F7      583          AND A  $F7            INPUT 0'S IN OUTPUTS. READ SHOULD BE ONES   BCK05830
FF9C  94F8      584          AND A  $F8            FOR OUTPUTS.                                BCK05840
FF9E  11        585          CBA                   PASS 3: SET PA1 & PB1 AS OUTPUTS. STORE     BCK05850
FF9F  2704      586          BEQ    PIAOK          INPUTS 0'S IN OUTPUTS. READ ONES EXCEPT F   BCK05860
FFA1  8650      587          LDA A  #$50           OUTPUTS.                                    BCK05870
FFA3  209F      588          BRA    STFAIL         PASS 128: SET PAS & PBS AS OUTPUTS STORE    BCK05880
FFA5  53        589  PIAOK   COM B                 READ ALL ZEROS.                             BCK05890
FFA6  5C        590          INC B                                                             BCK05900
FFA7  26E6      591          BNE    PIA            IF TEST FAILS, TURN ON PIA & FAIL LEDS AND  BCK05910
                592  *                             CONTINUE TO TEST.                           BCK05920
FFA9  8620      593          LDA A  #$20           SELF TEST PASS                              BCK05930
FFAB  8D86      594          BSR    SETLED         TURN ON PASS LED.                           BCK05940
FFAD  8608      595          LDA A  #$08           DELAY FOR= 4 SEC.                           BCK05950
FFAF  09        596  DLY4    DEX                                                               BCK05960
FFB0  26FD      597          BNE    DLY4                                                       BCK05970
FFB2  4A        598          DEC A                                                             BCK05980
FFB3  26FA      599          BNE    DLY4                                                       BCK05990
FFB5  DF00      600          STX    $00            INITIALIZE ZERO AND                         BCK06000
FFB7  DF10      601          STX    $10            OP AD CH & PT.                              BCK06010
FFB9  BDFFD3    602          JSR    SETLED         TURN LEDS OFF                               BCK06020
FFBC  B6FA      603          LDA A  $FA            GET IN ADDRESS FROM PIA IMAGE AT 70FA,      BCK06030
FFBE  44        604          LSR A                 STRIP EXCESS BITS                           BCK06040
FFBF  44        605          LSR A                                                             BCK06050
FFC0  43        606          COM A                                                             BCK06060
FFC1  841F      607          AND A  #$1F           AND STORE AT LOCATION 0F.                   BCK06070
FFC3  970F      608          STA A  $0F                                                        BCK06080
FFC5  7EFE31    609          JMP    WFPOMT         JUMP TO WAIT FOR POWER ON MARK TIME.        BCK06090
FFC8  97F4      610  SETPIA  STA A  $F4            SET UP PIAS                                 BCK06100
FFCA  97F6      611          STA A  $F6            SELECT DATA DIRECTION OR PERIPHERAL REGIST  BCK06110
FFCC  97F9      612          STA A  $F9            DEPENDING UPON BIT 3 BEING A ZERO OR ONE.   BCK06120
FFCE  D7F5      613          STA B  $F5            STORE DATA IN SELECTED REGISTER.            BCK06130
FFD0  D7F7      614          STA B  $F7                                                        BCK06140
FFD2  D7F8      615          STA B  $F8                                                        BCK06150
FFD4  39        616          RTS                   RETURN FROM SUBROUTINE.                     BCK06160
FFD5  AA        617          FCB    $AA            ROM A CHECK SUM ADJUST                      BCK06170
                618  *                                                                         BCK06180
                619  *                                                                         BCK06190
                620  *                             BAUD RATE TABLE                             BCK06200
                621  *                             EACH DOUBLE BYTE REPRESENTS 1.0 BIT TIME    BCK06210
                622  *                             EACH ENTRY = 1.0 BIT TIME / 13 USEC         BCK06220
                623  *                             EXAMPLE: 9600 BAUD                          BCK06230
                624  *                             1.0 BIT TIME = 104 USEC                     BCK06240
                625  *                             ENTRY = 104/13 = 0008                       BCK06250
FFD7            626          ORG    $FFE8                                                      BCK06260
FFE8  0008      627          FDB    0008           9600                                        BCK06270
FFEA  0010      628          FDB    $0010          4800                                        BCK06280
FFEC  0020      629          FDB    $0020          2400                                        BCK06290
FFEE  0040      630          FDB    $0040          1200                                        BCK06300
FFF0  0080      631          FDB    $0080          600
```

| | | | | | | | | | | | | |
|---|---|---|---|---|---|---|---|---|---|---|---|---|
| FFF2 | 0100 | 632 | | FDB | $0100 | | 300 | | | | | BCK06310 |
| FFF4 | 0200 | 633 | | FDB | $0200 | | 150 | | | | | BCK06320 |
| FFF6 | 0800 | 634 | | FDB | $0800 | | DUMMY | | | | | BCK06330 |
| FFF8 | FECB | 635 | | FDB | IRQ | | | | | | | BCK06340 |
| FFFA | FF48 | 636 | | FDB | RES | | | | | | | BCK06350 |
| FFFC | FF48 | 637 | | FDB | RES | | | | | | | BCK06360 |
| FFFE | FF48 | 638 | | FDB | RES | | | | | | | BCK06370 |
| 0000 | | 639 | | END | | | | | | | | BCK06380 |
| ANG | FEBB | 461 | 465 | | | | | | | | | |
| ANG1 | FEC2 | 465 | 464 | | | | | | | | | |
| ANG2 | FEC0 | 464 | 456 | | | | | | | | | |
| BCHC | FDB4 | 312 | 287 | 333 | 345 | | | | | | | |
| CKADD | FE19 | 373 | 370 | | | | | | | | | |
| CKECH | FEOF | 367 | 360 | | | | | | | | | |
| CKCH | FD3F | 247 | 227 | 240 | | | | | | | | |
| CKEOT | FCDD | 189 | 192 | | | | | | | | | |
| CKFSP | FEG2 | 410 | 411 | | | | | | | | | |
| CKLP | FCAC | 161 | 171 | | | | | | | | | |
| CKSYN | FEAF | 454 | 473 | 501 | | | | | | | | |
| CLCHPT | FD41 | 243 | 237 | | | | | | | | | |
| CLFLG | FEE5 | 379 | 374 | | | | | | | | | |
| CLRCH | FD56 | 259 | 121 | | | | | | | | | |
| CLRFLG | FDA9 | 304 | 298 | | | | | | | | | |
| CLRRTS | FD5A | 261 | 220 | | | | | | | | | |
| COM375 | FEE5 | 481 | 438 | | | | | | | | | |
| DELAY | FDAE | 308 | 92 | 254 | 273 | 281 | 295 | 310 | 329 | 335 | 349 | 364 |
| DISERR | FEC6 | 467 | 372 | | | | | | | | | |
| DLAY | FDD0 | 309 | 273 | | | | | | | | | |
| DLY10 | FD9A | 295 | 303 | | | | | | | | | |
| DLY15 | FD6D | 272 | 276 | | | | | | | | | |
| DLY4 | FFAF | 596 | 597 | 599 | | | | | | | | |
| END | FD4E | 255 | 126 | 228 | 238 | 241 | | | | | | |
| ECRC1 | FDC7 | 326 | 322 | | | | | | | | | |
| ECR09 | FDBC | 318 | 314 | | | | | | | | | |
| EOTO | FCDA | 188 | 154 | | | | | | | | | |
| EXITA | FCD9 | 186 | 190 | | | | | | | | | |
| FINDBR | FE6B | 414 | 446 | | | | | | | | | |
| GETECH | FDFA | 354 | 338 | 351 | | | | | | | | |
| INCX | FD88 | 242 | 239 | | | | | | | | | |
| INZ | FED9 | 476 | 474 | | | | | | | | | |
| IRQ | FECB | 469 | 635 | | | | | | | | | |
| JCLRCH | FC69 | 121 | 85 | 115 | 118 | | | | | | | |
| JEND | FC72 | 126 | 129 | 133 | 137 | 140 | 158 | 162 | 164 | | | |
| JOPCD | FE2E | 393 | | | | | | | | | | |
| LEDON | FF4C | 540 | 534 | | | | | | | | | |
| LFFLG | FD27 | 233 | 226 | | | | | | | | | |
| LSTCH | FD34 | 240 | 234 | | | | | | | | | |
| NXSBIT | FDFE | 357 | 366 | | | | | | | | | |
| NXDBIT | FDE7 | 344 | 353 | | | | | | | | | |
| NXTBIT | FDD0 | 332 | 341 | | | | | | | | | |
| OP0 | FC5B | 114 | 83 | | | | | | | | | |
| OP1 | FC6C | 123 | 94 | | | | | | | | | |
| OP2 | FC75 | 128 | 98 | | | | | | | | | |
| OP3 | FC81 | 135 | 99 | | | | | | | | | |
| OP4 | FC87 | 139 | 101 | | | | | | | | | |
| OP5 | FD00 | 210 | 103 | | | | | | | | | |
| OP6 | FCA5 | 157 | 102 | | | | | | | | | |
| OPCODE | FC10 | 75 | 383 | | | | | | | | | |
| PIA | FF8F | 577 | 591 | | | | | | | | | |
| PIAOK | FFA5 | 589 | 596 | | | | | | | | | |
| RAM | FF72 | 560 | 576 | | | | | | | | | |
| RAMCOM | FF80 | 568 | 574 | | | | | | | | | |
| RAMCK | FF53 | 572 | 569 | | | | | | | | | |
| RAMWR | FF76 | 563 | 565 | | | | | | | | | |
| RDATA | FDE4 | 342 | 340 | | | | | | | | | |
| READ | FCEC | 199 | 132 | 170 | | | | | | | | |
| RECV | FDCB | 329 | 522 | | | | | | | | | |
| RES | FF48 | 533 | 636 | 637 | 638 | | | | | | | |
| ROLB | FDC0 | 321 | 312 | | | | | | | | | |
| ROMA | FF63 | 554 | 556 | | | | | | | | | |
| ROMB | FF59 | 546 | 549 | | | | | | | | | |
| SELECT | FC2B | 142 | 106 | 196 | | | | | | | | |
| SELRD | FCE3 | 196 | 139 | 157 | 225 | | | | | | | |
| SELWR | FC48 | 104 | 114 | 123 | 128 | | | | | | | |
| SETBIT | FCC5 | 174 | 194 | | | | | | | | | |
| SETBUS | FC01 | 67 | 78 | 131 | | | | | | | | |
| SETDU | FCC3 | 173 | 152 | | | | | | | | | |
| SETLED | FF33 | 523 | 382 | 395 | 467 | 594 | 602 | | | | | |
| SETPIA | FFC9 | 610 | 578 | 581 | | | | | | | | |
| SFEND | FCFF | 203 | 197 | | | | | | | | | |
| STCHPT | FD10 | 221 | 232 | 246 | | | | | | | | |
| STFAIL | FF44 | 533 | 551 | 558 | 571 | 588 | | | | | | |
| SWEND | FC5A | 112 | 107 | | | | | | | | | |
| SYCHPT | FC15 | 78 | 76 | | | | | | | | | |
| SYNERR | FCC4 | 466 | 440 | 493 | 502 | | | | | | | |
| TS1 | FEA6 | 448 | 412 | 451 | 470 | | | | | | | |
| TS2 | FEF3 | 490 | 480 | 497 | | | | | | | | |
| UFERS | FE59 | 405 | 390 | | | | | | | | | |
| UFINT | FE56 | 403 | 404 | | | | | | | | | |
| UFMT | FE36 | 386 | 389 | | | | | | | | | |
| UFPOMT | FE31 | 384 | 387 | 609 | | | | | | | | |
| UFS | FE3F | 391 | 263 | 377 | 468 | | | | | | | |
| WRITE | FC52 | 108 | 120 | | | | | | | | | |
| XANDLY | FD49 | 252 | 165 | 244 | | | | | | | | |
| XDATA | FD7C | 280 | 289 | | | | | | | | | |
| XIT | FDAD | 307 | 302 | | | | | | | | | |
| XMIT | FD61 | 265 | 252 | 258 | 267 | | | | | | | |

That which is claimed is:

1. A serial line communication system comprising:
a central computer means;
a communications line controller computer means having the capability to format a message from said central computer means, add a sync pattern and error detection code to a message from said central computer means and change the baud rate at which a message from said central computer is transmitted;
means for interfacing said central computer means and said communications line controller computer means;
a first peripheral interface adapter;
means for interfacing said communications line controller computer means and said first peripheral interface adapter;
a serial communications line;
means for interfacing said serial communications line and said first peripheral interface adapter;
a second peripheral interface adapter means;
means for interfacing said serial communications line and said second peripheral interface adapter means;
a remote device controller computer means having the capability to determine the baud rate at which a message is transmitted from said communications line controller computer means on said serial communications line and to detect errors in a message transmitted from said communications line controller computer means on said serial communications line;
means for interfacing said second peripheral interface adapter means and said remote device controller computer means;
at least one remote device; and
means for interfacing said remote device controller computer means to said at least one remote device.

2. Apparatus in accordance with claim 1 wherein said means for interfacing said first peripheral interface adapter means to said serial communication line comprises at least one line driver and at least one line receiver.

3. Apparatus in accordance with claim 2 wherein said means for interfacing said second peripheral interface adapter and said communications line comprises at least one line driver and at least one line receiver.

4. Apparatus in accordance with claim 1 additionally comprising:
a status indicator means; and
means for interfacing said status indicator means to said first peripheral interface adapter means.

5. Apparatus in accordance with claim 4 additionally comprising:
a second status indicator means; and
means for interfacing said second status indicator means to said second peripheral interface adapter means.

* * * * *